United States Patent
Forenza et al.

(10) Patent No.: US 12,244,369 B2
(45) Date of Patent: *Mar. 4, 2025

(54) SYSTEMS AND METHODS FOR RADIO FREQUENCY CALIBRATION EXPLOITING CHANNEL RECIPROCITY IN DISTRIBUTED INPUT DISTRIBUTED OUTPUT WIRELESS COMMUNICATIONS

(71) Applicant: Rearden, LLC, Palo Alto,, CA (US)

(72) Inventors: Antonio Forenza, San Francisco, CA (US); Fadi Saibi, Sunnyvale, CA (US); Timothy A. Pitman, San Francisco, CA (US); Stephen G. Perlman, Palo Alto, CA (US)

(73) Assignee: Rearden, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/910,798

(22) Filed: Oct. 9, 2024

(65) Prior Publication Data
US 2025/0038794 A1 Jan. 30, 2025

Related U.S. Application Data

(63) Continuation of application No. 18/109,207, filed on Feb. 13, 2023, now Pat. No. 12,166,546, which is a
(Continued)

(51) Int. Cl.
*H04B 7/0456* (2017.01)
*H04B 7/024* (2017.01)
(Continued)

(52) U.S. Cl.
CPC ........... *H04B 7/0452* (2013.01); *H04B 7/024* (2013.01); *H04B 7/0456* (2013.01);
(Continued)

(58) Field of Classification Search
CPC .............. H04L 1/0038; H04L 5/0053; H04W 72/0446; H04B 7/0452; H04B 7/0456
See application file for complete search history.

(56) References Cited

U.S. PATENT DOCUMENTS

| 4,003,016 A | 1/1977 | Remley |
| 4,253,193 A | 2/1981 | Kennard et al. |

(Continued)

FOREIGN PATENT DOCUMENTS

| AU | 2018200832 A1 | 2/2018 |
| AU | 2021261956 B2 | 12/2022 |

(Continued)

OTHER PUBLICATIONS

M. Baker, "LTE-Advanced physical layer", Alcatel-Lucent, Dec. 2009, 48 pages.
(Continued)

*Primary Examiner* — Romani Ohri
(74) *Attorney, Agent, or Firm* — Amster, Rothstein & Ebenstein LLP

(57) ABSTRACT

Systems and methods are described for radio frequency (RF) calibration in a multiple antenna system (MAS) with multi-user (MU) transmissions ("MU-MAS") exploiting uplink/downlink channel reciprocity. The RF calibration is used to compute open-loop downlink precoder based on uplink channel estimates, thereby avoiding feedback overhead for channel state information as in closed-loop schemes. For example, a MU-MAS of one embodiment includes a wireless cellular network with one or multiple beacon stations, multiple client devices and multiple distributed antennas operating cooperatively via precoding methods to eliminate inter-client interference and increase network capacity.

30 Claims, 21 Drawing Sheets

Related U.S. Application Data continuation of application No. 17/498,666, filed on Oct. 11, 2021, now Pat. No. 11,581,924, which is a continuation of application No. 16/719,169, filed on Dec. 18, 2019, now Pat. No. 11,146,313, which is a continuation of application No. 13/844,355, filed on Mar. 15, 2013, now Pat. No. 10,547,358.

(51) Int. Cl.
  *H04B 7/0452* (2017.01)
  *H04B 7/06* (2006.01)
  *H04B 17/12* (2015.01)
  *H04L 25/02* (2006.01)

(52) U.S. Cl.
  CPC .......... *H04B 7/0626* (2013.01); *H04B 17/12* (2015.01); *H04L 25/0224* (2013.01)

(56) References Cited

U.S. PATENT DOCUMENTS

| | | |
|---|---|---|
| 4,564,935 A | 1/1986 | Kaplan |
| 4,771,289 A | 9/1988 | Masak |
| 5,045,862 A | 9/1991 | Alden et al. |
| 5,088,091 A | 2/1992 | Schroeder et al. |
| 5,095,500 A | 3/1992 | Tayloe et al. |
| 5,097,485 A | 3/1992 | O'Connor et al. |
| 5,315,309 A | 5/1994 | Rudow et al. |
| 5,377,183 A | 12/1994 | Dent |
| 5,400,037 A | 3/1995 | East |
| 5,483,667 A | 1/1996 | Faruque |
| 5,555,257 A | 9/1996 | Dent |
| 5,600,326 A | 2/1997 | Yu et al. |
| 5,606,165 A | 2/1997 | Chiou et al. |
| 5,661,765 A | 8/1997 | Ishizu |
| 5,742,253 A | 4/1998 | Conroy et al. |
| 5,809,422 A | 9/1998 | Raleigh et al. |
| 5,838,671 A | 11/1998 | Ishikawa et al. |
| 5,872,814 A | 2/1999 | McMeekin |
| 5,983,104 A | 11/1999 | Wickman et al. |
| 6,005,516 A | 12/1999 | Reudink et al. |
| 6,005,856 A | 12/1999 | Jensen et al. |
| 6,014,107 A | 1/2000 | Wiesenfarth |
| 6,041,365 A | 3/2000 | Kleinerman |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,232,921 B1 | 5/2001 | Aiken et al. |
| 6,252,912 B1 | 6/2001 | Salinger |
| 6,275,738 B1 | 8/2001 | Kasevich et al. |
| 6,308,080 B1 | 10/2001 | Burt et al. |
| 6,320,853 B1 | 11/2001 | Wong et al. |
| 6,323,823 B1 | 11/2001 | Wong et al. |
| 6,330,460 B1 | 12/2001 | Wong et al. |
| 6,377,782 B1 | 4/2002 | Bishop et al. |
| 6,400,761 B1 | 6/2002 | Smee et al. |
| 6,411,612 B1 | 6/2002 | Halford et al. |
| 6,421,543 B1 | 7/2002 | Molnar |
| 6,442,151 B1 | 8/2002 | H'Mimy et al. |
| 6,445,910 B1 | 9/2002 | Oestreich |
| 6,448,937 B1 | 9/2002 | Aiken et al. |
| 6,453,177 B1 | 9/2002 | Wong et al. |
| 6,459,900 B1 | 10/2002 | Scheinert |
| 6,473,467 B1 | 10/2002 | Wallace et al. |
| 6,484,030 B1 | 11/2002 | Antoine et al. |
| 6,519,478 B1 | 2/2003 | Scherzer et al. |
| 6,611,231 B2 | 8/2003 | Crilly, Jr. et al. |
| 6,654,590 B2 | 11/2003 | Boros et al. |
| 6,668,161 B2 | 12/2003 | Boros et al. |
| 6,684,366 B1 | 1/2004 | Trott et al. |
| 6,697,644 B2 | 2/2004 | Scherzer et al. |
| 6,718,180 B1 | 4/2004 | Lundh et al. |
| 6,718,184 B1 | 4/2004 | Aiken et al. |
| 6,760,388 B2 | 7/2004 | Ketchum et al. |
| 6,760,599 B1 | 7/2004 | Uhlik |
| 6,760,603 B1 | 7/2004 | Scherzer et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,794,939 B2 | 9/2004 | Kim et al. |
| 6,795,413 B1 | 9/2004 | Uhlik |
| 6,799,026 B1 | 9/2004 | Scherzer et al. |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,847,832 B2 | 1/2005 | Wong et al. |
| 6,862,271 B2 | 3/2005 | Medvedev et al. |
| 6,888,795 B2 | 5/2005 | Gupta et al. |
| 6,888,809 B1 | 5/2005 | Foschini et al. |
| 6,888,899 B2 | 5/2005 | Raleigh et al. |
| 6,895,258 B1 | 5/2005 | Scherzer et al. |
| 6,901,062 B2 | 5/2005 | Scherzer et al. |
| 6,920,192 B1 | 7/2005 | Laroia et al. |
| 6,925,127 B1 | 8/2005 | Dent |
| 6,956,537 B2 | 10/2005 | Scherzer et al. |
| 6,963,742 B2 | 11/2005 | Boros et al. |
| 6,970,682 B2 | 11/2005 | Crilly, Jr. et al. |
| 6,978,150 B2 | 12/2005 | Hamabe |
| 6,996,060 B1 | 2/2006 | Dahlby et al. |
| 7,006,043 B1 | 2/2006 | Nalbandian |
| 7,013,144 B2 | 3/2006 | Yamashita et al. |
| 7,016,649 B1 | 3/2006 | Narasimhan et al. |
| 7,020,490 B2 | 3/2006 | Khatri |
| 7,027,415 B1 | 4/2006 | Dahlby et al. |
| 7,027,523 B2 | 4/2006 | Jalali et al. |
| 7,027,837 B1 | 4/2006 | Uhlik et al. |
| 7,031,336 B2 | 4/2006 | Scherzer et al. |
| 7,031,754 B2 | 4/2006 | Scherzer et al. |
| 7,068,704 B1 | 6/2006 | Orr |
| 7,072,413 B2 | 7/2006 | Walton et al. |
| 7,072,693 B2 | 7/2006 | Farlow et al. |
| 7,075,485 B2 | 7/2006 | Song et al. |
| 7,079,809 B1 | 7/2006 | Scherzer |
| 7,085,240 B2 | 8/2006 | Wu et al. |
| 7,095,723 B2 | 8/2006 | Sezgin et al. |
| 7,096,040 B1 | 8/2006 | Scherzer et al. |
| 7,116,723 B2 | 10/2006 | Kim et al. |
| 7,117,014 B1 | 10/2006 | Van Rensburg et al. |
| 7,120,440 B2 | 10/2006 | Cho et al. |
| 7,139,527 B2 | 11/2006 | Tamaki et al. |
| 7,142,154 B2 | 11/2006 | Quilter et al. |
| 7,154,936 B2 | 12/2006 | Bjerke et al. |
| 7,154,960 B2 | 12/2006 | Liu et al. |
| 7,158,493 B1 | 1/2007 | Uhlik et al. |
| 7,167,684 B2 | 1/2007 | Kadous et al. |
| 7,181,167 B2 | 2/2007 | Onggosanusi et al. |
| 7,184,492 B2 | 2/2007 | Dent |
| 7,193,991 B2 | 3/2007 | Melpignano et al. |
| 7,194,006 B2 | 3/2007 | Wong et al. |
| 7,197,082 B2 | 3/2007 | Alexiou et al. |
| 7,197,084 B2 | 3/2007 | Ketchum et al. |
| 7,197,282 B2 | 3/2007 | Dent et al. |
| 7,209,511 B2 | 4/2007 | Dent |
| 7,218,689 B2 | 5/2007 | Gupta |
| 7,224,942 B2 | 5/2007 | Dent |
| 7,227,855 B1 | 6/2007 | Barratt et al. |
| 7,242,724 B2 | 7/2007 | Alexiou et al. |
| 7,242,964 B1 | 7/2007 | Aiken et al. |
| 7,248,645 B2 | 7/2007 | Vialle et al. |
| 7,248,841 B2 | 7/2007 | Agee et al. |
| 7,248,879 B1 | 7/2007 | Walton et al. |
| 7,269,231 B2 | 9/2007 | Ding et al. |
| 7,272,294 B2 | 9/2007 | Zhou et al. |
| 7,299,071 B1 | 11/2007 | Barratt et al. |
| 7,310,680 B1 | 12/2007 | Graham |
| 7,313,403 B2 | 12/2007 | Gong et al. |
| 7,327,795 B2 | 2/2008 | Oprea |
| 7,333,540 B2 | 2/2008 | Yee |
| 7,336,626 B1 | 2/2008 | Barratt et al. |
| 7,339,906 B1 | 3/2008 | Dahlby et al. |
| 7,339,908 B2 | 3/2008 | Uhlik et al. |

(56) References Cited

U.S. PATENT DOCUMENTS

| | | |
|---|---|---|
| 7,352,774 B2 | 4/2008 | Uhlik et al. |
| 7,352,819 B2 | 4/2008 | Lakshmipathi et al. |
| 7,363,376 B2 | 4/2008 | Uhlik et al. |
| 7,366,202 B2 | 4/2008 | Scherzer et al. |
| 7,366,245 B2 | 4/2008 | Li et al. |
| 7,366,519 B2 | 4/2008 | Jason et al. |
| 7,369,841 B1 | 5/2008 | Uhlik et al. |
| 7,369,876 B2 | 5/2008 | Lee et al. |
| 7,394,858 B2 | 7/2008 | Sadowsky et al. |
| 7,406,315 B2 | 7/2008 | Uhlik et al. |
| 7,412,212 B2 | 8/2008 | Hottinen |
| 7,418,053 B2 | 8/2008 | Perlman et al. |
| 7,430,197 B1 | 9/2008 | Uhlik |
| 7,437,177 B2 | 10/2008 | Ozluturk et al. |
| 7,450,489 B2 | 11/2008 | Sandhu |
| 7,451,839 B2 | 11/2008 | Perlman |
| 7,471,736 B2 | 12/2008 | Ding et al. |
| 7,486,931 B2 | 2/2009 | Cho et al. |
| 7,492,743 B2 | 2/2009 | Uhlik |
| 7,499,548 B2 | 3/2009 | Meandzija et al. |
| 7,502,420 B2 | 3/2009 | Ketchum |
| 7,519,011 B2 | 4/2009 | Petrus et al. |
| 7,548,752 B2 | 6/2009 | Sampath et al. |
| 7,558,575 B2 | 7/2009 | Losh et al. |
| 7,599,420 B2 | 10/2009 | Forenza et al. |
| 7,599,443 B2 | 10/2009 | Ionescu et al. |
| 7,606,192 B2 | 10/2009 | Uhlik |
| 7,609,751 B1 | 10/2009 | Giallorenzi et al. |
| 7,616,698 B2 | 11/2009 | Sun et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,684,753 B2 | 3/2010 | Ionescu et al. |
| 7,688,789 B2 | 3/2010 | Pan et al. |
| 7,689,639 B2 | 3/2010 | Dent |
| 7,719,993 B2 | 5/2010 | Li et al. |
| 7,729,316 B2 | 6/2010 | Uhlik |
| 7,729,433 B2 | 6/2010 | Jalloul et al. |
| 7,747,250 B2 | 6/2010 | Larsson et al. |
| 7,751,368 B2 | 7/2010 | Li et al. |
| 7,751,843 B2 | 7/2010 | Butala |
| 7,756,222 B2 | 7/2010 | Chen et al. |
| 7,801,490 B1 | 9/2010 | Scherzer |
| 7,849,173 B1 | 12/2010 | Uhlik |
| 7,864,663 B2 | 1/2011 | Dent |
| 7,948,444 B2 | 5/2011 | Signell et al. |
| 7,961,809 B2 | 6/2011 | Bourdoux et al. |
| 7,978,673 B1 | 7/2011 | Uhlik et al. |
| 7,986,742 B2 | 7/2011 | Ketchum et al. |
| 7,995,973 B2 | 8/2011 | Dent et al. |
| 8,041,362 B2 | 10/2011 | Li et al. |
| 8,081,944 B2 | 12/2011 | Li |
| 8,086,271 B2 | 12/2011 | Dent |
| 8,090,320 B2 | 1/2012 | Dent et al. |
| 8,116,710 B2 | 2/2012 | Dent et al. |
| 8,126,510 B1 | 2/2012 | Samson et al. |
| 8,170,081 B2 | 5/2012 | Forenza et al. |
| 8,260,198 B2 | 9/2012 | Yamaura |
| 8,320,432 B1 | 11/2012 | Chockalingam et al. |
| 8,428,177 B2 | 4/2013 | Tsai et al. |
| 8,451,764 B2 | 5/2013 | Chao et al. |
| 8,469,800 B2 | 6/2013 | Lemay et al. |
| 8,482,462 B2 | 7/2013 | Komijani et al. |
| 8,548,384 B2 | 10/2013 | Lee et al. |
| 8,612,619 B2 | 12/2013 | Guo et al. |
| 8,638,880 B2 | 1/2014 | Baldemair et al. |
| 8,654,815 B1 | 2/2014 | Forenza et al. |
| 8,675,768 B2 | 3/2014 | Xu et al. |
| 8,705,484 B2 | 4/2014 | Caire et al. |
| 8,731,480 B2 | 5/2014 | Kim et al. |
| 8,787,469 B2 | 7/2014 | Kim et al. |
| 8,797,970 B2 | 8/2014 | Xing et al. |
| 8,849,339 B2 | 9/2014 | Anto et al. |
| 8,902,862 B2 | 12/2014 | Yu et al. |
| 8,971,380 B2 | 3/2015 | Forenza et al. |
| 8,989,155 B2 | 3/2015 | Forenza et al. |
| 9,089,002 B2 | 7/2015 | Abraham et al. |
| 9,094,180 B2 | 7/2015 | Zirwas et al. |
| 9,179,495 B1 | 11/2015 | Scherzer et al. |
| 9,252,858 B2 | 2/2016 | Abbasfar et al. |
| 9,307,506 B1 | 4/2016 | Kelly et al. |
| 9,331,882 B2 | 5/2016 | Fehri et al. |
| 9,685,997 B2 | 6/2017 | Forenza et al. |
| 9,698,881 B2 | 7/2017 | Nammi et al. |
| 10,205,513 B1 | 2/2019 | Winters et al. |
| 10,277,290 B2 | 4/2019 | Forenza et al. |
| 10,349,417 B2 | 7/2019 | Forenza et al. |
| 10,637,554 B2 | 4/2020 | Zhu et al. |
| 10,749,583 B2 | 8/2020 | Park et al. |
| 10,804,985 B2 | 10/2020 | Ge et al. |
| 10,985,811 B2 | 4/2021 | Forenza et al. |
| 11,190,947 B2 | 11/2021 | Perlman et al. |
| 2001/0031647 A1 | 10/2001 | Scherzer et al. |
| 2002/0027985 A1 | 3/2002 | Rashid-Farrokhi |
| 2002/0041575 A1 | 4/2002 | Karabinis et al. |
| 2002/0051433 A1 | 5/2002 | Affes et al. |
| 2002/0061004 A1 | 5/2002 | Lomp et al. |
| 2002/0097705 A1 | 7/2002 | Sezgin et al. |
| 2002/0136169 A1 | 9/2002 | Struhsaker et al. |
| 2002/0142723 A1 | 10/2002 | Foschini et al. |
| 2002/0168017 A1 | 11/2002 | Berthet et al. |
| 2002/0177447 A1 | 11/2002 | Walton et al. |
| 2002/0181444 A1 | 12/2002 | Acampora |
| 2002/0193146 A1 | 12/2002 | Wallace et al. |
| 2003/0003863 A1 | 1/2003 | Thielecke et al. |
| 2003/0012315 A1 | 1/2003 | Fan |
| 2003/0036359 A1 | 2/2003 | Dent et al. |
| 2003/0043887 A1 | 3/2003 | Hudson |
| 2003/0043929 A1 | 3/2003 | Sampath |
| 2003/0045297 A1 | 3/2003 | Dent |
| 2003/0048753 A1 | 3/2003 | Jalali |
| 2003/0065779 A1 | 4/2003 | Malik et al. |
| 2003/0072379 A1 | 4/2003 | Ketchum |
| 2003/0092456 A1 | 5/2003 | Dent |
| 2003/0114165 A1 | 6/2003 | Mills |
| 2003/0114193 A1 | 6/2003 | Kavak et al. |
| 2003/0119556 A1 | 6/2003 | Khan et al. |
| 2003/0125026 A1 | 7/2003 | Tsunehara et al. |
| 2003/0125040 A1 | 7/2003 | Walton et al. |
| 2003/0128658 A1 | 7/2003 | Walton et al. |
| 2003/0139196 A1 | 7/2003 | Medvedev et al. |
| 2003/0147362 A1 | 8/2003 | Dick et al. |
| 2003/0148738 A1 | 8/2003 | Das et al. |
| 2003/0156056 A1 | 8/2003 | Perry |
| 2003/0161282 A1 | 8/2003 | Medvedev et al. |
| 2003/0211843 A1 | 11/2003 | Song et al. |
| 2003/0214431 A1 | 11/2003 | Hager et al. |
| 2003/0220112 A1 | 11/2003 | Bugeja |
| 2003/0235146 A1 | 12/2003 | Wu et al. |
| 2004/0009755 A1 | 1/2004 | Yoshida |
| 2004/0042556 A1 | 3/2004 | Medvedev et al. |
| 2004/0043784 A1 | 3/2004 | Czaja et al. |
| 2004/0051676 A1 | 3/2004 | Travis et al. |
| 2004/0063450 A1 | 4/2004 | Uhlik |
| 2004/0082356 A1 | 4/2004 | Walton et al. |
| 2004/0095907 A1 | 5/2004 | Agee et al. |
| 2004/0097197 A1 | 5/2004 | Juncker et al. |
| 2004/0131011 A1 | 7/2004 | Sandell et al. |
| 2004/0136349 A1 | 7/2004 | Walton et al. |
| 2004/0152480 A1 | 8/2004 | Willars et al. |
| 2004/0170430 A1 | 9/2004 | Gorokhov |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203347 A1 | 10/2004 | Nguyen |
| 2004/0203987 A1 | 10/2004 | Butala |
| 2004/0209579 A1 | 10/2004 | Vaidyanathan |
| 2004/0252632 A1 | 12/2004 | Bourdoux et al. |
| 2005/0003865 A1 | 1/2005 | Lastinger et al. |
| 2005/0020237 A1 | 1/2005 | Alexiou et al. |
| 2005/0024231 A1 | 2/2005 | Fincher et al. |
| 2005/0031047 A1 | 2/2005 | Maltsev et al. |

(56) References Cited

U.S. PATENT DOCUMENTS

| | | |
|---|---|---|
| 2005/0041750 A1 | 2/2005 | Lau |
| 2005/0041751 A1 | 2/2005 | Nir et al. |
| 2005/0042988 A1 | 2/2005 | Hoek et al. |
| 2005/0043031 A1 | 2/2005 | Cho et al. |
| 2005/0047515 A1 | 3/2005 | Walton et al. |
| 2005/0058217 A1 | 3/2005 | Sandhu et al. |
| 2005/0075110 A1 | 4/2005 | Posti et al. |
| 2005/0085267 A1 | 4/2005 | Lemson et al. |
| 2005/0096058 A1 | 5/2005 | Warner et al. |
| 2005/0101259 A1 | 5/2005 | Tong et al. |
| 2005/0101352 A1 | 5/2005 | Logothetis et al. |
| 2005/0111406 A1 | 5/2005 | Pasanen et al. |
| 2005/0111599 A1 | 5/2005 | Walton et al. |
| 2005/0148368 A1 | 7/2005 | Scheinert et al. |
| 2005/0157683 A1 | 7/2005 | Ylitalo et al. |
| 2005/0169396 A1 | 8/2005 | Baier et al. |
| 2005/0174977 A1 | 8/2005 | Pedlar et al. |
| 2005/0186991 A1 | 8/2005 | Bateman |
| 2005/0232135 A1 | 10/2005 | Mukai et al. |
| 2005/0239406 A1 | 10/2005 | Shattil |
| 2005/0259627 A1 | 11/2005 | Song et al. |
| 2005/0265273 A1 | 12/2005 | Karabinis et al. |
| 2005/0271009 A1 | 12/2005 | Shirakabe et al. |
| 2005/0287962 A1 | 12/2005 | Mehta et al. |
| 2006/0002496 A1 | 1/2006 | Wallace et al. |
| 2006/0023803 A1 | 2/2006 | Perlman et al. |
| 2006/0032979 A1 | 2/2006 | Mitchell et al. |
| 2006/0046658 A1 | 3/2006 | Cruz et al. |
| 2006/0050804 A1 | 3/2006 | Leclair |
| 2006/0056855 A1 | 3/2006 | Nakagawa et al. |
| 2006/0062180 A1 | 3/2006 | Sayeedi et al. |
| 2006/0098568 A1 | 5/2006 | Oh et al. |
| 2006/0098754 A1 | 5/2006 | Kim et al. |
| 2006/0146755 A1 | 7/2006 | Pan et al. |
| 2006/0159160 A1 | 7/2006 | Kim et al. |
| 2006/0159187 A1 | 7/2006 | Wang et al. |
| 2006/0165120 A1 | 7/2006 | Karabinis |
| 2006/0198461 A1 | 9/2006 | Hayase |
| 2006/0199584 A1 | 9/2006 | Bergstrom et al. |
| 2006/0203708 A1 | 9/2006 | Sampath et al. |
| 2006/0209979 A1 | 9/2006 | Sandell et al. |
| 2006/0264242 A1 | 11/2006 | Dent |
| 2006/0270359 A1 | 11/2006 | Karmi et al. |
| 2006/0276227 A1 | 12/2006 | Dravida |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0015526 A1 | 1/2007 | Hansen |
| 2007/0025464 A1 | 2/2007 | Perlman |
| 2007/0054633 A1 | 3/2007 | Piirainen |
| 2007/0058590 A1 | 3/2007 | Wang et al. |
| 2007/0064823 A1 | 3/2007 | Hwang et al. |
| 2007/0066331 A1 | 3/2007 | Zheng et al. |
| 2007/0082674 A1 | 4/2007 | Pedersen et al. |
| 2007/0086400 A1 | 4/2007 | Shida et al. |
| 2007/0093273 A1 | 4/2007 | Cai |
| 2007/0093274 A1 | 4/2007 | Jafarkhani et al. |
| 2007/0099665 A1 | 5/2007 | Kim et al. |
| 2007/0132653 A1 | 6/2007 | Weller et al. |
| 2007/0135125 A1 | 6/2007 | Kim et al. |
| 2007/0183362 A1 | 8/2007 | Mondal et al. |
| 2007/0206504 A1* | 9/2007 | Koo ............... H04L 25/0398 455/39 |
| 2007/0211747 A1 | 9/2007 | Kim |
| 2007/0220151 A1 | 9/2007 | Li et al. |
| 2007/0242782 A1 | 10/2007 | Han et al. |
| 2007/0243871 A1 | 10/2007 | Chen et al. |
| 2007/0249380 A1 | 10/2007 | Stewart et al. |
| 2007/0253508 A1 | 11/2007 | Zhou et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0280116 A1 | 12/2007 | Wang et al. |
| 2007/0284474 A1 | 12/2007 | Olson et al. |
| 2007/0286298 A1 | 12/2007 | Choi et al. |
| 2008/0013644 A1 | 1/2008 | Hugl et al. |
| 2008/0051150 A1 | 2/2008 | Tsutsui |
| 2008/0080631 A1 | 4/2008 | Forenza et al. |
| 2008/0080635 A1 | 4/2008 | Hugl et al. |
| 2008/0089396 A1 | 4/2008 | Zhang et al. |
| 2008/0102881 A1 | 5/2008 | Han et al. |
| 2008/0107135 A1 | 5/2008 | Ibrahim |
| 2008/0117961 A1 | 5/2008 | Han et al. |
| 2008/0118004 A1 | 5/2008 | Forenza et al. |
| 2008/0125051 A1 | 5/2008 | Kim et al. |
| 2008/0130790 A1 | 6/2008 | Forenza et al. |
| 2008/0132281 A1 | 6/2008 | Kim et al. |
| 2008/0165866 A1 | 7/2008 | Teo et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0200211 A1 | 8/2008 | Hwang et al. |
| 2008/0205538 A1 | 8/2008 | Han et al. |
| 2008/0214185 A1 | 9/2008 | Cho et al. |
| 2008/0227422 A1* | 9/2008 | Hwang ............... H04B 7/0452 455/278.1 |
| 2008/0232394 A1 | 9/2008 | Kozek et al. |
| 2008/0233902 A1 | 9/2008 | Pan et al. |
| 2008/0239938 A1 | 10/2008 | Jalloul et al. |
| 2008/0260054 A1 | 10/2008 | Myung et al. |
| 2008/0261587 A1 | 10/2008 | Lennartson et al. |
| 2008/0267142 A1 | 10/2008 | Mushkin et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0010204 A1 | 1/2009 | Pratt, Jr. et al. |
| 2009/0023467 A1 | 1/2009 | Huang et al. |
| 2009/0034636 A1 | 2/2009 | Kotecha et al. |
| 2009/0041148 A1 | 2/2009 | Li et al. |
| 2009/0041151 A1 | 2/2009 | Khan et al. |
| 2009/0046678 A1 | 2/2009 | Lee et al. |
| 2009/0046800 A1 | 2/2009 | Xu et al. |
| 2009/0060013 A1 | 3/2009 | Ashikhmin et al. |
| 2009/0067402 A1 | 3/2009 | Forenza et al. |
| 2009/0069054 A1 | 3/2009 | Zangi et al. |
| 2009/0075686 A1 | 3/2009 | Gomadam et al. |
| 2009/0086648 A1 | 4/2009 | Xu et al. |
| 2009/0086855 A1 | 4/2009 | Jin et al. |
| 2009/0097448 A1 | 4/2009 | Vasudevan et al. |
| 2009/0135944 A1 | 5/2009 | Dyer et al. |
| 2009/0168914 A1 | 7/2009 | Chance et al. |
| 2009/0181708 A1 | 7/2009 | Kim et al. |
| 2009/0186611 A1 | 7/2009 | Stiles et al. |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0232245 A1 | 9/2009 | Lakkis |
| 2009/0254790 A1 | 10/2009 | Pi et al. |
| 2009/0262695 A1 | 10/2009 | Chen et al. |
| 2009/0268675 A1 | 10/2009 | Choi |
| 2009/0285156 A1 | 11/2009 | Huang et al. |
| 2009/0290517 A1 | 11/2009 | Rao et al. |
| 2009/0290632 A1 | 11/2009 | Wegener |
| 2009/0296650 A1 | 12/2009 | Venturino et al. |
| 2009/0316807 A1 | 12/2009 | Kim et al. |
| 2009/0318183 A1 | 12/2009 | Hugl et al. |
| 2010/0008331 A1 | 1/2010 | Li et al. |
| 2010/0034151 A1 | 2/2010 | Alexiou et al. |
| 2010/0035600 A1 | 2/2010 | Hou et al. |
| 2010/0068999 A1 | 3/2010 | Bangs et al. |
| 2010/0080163 A1 | 4/2010 | Krishnamoorthi et al. |
| 2010/0080323 A1 | 4/2010 | Mueck et al. |
| 2010/0098030 A1 | 4/2010 | Wang et al. |
| 2010/0099428 A1 | 4/2010 | Bhushan et al. |
| 2010/0119001 A1 | 5/2010 | Walton et al. |
| 2010/0128630 A1 | 5/2010 | Barak et al. |
| 2010/0150013 A1 | 6/2010 | Hara et al. |
| 2010/0157861 A1 | 6/2010 | Na et al. |
| 2010/0164802 A1 | 7/2010 | Li et al. |
| 2010/0172309 A1 | 7/2010 | Forenza et al. |

(56) References Cited

U.S. PATENT DOCUMENTS

| | | |
|---|---|---|
| 2010/0183099 A1 | 7/2010 | Toda et al. |
| 2010/0189191 A1 | 7/2010 | Taoka et al. |
| 2010/0195527 A1 | 8/2010 | Gorokhov et al. |
| 2010/0203887 A1 | 8/2010 | Kim |
| 2010/0220671 A1 | 9/2010 | Guillouard et al. |
| 2010/0220679 A1 | 9/2010 | Abraham et al. |
| 2010/0224725 A1 | 9/2010 | Perlman et al. |
| 2010/0227562 A1 | 9/2010 | Shim et al. |
| 2010/0232336 A1 | 9/2010 | Choudhury et al. |
| 2010/0234071 A1 | 9/2010 | Shabtay et al. |
| 2010/0238824 A1 | 9/2010 | Farajidana et al. |
| 2010/0238984 A1 | 9/2010 | Sayana et al. |
| 2010/0260060 A1 | 10/2010 | Abraham et al. |
| 2010/0260103 A1 | 10/2010 | Guey et al. |
| 2010/0260115 A1 | 10/2010 | Frederiksen et al. |
| 2010/0265842 A1 | 10/2010 | Khandekar et al. |
| 2010/0279625 A1 | 11/2010 | Ko et al. |
| 2010/0290369 A1 | 11/2010 | Hui et al. |
| 2010/0290382 A1 | 11/2010 | Hui et al. |
| 2010/0296591 A1 | 11/2010 | Xu et al. |
| 2010/0315966 A1 | 12/2010 | Weigand |
| 2010/0316154 A1 | 12/2010 | Park et al. |
| 2010/0316163 A1 | 12/2010 | Forenza et al. |
| 2010/0322176 A1 | 12/2010 | Chen et al. |
| 2010/0323611 A1 | 12/2010 | Choudhury |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0007856 A1 | 1/2011 | Jang et al. |
| 2011/0017700 A1 | 1/2011 | Patcheak et al. |
| 2011/0019715 A1 | 1/2011 | Brisebois |
| 2011/0038436 A1 | 2/2011 | Kim et al. |
| 2011/0044193 A1 | 2/2011 | Forenza et al. |
| 2011/0051832 A1 | 3/2011 | Mergen et al. |
| 2011/0069638 A1 | 3/2011 | Ishizu et al. |
| 2011/0076954 A1 | 3/2011 | Wee et al. |
| 2011/0077038 A1 | 3/2011 | Montojo et al. |
| 2011/0085610 A1 | 4/2011 | Zhuang et al. |
| 2011/0086611 A1 | 4/2011 | Klein et al. |
| 2011/0090005 A1 | 4/2011 | Nakayama |
| 2011/0090840 A1 | 4/2011 | Lee et al. |
| 2011/0090885 A1 | 4/2011 | Safavi |
| 2011/0096736 A1 | 4/2011 | Kwon et al. |
| 2011/0105174 A1 | 5/2011 | Pelletier et al. |
| 2011/0111781 A1 | 5/2011 | Chen et al. |
| 2011/0135308 A1 | 6/2011 | Tarlazzi et al. |
| 2011/0142020 A1 | 6/2011 | Kang et al. |
| 2011/0142104 A1 | 6/2011 | Coldrey et al. |
| 2011/0149765 A1 | 6/2011 | Gorokhov et al. |
| 2011/0164597 A1 | 7/2011 | Amini et al. |
| 2011/0164697 A1 | 7/2011 | Liao et al. |
| 2011/0194504 A1 | 8/2011 | Gorokhov et al. |
| 2011/0195670 A1 | 8/2011 | Dakshinamurthy et al. |
| 2011/0199946 A1 | 8/2011 | Breit et al. |
| 2011/0205963 A1 | 8/2011 | Tang et al. |
| 2011/0207416 A1 | 8/2011 | Doi |
| 2011/0211485 A1 | 9/2011 | Xu et al. |
| 2011/0216662 A1 | 9/2011 | Nie et al. |
| 2011/0261769 A1 | 10/2011 | Ji et al. |
| 2011/0274053 A1 | 11/2011 | Baik et al. |
| 2011/0294527 A1 | 12/2011 | Brueck et al. |
| 2011/0305195 A1 | 12/2011 | Forck et al. |
| 2011/0306381 A1 | 12/2011 | Jia et al. |
| 2011/0310987 A1 | 12/2011 | Lee et al. |
| 2011/0310994 A1 | 12/2011 | Ko et al. |
| 2012/0002743 A1* | 1/2012 | Cavalcante ............. H04B 7/024 375/267 |
| 2012/0014415 A1 | 1/2012 | Su et al. |
| 2012/0014477 A1 | 1/2012 | Ko et al. |
| 2012/0021707 A1 | 1/2012 | Forrester et al. |
| 2012/0039254 A1 | 2/2012 | Stapleton et al. |
| 2012/0039320 A1 | 2/2012 | Lemson et al. |
| 2012/0039419 A1 | 2/2012 | Maddah-Ali et al. |
| 2012/0044111 A1 | 2/2012 | Nagoshi et al. |
| 2012/0046039 A1 | 2/2012 | Hagerman et al. |
| 2012/0051257 A1 | 3/2012 | Kim et al. |
| 2012/0051258 A1 | 3/2012 | Josso |
| 2012/0054172 A1 | 3/2012 | Agrawal et al. |
| 2012/0076023 A1 | 3/2012 | Ko et al. |
| 2012/0076028 A1 | 3/2012 | Ko et al. |
| 2012/0076042 A1 | 3/2012 | Chun et al. |
| 2012/0076236 A1 | 3/2012 | Ko et al. |
| 2012/0082038 A1 | 4/2012 | Xu et al. |
| 2012/0087261 A1 | 4/2012 | Yoo et al. |
| 2012/0087430 A1 | 4/2012 | Forenza et al. |
| 2012/0093078 A1 | 4/2012 | Perlman et al. |
| 2012/0106388 A1 | 5/2012 | Shimezawa et al. |
| 2012/0108278 A1 | 5/2012 | Kim et al. |
| 2012/0108928 A1 | 5/2012 | Tverskoy |
| 2012/0114021 A1 | 5/2012 | Chung et al. |
| 2012/0127977 A1 | 5/2012 | Copeland et al. |
| 2012/0140743 A1 | 6/2012 | Pelletier et al. |
| 2012/0163427 A1 | 6/2012 | Kim |
| 2012/0176982 A1 | 7/2012 | Zirwas et al. |
| 2012/0188988 A1 | 7/2012 | Chung et al. |
| 2012/0218968 A1 | 8/2012 | Kim et al. |
| 2012/0224528 A1 | 9/2012 | Tapia et al. |
| 2012/0230691 A1 | 9/2012 | Hui et al. |
| 2012/0236741 A1 | 9/2012 | Xu et al. |
| 2012/0236840 A1 | 9/2012 | Kim et al. |
| 2012/0252470 A1 | 10/2012 | Wong et al. |
| 2012/0257575 A1 | 10/2012 | Davydov et al. |
| 2012/0258657 A1 | 10/2012 | Scheinert |
| 2012/0275530 A1 | 11/2012 | Olesen et al. |
| 2012/0281555 A1 | 11/2012 | Gao et al. |
| 2012/0281622 A1 | 11/2012 | Saban et al. |
| 2012/0288022 A1 | 11/2012 | Guey et al. |
| 2012/0289284 A1 | 11/2012 | Kuningas |
| 2012/0300717 A1 | 11/2012 | Cepeda et al. |
| 2012/0314570 A1 | 12/2012 | Forenza et al. |
| 2012/0314649 A1 | 12/2012 | Forenza et al. |
| 2012/0314797 A1 | 12/2012 | Kummetz et al. |
| 2012/0328301 A1 | 12/2012 | Gupta et al. |
| 2013/0003658 A1 | 1/2013 | Stewart et al. |
| 2013/0010840 A1 | 1/2013 | Maddah-Ali et al. |
| 2013/0028109 A1 | 1/2013 | Joengren et al. |
| 2013/0033998 A1 | 2/2013 | Seo et al. |
| 2013/0038766 A1 | 2/2013 | Perlman et al. |
| 2013/0039168 A1 | 2/2013 | Forenza et al. |
| 2013/0039332 A1 | 2/2013 | Nazar et al. |
| 2013/0039349 A1 | 2/2013 | Ebrahimi et al. |
| 2013/0039387 A1 | 2/2013 | Qu |
| 2013/0044797 A1 | 2/2013 | Nammi |
| 2013/0051240 A1 | 2/2013 | Bhattad et al. |
| 2013/0058307 A1 | 3/2013 | Kim et al. |
| 2013/0064216 A1 | 3/2013 | Gao et al. |
| 2013/0077514 A1 | 3/2013 | Dinan |
| 2013/0077569 A1 | 3/2013 | Nam et al. |
| 2013/0083681 A1 | 4/2013 | Ebrahimi et al. |
| 2013/0089009 A1 | 4/2013 | Li et al. |
| 2013/0089159 A1 | 4/2013 | Liu |
| 2013/0094548 A1 | 4/2013 | Park |
| 2013/0114437 A1 | 5/2013 | Yoo et al. |
| 2013/0114763 A1 | 5/2013 | Park |
| 2013/0115986 A1 | 5/2013 | Mueck et al. |
| 2013/0128821 A1 | 5/2013 | Hooli et al. |
| 2013/0142290 A1 | 6/2013 | Farmanbar et al. |
| 2013/0163461 A1 | 6/2013 | Kim et al. |
| 2013/0170381 A1 | 7/2013 | Xu et al. |
| 2013/0188567 A1* | 7/2013 | Wang .................. H04W 72/23 370/329 |
| 2013/0195047 A1 | 8/2013 | Koivisto et al. |
| 2013/0195086 A1 | 8/2013 | Xu et al. |
| 2013/0195467 A1 | 8/2013 | Schmid et al. |
| 2013/0208604 A1 | 8/2013 | Lee et al. |
| 2013/0208671 A1 | 8/2013 | Royz et al. |
| 2013/0242890 A1 | 9/2013 | He et al. |
| 2013/0242956 A1 | 9/2013 | Hall |
| 2013/0272170 A1 | 10/2013 | Chatterjee et al. |
| 2013/0272250 A1 | 10/2013 | Shimezawa et al. |
| 2013/0272441 A1 | 10/2013 | Uyehara et al. |

(56) References Cited

U.S. PATENT DOCUMENTS

| | | | |
|---|---|---|---|
| 2013/0273950 A1 | 10/2013 | Sun et al. |
| 2013/0286866 A1 | 10/2013 | Hammarwall et al. |
| 2013/0286958 A1 | 10/2013 | Liang et al. |
| 2013/0286997 A1* | 10/2013 | Davydov | H04W 56/0045 370/329 |
| 2013/0315189 A1 | 11/2013 | Kim et al. |
| 2013/0315195 A1 | 11/2013 | Ko et al. |
| 2013/0315211 A1 | 11/2013 | Balan et al. |
| 2013/0322308 A1 | 12/2013 | Yu et al. |
| 2013/0329592 A1 | 12/2013 | Beale |
| 2013/0331114 A1 | 12/2013 | Gormley et al. |
| 2014/0010197 A1 | 1/2014 | Wang et al. |
| 2014/0016556 A1 | 1/2014 | Shimezawa et al. |
| 2014/0025999 A1 | 1/2014 | Kessler |
| 2014/0029490 A1 | 1/2014 | Kim et al. |
| 2014/0038619 A1 | 2/2014 | Timothy |
| 2014/0056156 A1 | 2/2014 | George |
| 2014/0064206 A1* | 3/2014 | Bao | H04W 72/20 370/329 |
| 2014/0086209 A1 | 3/2014 | Su et al. |
| 2014/0086296 A1 | 3/2014 | Badic et al. |
| 2014/0087680 A1 | 3/2014 | Luukkala et al. |
| 2014/0094169 A1 | 4/2014 | Takano |
| 2014/0112216 A1 | 4/2014 | Seo et al. |
| 2014/0113677 A1 | 4/2014 | Parkvall et al. |
| 2014/0133435 A1 | 5/2014 | Forenza et al. |
| 2014/0139037 A1 | 5/2014 | John et al. |
| 2014/0140225 A1 | 5/2014 | Wala |
| 2014/0146756 A1 | 5/2014 | Sahin et al. |
| 2014/0153427 A1 | 6/2014 | Seo et al. |
| 2014/0177601 A1 | 6/2014 | Nishio et al. |
| 2014/0185700 A1 | 7/2014 | Dong et al. |
| 2014/0198744 A1 | 7/2014 | Wang et al. |
| 2014/0206280 A1 | 7/2014 | Nilsson et al. |
| 2014/0219142 A1 | 8/2014 | Schulz et al. |
| 2014/0219152 A1 | 8/2014 | Anto et al. |
| 2014/0219202 A1 | 8/2014 | Kim et al. |
| 2014/0219267 A1 | 8/2014 | Eyuboglu et al. |
| 2014/0225788 A1 | 8/2014 | Schulz et al. |
| 2014/0226570 A1 | 8/2014 | Comeau et al. |
| 2014/0241209 A1 | 8/2014 | Pollakowski et al. |
| 2014/0241218 A1 | 8/2014 | Moshfeghi |
| 2014/0241240 A1 | 8/2014 | Kloper et al. |
| 2014/0245095 A1* | 8/2014 | Nammi | H04L 5/0055 714/749 |
| 2014/0294108 A1 | 10/2014 | Etkin et al. |
| 2014/0295758 A1 | 10/2014 | Pedersen |
| 2014/0301278 A1 | 10/2014 | Ghosh et al. |
| 2014/0301345 A1 | 10/2014 | Kim et al. |
| 2014/0301493 A1 | 10/2014 | Govindswamy et al. |
| 2014/0307630 A1 | 10/2014 | Nagata et al. |
| 2014/0340255 A1 | 11/2014 | Meerkerk et al. |
| 2014/0340260 A1 | 11/2014 | Richards |
| 2014/0341143 A1 | 11/2014 | Yang et al. |
| 2014/0348077 A1 | 11/2014 | Chen et al. |
| 2014/0348090 A1 | 11/2014 | Nguyen et al. |
| 2014/0348131 A1 | 11/2014 | Duan et al. |
| 2015/0003311 A1 | 1/2015 | Feuersaenger et al. |
| 2015/0011197 A1 | 1/2015 | Tarraf et al. |
| 2015/0016317 A1 | 1/2015 | Park et al. |
| 2015/0049689 A1 | 2/2015 | Seo |
| 2015/0092416 A1 | 4/2015 | Potucek et al. |
| 2015/0098410 A1 | 4/2015 | Jongren et al. |
| 2015/0117392 A1 | 4/2015 | Hammarwall et al. |
| 2015/0118369 A1 | 4/2015 | Hyde et al. |
| 2015/0131750 A1 | 5/2015 | Xue et al. |
| 2015/0131751 A1 | 5/2015 | Bayesteh et al. |
| 2015/0133126 A1 | 5/2015 | Liu et al. |
| 2015/0181568 A1 | 6/2015 | Seo et al. |
| 2015/0229372 A1 | 8/2015 | Perlman et al. |
| 2015/0270882 A1 | 9/2015 | Shattil |
| 2015/0271003 A1 | 9/2015 | Kuchi et al. |
| 2015/0296533 A1 | 10/2015 | Park |
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0061027 A1 | 3/2016 | Gao et al. |
| 2016/0094318 A1 | 3/2016 | Shattil |
| 2016/0157146 A1 | 6/2016 | Karabinis |
| 2016/0165580 A1 | 6/2016 | Park et al. |
| 2016/0248559 A1 | 8/2016 | Guo et al. |
| 2016/0294455 A1 | 10/2016 | Forenza et al. |
| 2016/0302028 A1 | 10/2016 | Ling et al. |
| 2016/0302218 A1 | 10/2016 | Behravan et al. |
| 2016/0353290 A1 | 12/2016 | Nammi et al. |
| 2016/0374070 A1 | 12/2016 | Ghosh |
| 2019/0385057 A1 | 12/2019 | Litichever et al. |
| 2020/0084673 A1 | 3/2020 | Ahmadi |
| 2022/0141554 A1 | 5/2022 | Rodriguez et al. |

FOREIGN PATENT DOCUMENTS

| | | |
|---|---|---|
| CA | 1307842 C | 9/1992 |
| CA | 2011298 C | 5/1999 |
| CA | 2856772 A1 | 1/2006 |
| CA | 2838781 A1 | 1/2013 |
| CN | 1256803 A | 6/2000 |
| CN | 1516370 A | 7/2004 |
| CN | 1538636 A | 10/2004 |
| CN | 1703113 A | 11/2005 |
| CN | 1734972 A | 2/2006 |
| CN | 1820424 A | 8/2006 |
| CN | 1898973 A | 1/2007 |
| CN | 1980080 A | 6/2007 |
| CN | 101031129 A | 9/2007 |
| CN | 101238648 A | 8/2008 |
| CN | 101291503 A | 10/2008 |
| CN | 101310454 A | 11/2008 |
| CN | 101405965 A | 4/2009 |
| CN | 101442388 A | 5/2009 |
| CN | 101494491 A | 7/2009 |
| CN | 101536320 A | 9/2009 |
| CN | 101542938 A | 9/2009 |
| CN | 101682432 A | 3/2010 |
| CN | 101861718 A | 10/2010 |
| CN | 101873281 A | 10/2010 |
| CN | 101981826 A | 2/2011 |
| CN | 102007707 A | 4/2011 |
| CN | 102027636 A | 4/2011 |
| CN | 102158272 A | 8/2011 |
| CN | 102185641 A | 9/2011 |
| CN | 102186541 A | 9/2011 |
| CN | 102439891 A | 5/2012 |
| CN | 102594420 A | 7/2012 |
| CN | 102948085 A | 2/2013 |
| CN | 103069903 A | 4/2013 |
| CN | 103117975 A | 5/2013 |
| CN | 103152807 A | 6/2013 |
| CN | 103201958 A | 7/2013 |
| CN | 103797725 A | 5/2014 |
| CN | 104025684 A | 9/2014 |
| CN | 104038245 A | 9/2014 |
| CN | 104335625 A | 2/2015 |
| CN | 105119794 A | 12/2015 |
| CN | 105981340 A | 9/2016 |
| EP | 1359683 A1 | 11/2003 |
| EP | 1392029 A1 | 2/2004 |
| EP | 1597842 A1 | 11/2005 |
| EP | 2244390 A2 | 10/2010 |
| EP | 2252109 A1 | 11/2010 |
| EP | 2889957 A1 | 7/2015 |
| EP | 2904814 A1 | 8/2015 |
| EP | 3419188 A1 | 12/2018 |
| GB | 2300547 A | 11/1996 |
| JP | H02210897 A | 8/1990 |
| JP | 11-252613 A | 9/1999 |
| JP | 2001-217759 A | 8/2001 |
| JP | 2002-210897 A | 7/2002 |
| JP | 2002-281551 A | 9/2002 |
| JP | 2002-374224 A | 12/2002 |
| JP | 2003-018054 A | 1/2003 |
| JP | 2003051775 A | 2/2003 |
| JP | 2003-134013 A | 5/2003 |
| JP | 2003-179948 A | 6/2003 |

(56) References Cited

FOREIGN PATENT DOCUMENTS

| | | |
|---|---|---|
| JP | 2003-284128 A | 10/2003 |
| JP | 2004-502376 A | 1/2004 |
| JP | 2004-104206 A | 4/2004 |
| JP | 2005-039822 A | 2/2005 |
| JP | 2005-159448 A | 6/2005 |
| JP | 2006-081162 A | 3/2006 |
| JP | 2006-245871 A | 9/2006 |
| JP | 2007-060106 A | 3/2007 |
| JP | 2007-116686 A | 5/2007 |
| JP | 2008-035287 A | 2/2008 |
| JP | 2009-213052 A | 9/2009 |
| JP | 2009-273167 A | 11/2009 |
| JP | 2009-540692 A | 11/2009 |
| JP | 2010-016674 A | 1/2010 |
| JP | 2010-021999 A | 1/2010 |
| JP | 2010-068496 A | 3/2010 |
| JP | 2010-074520 A | 4/2010 |
| JP | 2010-193189 A | 9/2010 |
| JP | 2010-206794 A | 9/2010 |
| JP | 2010-537577 A | 12/2010 |
| JP | 2011-035912 A | 2/2011 |
| JP | 2011-078025 A | 4/2011 |
| JP | 2011-097225 A | 5/2011 |
| JP | 2011-517393 A | 6/2011 |
| JP | 2011-524117 A | 8/2011 |
| JP | 2011-176493 A | 9/2011 |
| JP | 2012-120063 A | 6/2012 |
| JP | 2012-124859 A | 6/2012 |
| JP | 2012-175189 A | 9/2012 |
| JP | 2012-521180 A | 9/2012 |
| JP | 2012-532495 A | 12/2012 |
| JP | 2013-502117 A | 1/2013 |
| JP | 2013-507064 A | 2/2013 |
| JP | 2013-102450 A | 5/2013 |
| JP | 2016-513940 A | 5/2016 |
| KR | 10-2008-0016928 A | 2/2008 |
| KR | 10-2008-0061394 A | 7/2008 |
| KR | 10-2008-0081698 A | 9/2008 |
| KR | 10-2009-0132625 A | 12/2009 |
| KR | 10-2010-0057071 A | 5/2010 |
| KR | 10-2012-0003781 A | 1/2012 |
| KR | 10-2012-0024836 A | 3/2012 |
| KR | 10-2012-0084243 A | 7/2012 |
| KR | 10-2012-0096407 A | 8/2012 |
| KR | 10-2012-0119175 A | 10/2012 |
| KR | 10-2018-0061394 A | 6/2018 |
| KR | 10-2012-0001598 A | 1/2021 |
| RU | 2330381 C2 | 7/2008 |
| RU | 2010110620 A | 9/2011 |
| RU | 2455779 C2 | 7/2012 |
| RU | 2012121952 A | 2/2014 |
| RU | 2543092 C2 | 2/2015 |
| TW | 201031243 A | 8/2010 |
| TW | 201112665 A | 4/2011 |
| TW | 201212570 A | 3/2012 |
| TW | 201220741 A | 5/2012 |
| TW | 201225563 A | 6/2012 |
| TW | 201626760 A | 7/2016 |
| WO | 99/23767 A1 | 5/1999 |
| WO | 00/54463 A1 | 9/2000 |
| WO | 02/01732 A2 | 1/2002 |
| WO | 02/08785 A1 | 1/2002 |
| WO | 02/54626 A1 | 7/2002 |
| WO | 02/93784 A1 | 11/2002 |
| WO | 02/99995 A2 | 12/2002 |
| WO | 03/03604 A1 | 1/2003 |
| WO | 03/84092 A2 | 10/2003 |
| WO | 03/94460 A2 | 11/2003 |
| WO | 2003/107582 A2 | 12/2003 |
| WO | 2004/017586 A1 | 2/2004 |
| WO | 2004/073210 A1 | 8/2004 |
| WO | 2004075454 A2 | 9/2004 |
| WO | 2004/095719 A2 | 11/2004 |
| WO | 2005/046081 A1 | 5/2005 |
| WO | 2005/064871 A1 | 7/2005 |
| WO | 2006/049417 A1 | 5/2006 |
| WO | 2006/063138 A2 | 6/2006 |
| WO | 2006/078019 A1 | 7/2006 |
| WO | 2006/110737 A2 | 10/2006 |
| WO | 2006/113872 A1 | 10/2006 |
| WO | 2007/024913 A1 | 3/2007 |
| WO | 2007/027825 A2 | 3/2007 |
| WO | 2007/046621 A1 | 4/2007 |
| WO | 2007/062491 A1 | 7/2007 |
| WO | 2007/114654 A1 | 10/2007 |
| WO | 2008/119216 A1 | 10/2008 |
| WO | 2009/026400 A1 | 2/2009 |
| WO | 2009/099752 A1 | 8/2009 |
| WO | 2009/125962 A2 | 10/2009 |
| WO | 2009/151989 A2 | 12/2009 |
| WO | 2010/017482 A1 | 2/2010 |
| WO | 2010/019524 A2 | 2/2010 |
| WO | 2010/067419 A1 | 6/2010 |
| WO | 2011/017700 A1 | 2/2011 |
| WO | 2011/018121 A1 | 2/2011 |
| WO | 2011/099802 A2 | 8/2011 |
| WO | 2011/100492 A1 | 8/2011 |
| WO | 2011/116824 A1 | 9/2011 |
| WO | 2011/155763 A2 | 12/2011 |
| WO | 2012/000278 A1 | 1/2012 |
| WO | 2012/001086 A1 | 1/2012 |
| WO | 2012/007837 A1 | 1/2012 |
| WO | 2012/024454 A1 | 2/2012 |
| WO | 2012/044111 A2 | 4/2012 |
| WO | 2012/044969 A1 | 4/2012 |
| WO | 2012/058600 A2 | 5/2012 |
| WO | 2012/061325 A1 | 5/2012 |
| WO | 2012/091342 A2 | 7/2012 |
| WO | 2012/108807 A1 | 8/2012 |
| WO | 2012/108928 A1 | 8/2012 |
| WO | 2012/108976 A1 | 8/2012 |
| WO | 2012/130071 A1 | 10/2012 |
| WO | 2013/021531 A1 | 2/2013 |
| WO | 2013/040089 A2 | 3/2013 |
| WO | 2013/114335 A1 | 8/2013 |
| WO | 2013/166464 A1 | 11/2013 |
| WO | 2013/173809 A1 | 11/2013 |
| WO | 2014/055294 A1 | 4/2014 |
| WO | 2014/082048 A1 | 5/2014 |
| WO | 2015160497 A1 | 10/2015 |
| WO | 2016/037305 A1 | 3/2016 |
| WO | 2016/057304 A1 | 4/2016 |

OTHER PUBLICATIONS

M. Costa, "Writing on dirty paper," IEEE Transactions on Information Theory, vol. 29, No. 3, May 1983, pp. 439-441.

Marek S., "AT&T's Rinne talks about carrier aggregation trials, small cells and more", Retrieved from the Internet: URL: http:www.fiercebroadbandwireless.comstoryatts-rinne-talks-about-carrieraggregation-trials-small-cells-and-more2012-11-08, 3 pages.

Martinez A. O., et al."Very Large Aperture Massive MIMO: a Measurement Based Study", Dec. 8, 2014, 6 pages.

Martinez et al., "Energy Detection Using Very Large Antenna Array Receivers," 48th Asilomar Conference on Signals, Systems, and Computers Proceedings, Nov. 2-5, 2014, 5 pages.

Marzetta et al., "Noncooperative Cellular Wireless with Unlimited Nos. of Base Station Antennas," IEEE Transactions on Wireless Communications, 2010, vol. 9(11), pp. 3590-3600.

Masouros et al., "Large-Scale MIMO Transmitters in Fixed Physical Spaces: The Effect of Transmit Correlation and Mutual Coupling", IEEE Trans. Commun., 2013, vol. 61, No. 7, pp. 2794-2804.

Matthaiou et al. "Sum Rate Analysis of ZF Receivers in Distributed MIMO Systems," IEEE Journal on Selected Areas in Communications, 2013, vol. 31 (2), pp. 180-191.

Matthaiou et al., "Sum Rate Analysis of ZF Receivers in Distributed MIMO Systems with Rayleigh/Lognormal Fading," 2012 IEEE International Conference on Communications, ICC 2012, Ottawa, June 10-15, pp. 3857-3861.

Mattheijssen P., "Antenna-Pattern Diversity versus Space Diversity for use at Handhelds," IEEE Trans. on Yeh. Technol, 2004, vol. 53 (4), pp. 1035-1042.

(56) References Cited

OTHER PUBLICATIONS

Mazrouei-Sebdani et al., Vector Perbutation Precoding and User Scheduling for Network MIMO, 2011, Wireless Communications and Networking Conference (WCNC), 2011 IEEE, pp. 203-208.
McKay et al., "Multiplexing/beamforming switching for coded MIMO in spatially correlated channels based on Closed-Form BER Approximations," IEEE Transactions on Vehicular Technology, 2007, vol. 56, No. 5, pp. 2555-2567.
McKay Mr., et al., "A throughput-based adaptive MIMO BICM approach for spatially-correlated channels," IEEE to appear in Proc. ICC, 2006, 5 pages.
McLean et al., "A re-examination of the fundamental limits on the radiation Q of electrically small antennas", IEEE Trans. Antennas Propagat., vol. 44, n.5,, (May 1996), pp. 672-676.
Mikro Tik, "Routerboard," Retrieved from the Internet: URL: http:routerboard.com, 2015, 30 pages.
Minn et al., "A robust timing and frequency synchronization for OFDM systems", IEEE Trans. Wireless Commun., vol. 2, No. 4, Jul. 2003, pp. 822-839.
Mitsubishi Electric, "Leakage-based Precoding for CoMP in LTE-A," 3GPP RAN1 #56, R1-090596, Feb. 9-13, 2009, 14 pages.
Miyakawa et al., "A Method of Code Conversion for Digital Communication Channels with Intersymbol Interference," Transactions of the Institute of Engineers of Japan, vol. 52-A (6), 1969, pp. 272-273.
Mohammed et al., "A Low-Complexity Precoder for Large Multiuser MISO Systems", IEEE Vehicular Technology Conference, 2008, pp. 797-801.
Mohammed et al., "Per-Antenna Constant Envelope Precoding for Large Multi-User MIMO Systems," IEEE Transactions on Communications, Jan. 2012, vol. 61, No. 3, pp. 1-24.
Mohammed et al., "Single-User Beamforming in Large-Scale MISO Systems with Per- Antenna Constant-Envelope Constraints," IEEE Transactions on Wireless Communications, Sep. 2012, vol. 2012, pp. 3992-4005.
Mohammed S. K., et al., "Constant-Envelope Multi-User Precoding for Frequency-Selective Massive MIMO Systems," IEEE Wireless Communications Letters, 2013, vol. 2(5), pp. 547-550.
Molisch et al., "MIMO Systems with Antenna Selection," IEEE Microwave Magazine, vol. 5, No. 1, Mar. 2004, pp. 46-56.
Montgomery B.G., "Analog RF-over-fiber technology, Syntonics LLC," 2008, pp. 2-51, Available Online at <http:chesapeakebayaoc.orgdocumentsSyntonics_AOC_RF_over-Fiber_19_Jan_08.pdf>.
Monziano et al., "Introduction to Adaptive Arrays," New York, Wiley, 1980, Table of Contents 21 pages.
Moose et al., "A technique for orthogonal frequency division multiplexing frequency offset correction", IEEE Trans. Commun., vol. 42, No. 10, Oct. 1994, pp. 2908-2914.
Morelli et al., "An improved frequency offset estimator for OFDM applications", IEEE Commun. Lett., vol. 3, No. 3, Mar. 1999, pp. 75-77.
Morelli et al., "Frequency ambiguity resolution in OFDM systems," IEEE Commun. Lett, 2000, vol. 4, No. 4, pp. 134-136.
Morgan Stanley, "Mobile data wave: who dares to invest, wins", Jun. 13, 2012.
Morris et al., "Network model for MIMO systems with coupled antennas and noisy amplifiers," IEEE Transactions on Antennas and Propagation, 2005, vol. 53, pp. 545-552.
Morris et al., "The Impact of Array Configuration on MIMO Wireless Channel Capacity," Proc. IEEE Antennas and Propagation Symposium, Jun. 2002, vol. 3, pp. 214-217.
Motorola, "Long Term Evolution (LTE): A Technical Overview," 2007, Retrieved from the Internet: http:business.motorola.comexperienceltepdfLTETechnicalOverview.pdf, 15 pages.
Moustakas et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.
Moustakas et al., "MIMO Capacity Through Correlated Channels in the Presence of Correlated Interferers and Noise: A (Not so) Large N Analysis", Institute of Electrical and Electronics Engineers Transformations and Information Theory, 2003, vol. 49, No. 10, pp. 2545-2561.
Muharar et al., "Downlink Beamforming with Transmit-Side Channel Correlation: A Large System Analysis," in Proc. IEEE International Conference on Communications (ICC), Kyoto, Japan, Jun. 2011, 5 pages.
Muller et al., "Blind Pilot Decontamination," IEEE Journal of Selected Topics in Signal Processing on Signal Processing for Large-Scale MIMO Communications, 2013, 31 pages.
Muller et al., "Vector Precoding for Wireless MIMO Systems and its Replica Analysis," IEEE J. Sel. Areas Commun, 2008, vol. 26, No. 3, pp. 530-540.
Nam J., et al., "Joint Spatial Division and Multiplexing: Realizing Massive MIMO Gains with Limited Channel State Information," in Proceedings Conference on Information Sciences and Systems, IEEE, Mar. 2012, 6 pages.
Narasimhan et al., "M-ary Detection and q-ary Decoding in Large-Scale MIMO: A Non-Binary Belief Propagation Approach," Oct. 16, 2013, 7 pages.
Nec, "Self organizing networks", White paper, Feb. 2009, 5 pages.
Netsukuku, printed on Sep. 30, 2015, Retrieved from the Internet: URL: http:netsukuku.freaknet.org., 8 pages.
Ngo et al., Energy and Spectral Efficiency of Very Large Multiuser MIMO Systems, IEEE Transactions on Communications, May 21, 2012, vol. 61 No. 4, pp. 1436-1449.
Ngo et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012, 5 pages.
Ngo et al., Massive MU-MIMO Downlink TDD Systems with Linear Precoding and Downlink Pilots, Proceedings in Allerton Conference on Communication, Control, and Computing, Urbana-Champaign, Illinois, Oct. 2013.
Ngo et al., The multicell multiuser MIMO uplink with very large antenna arrays and a finite-dimensional channel, IEEE Transactions Communications, 2013, vol. 61, No. 6, pp. 2350-2361.
Ngo et al., Uplink Performance Analysis of Multicell MU-MIMO Systems with ZF Receivers, Jun. 2012, pp. 1-32.
Nguyen et al., "Precoding for Multicell MIMO Systems with Compressive Rank-q Channel Approximation", in Proc. IEEE PIMRC, Fundamentals and Phy Track, London, UK, Sep. 2013, pp. 1227-1232.
Nguyen S., et al., "Compressive Sensing-Based Channel Estimation for Massive Multiuser MIMO Systems" in proceeding IEEE WCNC, 2013, 6 pages.
Nguyen, et al., "Multiuser Transmit Beamforming via Regularized Channel Inversion: A Large System Analysis" IEEE Global Communications Conference, New Orleans, LO, US, Dec. 2008, pp. 1-4.
Nicta, "InterfereX", Available Online at <http://www.interfereX.com, Jun. 22, 2015, 3 pages.
Final Office Action, U.S. Appl. No. 14/611,565, Sep. 3, 2020, 7 pages.
Final Office Action, U.S. Appl. No. 14/672,014, Oct. 16, 2017, 9 pages.
Final Office Action, U.S. Appl. No. 14/672,014, Oct. 2, 2019, 10 pages.
Final Office Action, U.S. Appl. No. 15/057,002, Jul. 16, 2018, 13 pages.
Final Office Action, U.S. Appl. No. 15/181,383, Jan. 11, 2018, 8 pages.
Final Office Action, U.S. Appl. No. 15/340,914, Jan. 3, 2019, 67 pages.
Final Office Action, U.S. Appl. No. 15/682,076, Oct. 30, 2019, 26 pages.
Final Office Action, U.S. Appl. No. 15/792,610, Dec. 16, 2019, 8 pages.
Final Office Action, U.S. Appl. No. 16/188,841, Jul. 7, 2020, 17 pages.
Final Office Action, U.S. Appl. No. 16/208,895, Apr. 6, 2021, 8 pages.

(56) References Cited

OTHER PUBLICATIONS

Final Office Action, U.S. Appl. No. 16/208,895, Jul. 28, 2022, 5 pages.
Final Office Action, U.S. Appl. No. 17/317,856, Aug. 20, 2021, 33 pages.
Final Office Action, U.S. Appl. No. 17/498,666, Apr. 22, 2022, 17 pages.
Final Office Action, U.S. Appl. No. 13/233,006, Dec. 19, 2017, 114 pages.
Final Office Action, U.S. Appl. No. 13/233,006, Feb. 18, 2014, 18 pages.
Final Office Action, U.S. Appl. No. 13/233,006, Nov. 5, 2015, 10 pages.
Final Office Action, U.S. Appl. No. 13/233,006, Nov. 13, 2018, 9 pages.
Final Office Action, U.S. Appl. No. 13/233,006, Oct. 12, 2016, 10 pages.
First Exam Report, New Zealand App. No. 701567, Feb. 3, 2016, 4 pages.
First Exam Report, New Zealand Patent App. No. 717370, Apr. 8, 2016, 2 pages.
First Examination Report from counterpart AU Patent App. No. 2011323559, Oct. 12, 2015, 3 pages.
First Examination Report, AU App. No. 2018253582, Jun. 3, 2019, 3 pages.
First Examination Report, AU Patent App. No. 2014248533, Mar. 1, 2017, 5 pages.
First Examination Report, AU Patent App. No. 2020256510, Aug. 10, 2015, 3 pages.
First Examination Report, AU Patent App. No. AU2017245425, May 9, 2018, 9 pages.
First Examination Report, New Zealand App. No. 729017, Jun. 30, 2017, 3 pages.
First Examination Report, New Zealand App. No. 742186, Jun. 28, 2018, 4 pages.
First Examination Report, New Zealand App. No. 743604, Jul. 10, 2018, 5 pages.
First Examination Report, New Zealand Patent App. No. 728719, May 31, 2017, 4 pages.
First Examination Report, NZ App. No. 622137, Aug. 28, 2014, 2 pages.
First Examination Report, NZ App. No. 701691, Feb. 10, 2016, 4 pages.
First Examination Report, NZ App. No. 751530, Oct. 18, 2019, 3 pages.
First Examination Report, NZ App. No. 757995, Nov. 1, 2019, 2 pages.
First Examination Report,, AU Patent App. No. AU2011323559, Sep. 30, 2015, 3 pages.
First Office Action and Search report, Chinese Patent App. No. 201380026522.2, Mar. 27, 2017, 20 pages.
First Office Action and Search Report, Chinese Patent App. No. 201480016091.6, Apr. 25, 2018, 17 pages.
First Office Action and Search Report, CN App. No. 201210466082.X, Apr. 3, 2015, 26 pages.
First Office Action and Search Report, CN App. No. 201580007666.2, Jan. 11, 2019, 13 pages.
First Office Action and Search Report, CN App. No. 201580019760.X, Jun. 5, 2019, 12 pages (6 pages of English Translation and 6 pages of Original Document).
First Office Action and Search Report, TW App. No. 100139880, Feb. 26, 2016, 27 pages.
First Office Action Report, Chinese Patent App. No. 201310407419.4, Nov. 20, 2015, 8 pages.
First Office Action, EP Patent App. No. 10784126.4, Dec. 17, 2015, 7 pages.
First Office Action, EP Patent App. No. 12762167.0, Jan. 4, 2016, 4 pages.
First Office Action, EP Patent App. No. 201380035543.0, Feb. 15, 2016, 8 pages.
First Office Action, JP Patent App. No. JP2014264325, Nov. 12, 2015, 4 pages.
First Office Action, KR Patent App. No. 10-2015-7033311, Feb. 16, 2016, 12 pages.
First Office Action, MX Patent App. No. MX/a/2014/002900, Apr. 24, 2015, 3 pages.
First Office Action, MX Patent App. No. MXa2014013795, Nov. 1, 2016, 3 pages.
First Office Action, MX Patent App. No. MXa2014013795, Oct. 30, 2015, 7 pages.
First Office Action, RU Patent App. No. 2011131821, Jun. 26, 2015, 8 pages.
3GPP TSG-RAN WG1 #70, "Uplink timing advance", Qualcomm Incorporated, R1-123695, Aug. 13-17, 2012, 6 pages.
Notice of Allowance received for Israel Patent Application No. 291825, mailed on Jan. 2, 2024, 2 pages.
Notice of Allowance received for Taiwanese Patent Application No. 111133396, mailed on Dec. 26, 2023, 4 pages of Original Document Only.
Office Action received for Canadian Patent Application No. 2938253, mailed on Dec. 29, 2023 4 pages.
Office Action received for Canadian Patent Application No. 3170717, mailed on Nov. 27, 2023, 3 pages.
Office Action received for Chinese Patent Application No. 202210479592.4, mailed on Apr. 18, 2024, 12 pages of original document only.
Office Action received for Indian Patent Application No. 201947016714, mailed on Jan. 1, 2024, 1 page.
Office Action received for Indian Patent Application No. 3008/CHENP/2015, mailed on Jan. 5, 2024, 3 pages.
Office Action received for Indian Patent Application No. 5512/CHENP/2015, mailed on Oct. 16, 2023 1 page.
Office Action received for Indian Patent Application No. 8134/CHENP/2014, mailed on Jan. 8, 2024 5 pages.
Office Action received for Korean Patent Application No. 10-2022-7042645, mailed on Apr. 22, 2024, 6 pages (3 pages of English Translation and 3 pages of Original Document).
Office Action received for Taiwanese Patent Application No. 111107760, mailed on May 15, 2024, 9 pages (4 pages of English Translation and 5 pages of Original Document).
Office Action received for Taiwanese Patent Application No. 112109799, mailed on Dec. 28, 2023, 5 pages of Original Document Only.
European Application No. 24166023.2, Extended European Search Report mailed Jul. 19, 2024.
Office Action received for Brazil Patent Application No. 112019003824-8, mailed on Jul. 17, 2024, 4 pages of English translation Only.
Florian Kaltenberger, et al., www.FutureNetworkSummit.eu/2010, Relative Channel Reciprocity Calibration in MIMO/TDD Systems (2010), 10 pages.
Rice, Clayton W. Shepard, Argos: Practical Base Stations for Large-scale Beamforming Slides.
Florian Kaltenberger, et al., www.FutureNetworkSummit.eu/2010, Relative Channel Reciprocity Calibration in MIMO/TDD Systems (2010), 11 pages.
Rice University, Clayton W. Shepard, Argos: Practical Base Stations for Large-scale Beamforming Thesis, Apr. 2012.
120801-Shepard-MobiCom 12-Slides.
Rice University, www.youtube.com, Argos designed to feed data-hungry smartphones, https://www.youtube.com/watch?v=945wOceJmdw (retrieved Oct. 18, 2024).
ETSI, "Mobile Technologies GSM", Available Online at <http://www.etsi.org/WebSite/Technologies/gsm.asp>, Retreived on Aug. 14, 2014, 2 pages.
European Search Report and Search Opinion, EP App. No. 05254757.7, Sep. 13, 2005, 9 pages.
European Search Report and Search Opinion, EP App. No. 17844265.3, Feb. 21, 2020, 12 pages.
European Search Report and Search Opinion, EP App. No. 17864744.2, Aug. 14, 2020, 15 pages.
European Search Report, EP App. No. 10156954.9-2411, Sep. 2, 2010, 5 pages.
European Search Report, EP App. No. 19159810.1, Sep. 25, 2019, 8 pages.

(56) References Cited

OTHER PUBLICATIONS

Examination Report from counterpart AU Patent App. No. AU2014200745, Sep. 25, 2015, 3 pages.
Examination Report No. 1, AU App. No. 2012308632, Oct. 11, 2016, 3 pages.
Examination report No. 1, AU App. No. 2015214278, Jun. 5, 2018, 4 pages.
Examination report No. 1, AU App. No. 2015248161, Jul. 2, 2018, 5 pages.
Examination Report No. 1, AU App. No. 2019203120, Jul. 3, 2020, 4 pages.
Examination Report No. 1, AU App. No. 2020200070, Sep. 8, 2020, 4 pages.
Examination Report No. 2, AU App. No. 2012308632, Jun. 6, 2017, 5 pages.
Examination Report No. 2, NZ App. No. 761315, Aug. 5, 2020, 3 pages.
Examination Report No. 3, AU App. No. 2019200838, Aug. 4, 2020, 5 pages.
Examination report No. 4, AU App. No. 2013347803, Jan. 25, 2018, 6 pages.
Examination Report, AU App. No. 2016219662, Sep. 9, 2016, 2 pages.
Examination report, AU App. No. 2018241100, Sep. 27, 2019, 2 pages.
Examination Report, AU App. No. 2020201409, Apr. 16, 2021, 6 pages.
Examination report, Indian Patent App. No. 3496/CHENP/2013, Oct. 29, 2018, 7 pages.
Examination Report, NZ App. No. 622137, Dec. 21, 2016, 3 pages.
Examination Search Report, CA App. No. 2945987, Jan. 27, 2023, 3 pages.
Examiner Report, CA App. No. 2885817, Jul. 17, 2020, 5 pages.
Examiner's Report from counterpart AU Patent App. No. 2013256044, May 9, 2016, 2 pages.
Examiner's Report, CA App. No. 2539333, Dec. 4, 2012, 15 pages.
Examiner's Report, CA App. No. 28/656,772, Jan. 7, 2016, 3 pages.
Examiner's Report, CA App. No. CA2695799, Apr. 1, 2015, 4 pages.
Examiner's Report, CA App. No. 2892555, Sep. 15, 2020, 2 pages.
Extended European Search Report, EP App. No. 08798313.6, Nov. 14, 2012, 10 pages.
Extended European Search Report, EP App. No. 10156950.7, Nov. 6, 2012, 10 pages.
Extended European Search Report, EP App. No. 10184659.0, Nov. 29, 2012, 8 pages.
Extended European Search Report, EP App. No. 11838640.8, May 31, 2017, 15 pages.
Extended European Search Report, EP App. No. 18186156.8, Nov. 26, 2018, 7 pages.
Extended Search Report, EP App. No. 13843203.4, Feb. 15, 2016, 8 pages.
Extended Search Report, EP App. No. 13856705.2, Mar. 2, 2016, 10 pages.
Extended Search Report, EP App. No. 14770916.6, Jan. 24, 2017, 12 pages.
Extended Search Report, EP App. No. 14779084.4, Sep. 29, 2016, 8 pages.
Extended Search Report, EP App. No. 15746217.7, Jan. 22, 2018, 18 pages.
Extended Search Report, EP App. No. 15780522.7, Feb. 6, 2018, 13 pages.
Extended Search Report, EP App. No. EP13784690.3, Nov. 23, 2015, 4 pages.
Fakhereddin et al., "Combined effect of polarization diversity and mutual coupling on MIMO capacity," Proc. IEEE Antennas and Prop. Symp, 2003, vol. 2, pp. 495-498.
FCC, "Open commission meeting", Available Online at <http:reboot.fcc.govopen-meetings2010september>, Sep. 23, 2010, 3 pages.

FCC, Broadband action agenda, National Broadband Plan, Available Online at <http://www.broadband.gov/plan/national-broadband-plan-action-agenda.pdf>, 2010, pp. 1-8.
Federal Communications Commission, "Authorization of Spread Spectrum Systems under Parts 15 and 90 of the FCC Rules and Regulations", Jun. 1985, 18 pages.
Federal Communications Commission, "Evaluating Compliance with FCC Guidelines for Human Exposure to Radiofrequency Electromagnetic Fields," OET Bulletin 65, Ed. 97-01, Aug. 1997, 84 pages.
Fella Adlane, "Adaptive WiMAX Antennas: The promise of higher ROI," Available Online at <http:www.wimax.comcommentaryspotlightspotlight8-08-2005searchterm=Adlane Fella>, Printed on May 9, 2008, pp. 1-3.
Feng et al., "Self-organizing networks (SON) in 3GPP LTE", Nom or Research, May 2008, pp. 1-15.
Final Office Action with partial English translation, JP Patent App. No. 2005223345, Feb. 18, 2014, 23 pages.
Final Office Action, JP App. No. 2005-223345, May 12, 2011, 12 pages.
Final Office Action, U.S. Appl. No. 10/817,731, Jul. 9, 2008, 21 pages.
Jafar et al., "Channel Capacity and Beamforming for Multiple Transmit and Receive Antennas with Covariance Feedback," Proc. IEEE Int. Cont. on Comm, Jun. 2001, vol. 7, pp. 2266-2270.
Jafar et al., "Transmitter Optimization and Optimality of Beamforming for Multiple Antenna Systems," IEEE Trans Wireless Comm, Jul. 2004, vol. 3, No. 4, pp. 1165-1175.
Jakes W. C., Microwave Mobile Communications, IEEE Press, 1974, Table of Contents, 4 pages.
Jindal N., et al., "Dirty Paper Coding vs. TDMA for MIMO Broadcast Channels", IEEE Trans. on Information Theory, vol. 51, May 2005, pp. 1783-1794.
Jindal, N , "MIMO Broadcast Channels With Finite-Rate Feedback," IEEE Trans. on Info. Theory, vol. 52, pp. 5045-5060, Nov. 2006.
Jing J., et al. "A Downlink Max-SINR Precoding for Massive MIMO System," International Journal of Future Generation Communication and Networking, Jun. 2014, vol. 7 (3), pp. 107-116.
Jorswieck et al., "Channel Capacity and Capacity-Range of Beamforming in MIMO Wireless Systems under Correlated Fading with Covariance Feedback," IEEE Transactions on Wireless Communications, Sep. 2004, vol. 3, pp. 1543-1553.
Jose et al. "Pilot Contamination and Precoding in Multi-cell TDD Systems," IEEE Transactions on Wireless Communications, 2011, vol. 10, No. 8, pp. 2640-2651.
Jose J., "Channel Estimation and Linear Precoding in Multiuser Multiple-Antenna TDD Systems," IEEE Transactions on Vehicular Technology, 2011, vol. 60, No. 5, pp. 2102-2116.
Jungnickel et al., "Capacity of MIMO systems with closely spaced antennas", IEEE Comm. Lett., vol. 7, Aug. 2003, pp. 361-363.
Kamata et al., "Effects of IQ Imbalance and an Effective Compensation Scheme in the MIMO-OFDM Communication System," Proceedings of the 2005 Institute of Electronics, Information and Communication General Conference, Mar. 7, 2005, B-5-90, 5 pages.
Kang et al., "Water-Filling Capacity and Beamforming Performance of MIMO Systems With Covariance Feedback," IEEE Workshop on Signal Processing Advances in Wireless Communications, Jun. 2003, pp. 556-560.
Kannan et al., "Separation of cochannel signals under imperfect timing and carrier synchronization", IEEE Trans. Veh. Technol., vol. 50, No. 1, Jan. 2001, pp. 79-96.
Karakayali et al. "Network Coordination for Spectrally Efficient Communications in Cellular Systems," IEEE Wireless Communications Magazine, 2006, vol. 13, No. 4, pp. 56-61.
Karakayali et al., "On the Maximum Common Rate Achievable in a Coordinated Network," Proceedings of the International Conference on Communications (ICC'06), Mar. 3, 2006, vol. 9, pp. 1-6.
Kayama et al., "Demodulation Reference Signal Design and Channel Estimation for LTE-Advanced Uplink," Advances in Vehicular Networking Technologies, 2011, pp. 418-432.

(56) References Cited

OTHER PUBLICATIONS

Kellerman F. C., "LDPC OFDM Space-Time Multipath Fading Channel Results," Proceedings SPIE, Digital Wireless Communications, XP-002672064, 2003, vol. 5100, pp. 19-30.
Kent, Adrian, et al., "Quantum Tagging: Authenticating Location via Quantum Information and Relativistic Signaling Constraints". 2010, 9 pages. Phys. Rev. A84, 012326 (2011), DOI: 10.1103/PhysRevA.84.012326, arXiv: 1008.2147.
Kermoal et al., "A Stochastic MIMO Radio Channel Model With Experimental Validation," IEEE Journal on Selected Areas In Communications, 2002, vol. 20, No. 6, pp. 1211-1226.
Khaled N., et al., "Interpolation Based Multi-Mode Precoding for MIMO-OFDM Systems with Limited Feedback," IEEE Transactions on Wireless Communications, vol. 6 (3), Mar. 2007, pp. 1003-1013.
Knievel C, "Low Complexity Receiver for Large-MIMO Space Time Coded Systems", in Proc. IEEE VTC-Fall'2011, Sep. 2011, 5 pages.
Knievel C., et al., "On Particle Swarm Optimization for MIMO Channel Estimation", Article ID 614384, Journal of Electrical and Computer Engineering, 2012, vol. 2012, 10 pages.
Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Krim et al., "Two Decades of Array Signal Processing Research," IEEE Signal Proceedings Magazine, 1996, pp. 67-94.
Krishnan et al., "Cellular Systems with Many Antennas: Large System Analysis under Pilot Contamination," in Proceedings of the 50th Annual Allerton Conference on Communication, Control, and Computing, 2012, pp. 1220-1224.
Kumagawa et al., "A Study of Introducing Distributed Transmit Power Control to Distributed Antenna System," 2011, 30 pages.
Kumar et al. "Asymptotic Performance of Linear Receivers in MIMO Fading Channels", IEEE Information Theory Workshop, Feb. 19, 2009, 48 pages.
Lang et al., "Design and development of a 5.25 GHz software defined wireless OFDM communication platform", IEEE Communications Magazine, vol. 42, No. 6, Jun. 2004, pp. 6-12.
Lee et al., "Coordinated Multipoint Transmission and Reception in LTE-Advanced: Deployment Scenarios and Operational Challenges," IEEE Communications Magazine, Feb. 2012, pp. 148-155.
Lee et al., "Frequency-offset estimation for MIMO and OFDM systems using orthogonal training sequences", IEEE Trans. Veh. Technol., vol. 56, No. 1, Jan. 2007, pp. 146-156.
Lee et al., "MIMO Technologies in 3GPP LTE and LTE-Advanced," EURASIP Journal on Wireless Communications and Networking, 2009, 10 pages.
Lee et al., "Network Massive MIMO for Cell-Boundary Users: From a Precoding Normalization Perspective", IEEE Goblecom Workshops, 2012.
Lee J., "Introduction of LTE-Advanced DL/UL MIMO," Samsung Electronics, Sep. 2009, 18 pages.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Letter Restarting Period for Response from U.S. Appl. No. 13/233,006, nailed Apr. 15, 2016, 9 pages.
Li et al., "MIMO techniques in WiMAX and LTE: a feature overview", IEEE Communications Magazine, May 2010, pp. 86-92.
Li P., et al., Multiple Output Selection-LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53, No. 11, pp. 4173-4190.
Liang et al., "Block-iterative Generalized Decision Feedback Equalizers (BI-GDFE) for Large MIMO Systems: Algorithm Design and Asymptotic Performance Analysis," IEEE Transactions on Signal Processing, 2006, vol. 54, No. 6, pp. 2035-2048.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and Bi-GDFE Receivers for Large Multiple-Input Multiple-Output Channels," IEEE Transactions on Signal Processing, 2008, vol. 56 (8), pp. 3627-3637.
Lindstrom M., (Ericsson), "LTE-Advanced Radio Layer 2 and RRC Aspects," 3GPP TSG- RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4, No. 6, pp. 708-715.
Love D J., et al., "Grassmannian Beamforming for Multiple-Input Multiple-Output Wireless Systems", IEEE Trans. on Info. Theory special issue on MIMO Communication, 2003, vol. 49, pp. 2735-2747.
Love et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26, No. 8, pp. 1341-1365.
Love et al., "Like deck chairs on the Titanic: why spectrum reallocation won't avert the coming data crunch but technology might keep the wireless industry afloat", Feb. 2012, pp. 705-719.
Lozano A., et al., "Fundamental Limits of Cooperation", Mar. 2012, 27 pages.
Luise et al., "Carrier frequency acquisition and tracking for OFDM systems", IEEE Trans. Commun., vol. 44, No. 11, Nov. 1996, pp. 1590-1598.
Luise et al., "Low-complexity blind carrier frequency recovery for OFDM signals over frequency-selective radio channels," IEEE Transactions. Communications, 2002, vol. 50, No. 7, pp. 1182-1188.
Office Action, EP App. No. 10184659, Apr. 21, 2022, 6 pages.
Office Action, EP App. No. 10184659, Dec. 4, 2017, 5 pages.
Office Action, EP App. No. 10184659, Nov. 11, 2019, 5 pages.
Office Action, EP App. No. 10184659.0, Dec. 21, 2018, 4 pages.
Office Action, EP App. No. 10184659.0, Sep. 2, 2020, 5 pages.
Office Action, EP App. No. 12762167.0, Sep. 30, 2016, 6 pages.
Office Action, EP App. No. 13784690.3, Apr. 15, 2019, 4 pages.
Office Action, EP App. No. 13784690.3, Aug. 23, 2018, 6 pages.
Office Action, EP App. No. 13790935, Oct. 23, 2019, 8 pages.
Office Action, EP App. No. 13790935.4, Feb. 4, 2019, 11 pages.
Office Action, EP App. No. 13843203.4, Feb. 25, 2019, 6 pages.
Office Action, EP App. No. 13843203.4, Mar. 23, 2018, 5 pages.
Office Action, EP App. No. 13856705.2, Jul. 18, 2017, 5 pages.
Office Action, EP App. No. 14770916.6, Mar. 13, 2018, 5 pages.
Office Action, EP App. No. 15746217.7, Feb. 1, 2021, 10 pages.
Office Action, EP App. No. 15746217.7, Jan. 26, 2023, 6 pages.
Office Action, EP App. No. 15780522.7, Jun. 7, 2021, 8 pages.
Office Action, EP App. No. 15780522.7, Mar. 19, 2020, 6 pages.
Office Action, EP App. No. 17844265.3, May 10, 2021, 9 pages.
Office Action, EP App. No. 17864744.2, Oct. 27, 2022, 9 pages.
Office Action, EP App. No. 18186156.8, Jul. 30, 2019, 5 pages.
Office Action, EP App. No. 18186156.8, Jun. 12, 2020, 6 pages.
Office Action, EP App. No. 19159810.1, Oct. 4, 2021, 7 pages.
Office Action, IL App. No. 235518, Apr. 7, 2019, 4 pages.
Office Action, IL App. No. 241319, Nov. 26, 2019, 6 pages (3 pages of English Translation and 3 pages of Original Document).
Office Action, IL App. No. 248265, Feb. 26, 2020, 4 pages (2 pages of English Translation and 2 pages of Original Document).
Office Action, IL App. No. 248265, Oct. 25, 2018, 6 pages.
Office Action, IL App. No. 253541, Nov. 29, 2018, 4 pages.
Office Action, IL App. No. 269145, Jun. 16, 2020, 4 pages (2 pages of English Translation and 2 pages of Original Document).
Office Action, IL App. No. 270106, May 19, 2020, 8 pages (4 pages of English Translation and 4 pages of Original Document).
Office Action, IL App. No. 272481, Nov. 9, 2022, 6 pages (3 pages of English Translation and 3 pages of Original Document).

(56) References Cited

OTHER PUBLICATIONS

Office Action, JP App No 2019-168511, Dec. 24, 2020, 6 pages (3 pages of English Translation and 3 pages of Original Document).
Office Action, JP App. No. 2007-506302, Jan. 11, 2011, 5 pages.
Office Action, JP App. No. 20150162819, Oct. 3, 2016, 6 pages.
Office Action, JP App. No. 2016-550718, Jan. 10, 2019, 4 pages.
Office Action, JP App. No. 2016-562961, Feb. 6, 2020, 7 pages (4 pages of English Translation and 3 pages of Original Document).
Office Action, JP App. No. 2018-222367, Jun. 8, 2020, 7 pages (4 pages of English Translation and 3 pages of Original Document).
Office Action, JP App. No. 2019-039195, Jun. 17, 2019, 8 pages (4 pages of English Translation and 4 pages of Original Document).
Office Action, JP App. No. 2019-093904, Jul. 6, 2020, 6 pages (3 pages of English Translation and 3 pages of Original Document).
Office Action, JP App. No. 2019-238040, Feb. 25, 2021, 7 pages (4 pages of English Translation and 3 pages of Original Document).
Office Action, JP Patent App. No. 2012-057351, Jul. 1, 2013, 6 pages.
Office Action, JP Patent App. No. 2012-057351, Mar. 10, 2014, 2 pages.
Office Action, JP Patent App. No. 2013-156855, Apr. 17, 2015, 6 pages.
Office Action, JP Patent App. No. 2013-537753, Sep. 7, 2015, 9 pages.
Office Action, KR App. No. 10-2014-7035524, Oct. 21, 2019, 11 pages (6 pages of English Translation and 5 pages of Original Document).
Office Action, KR App. No. 10-2015-7028298, Jul. 27, 2020, 14 pages (8 pages of English Translation and 6 pages of Original Document).
Office Action, KR App. No. 10-2015-7029455, Jul. 27, 2020, 14 pages (8 pages of English Translation and 6 pages of Original Document).
Office Action, KR App. No. 1020107006265, Jul. 29, 2014, 10 pages.
Office Action, KR Patent App. No. 20050070079, Jul. 29, 2011, 3 pages.
Office Action, KR Patent App. No. 2015-7002560, May 21, 2015, 10 pages.
Valkama et al., "Advanced methods for 1/Q imbalance compensation in communication receivers," IEEE Transactions on Signal Processing, vol. 49, No. 10, 2001, pp. 2335-2344.
Van De Beek et al., "ML estimation of time and frequency offset in OFDM systems", Signal Processing, IEEE Transactions on [see also Acoustics, Speech, and Signal Processing, IEEE Transactions, vol. 45, No. 7, Jul. 1997, pp. 1800-1805.
Van et al., "Beamforming: A Versatile Approach to Spatial Filtering," IEEE ASSP Magazine, 1988, pp. 4-24.
Vance, A., "Steve Perlman's wireless fix", Businessweek, Available Online at <http://www.businessweek.com/magazine/the-edison-of-silicon-valley-727-2011.html>, Jul. 2011, 10 pages.
Vaughan R. G., "On Optimum Combining at the Mobile," IEEE Transactions on Vehicular Technology, Nov. 1988, vol. 37, No. 4, pp. 181-188.
Vaughn R., et al., "Switched parasitic elements for antenna diversity," IEEE Transactions on Antennas and Propagation, 1999, vol. 47, pp. 399-405.
Venkatesan et al., "A WiMAX-Based Implementation of Network MIMO for Indoor Wireless Systems," EURASIP Journal on Advances in Signal Processing, 2009, vol. 2009, 11 pages.
Venkatesan et al., "Network MIMO: Overcoming InterCell Interference In Indoor Wireless Systems," Asilomar Conference on Signals, 2007, vol. 2007, pp. 83-87.
Vieira et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.
Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.

Visotsky E., et al., "Space-Time Transmit Precoding with Imperfect Feedback," IEEE Transactions on Information Theory, 2001, vol. 47, pp. 2632-2639.
Visuri et al"Colocated Antenna Arrays: Design Desiderata for Wireless Communications," 2002, vol. 2002, pp. 580-584.
Viswanath et al., "Opportunistic beamforming using dump antennas," IEEE Transactions on Information Theory, 2002, vol. 48, pp. 1277-1294.
Viswanath, "Sum Capacity of the Vector Gaussian Broadcast Channel and Uplink-Downlink Duality," IEEE Transactions on Information Theory, 2003, vol. 49, No. 8, pp. 1912-1921.
Wagner et al., "Large System Analysis of Linear Precoding in MISO Broadcast Channels with Limited Feedback," IEEE Transactions on Information Theory, 2012, vol. 58, No. 7, pp. 4509-4537.
Waldschmidt et al., "Compact MIMO-arrays based on polarisation-diversity", Proc. IEEE Antennas and Prop. Symp., 2003, vol. 2, pp. 499-502.
Waldschmidt et al., "Complete RF system model for analysis of compact MIMO arrays," IEEE Trans. on Vehicular Technologies, 2004, vol. 53, pp. 579-586.
Wallace et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.
Wallace et al., "Termination-dependent diversity performance of coupled antennas: Network theory analysis,", IEEE Trans. Antennas Propagat., vol. 52, Jan. 2004, pp. 98-105.
Wang Z., "Performance of Uplink Multiuser Massive MIMO system," International Conference on Acoustics Speech and Signal Processing, Florence, Italy, Nov. 6, 2013, 5 pages.
Wang Z., et al., "Enhanced downlink MU-Comp schemes for TD-LTE-Advanced," Wireless Communications and Networking Conference (WCNC), IEEE, 2010, 6 pages.
Wannstrom J., "Carrier Aggregation Explained," 3GPP, Available Online at <http://www.3gpp.org/Carrier-Aggregation-explained>, Jun. 2013, 6 pages.
Warrington et al. "Measurement and Modeling of HF Channel Directional Spread Characteristics for Northerly Paths", Radio Science, vol. 41, RS2006, DOI: 10.1029/2005RS003294, 2006, pp. 1-13.
Webpass, Buildings online, Available Online at <http://www.webpass.net/buildings?city=san+francisco&column=address&order=asc>, Retrieved on Sep. 4, 2015, 3 pages.
Weedon W.H., et al., "MEMS—switched reconfigurable antennas", IEEE Antennas and Propagation Society, AP-S International Symposium (Digest), vol. 3, 2001, pp. 654-657.
Wen et al.,"On the Sum-Rate of Multiuser MIMO Uplink Channels with Jointly-Correlated Rician fading", IEEE Trans. Commun., 2011, vol. 59, No. 10, pp. 2883-2895.
Wenck et al., "Asymptotic Mutual Information for Rician MIMO-MA Channels with Arbitrary Inputs: A Replica Analysis", IEEE Trans. Commun., 2010, vol. 58, No. 10, pp. 2782-2788.
Wennestrom et al., "An Antenna Solution for MIMO Channels: The Switched Parasitic Antenna," IEEE International Symposium on Personal, Indoor and Mobile Radio Communications, PIMRC, vol. 1, 2001, pp. 159-163.
Werner, Kari, et al., "LTE-Advanced 8×8 MIMO Measurements in an Indoor Scenario", Proceedings of ISAP2012, Nagoya, Japan, Oct. 29, 2012, pp. 750-753.
Werner, Karl, et al., "LTE-Advanced 8×8 MIMO Measurements in an Indoor Scenario", Proceedings of ISAP2012, Nagoya, Japan, Oct. 29, 2012, pp. 750-753.
Wheeler et al., "Small antennas," IEEE Transactions on Antennas and Propagation, 1975, vol. AP-23, No. 4, pp. 462-469.
Wi-Fi alliance, Homepage, Available Online at <www.wi-fi.org>, Retrieved on Aug. 14, 2014, pp. 1-3.
Wikipedia, "Advanced Mobile Phone System", Available Online at <https://en.wikipedia.org/wiki/AdvancedMobilePhoneSystem>, 2014, 6 pages.
Wikipedia, "IS-95" Available Online at <http:en.wikipedia.orgwikiIS-95>, 2014, 6 pages.
WiMAX forum, Available Online at <http://www.wimaxforum.org/>, Aug. 14, 2014, 1 page.

(56) References Cited

OTHER PUBLICATIONS

Wired, Has OnLive's Steve Perlman Discovered Holy Grail of Wireless?, Jun. 30, 2011 Retrieved from the Internet: http:www.wired.comepicenter201106perlman-holy-grail-wireless.
Wong et al., "A joint-channel diagonalization for multiuser MIMO antenna systems", IEEE Trans. Wireless Comm., vol. 2, Jul. 2003, pp. 773-786.
Wong et al., "Exploiting Spatia-Temporal Correlations in MIMO Wireless Channel Prediction," Dec. 2006, IEEE Globecom Conference, 5 pages.
Wong et al., "Joint Channel Estimation and Prediction for OFDM Systems," Proceedings in IEEE Global Telecommunications Conference, St. Louis, MO, 2005, pp. 2255-2259.
Wong et al., "Long Range Channel Prediction for Adaptive OFDM Systems," Proceedings IEEE Asilomar Conf. on Signals, Systems, and Computers, vol. 1, Nov. 7-10, 2004, pp. 723-736.
Wong et al., "Performance Enhancement of Multiuser MIMO Wireless Communication Systems," IEEE Transactions on Communications, vol. 50, No. 12, Dec. 2002, pp. 1960-1970.
Written Opinion, BR App. No. 112014027631-5, Jun. 18, 2020, 4 pages of Original document only.
Written Opinion, BR App. No. 112014028207, Jul. 21, 2021, 10 pages (5 pages of English Translation and 5 pages of Original document).
Written Opinion, BR App. No. 112015022911-5, Jul. 22, 2020, 4 pages of Original Document Only.
Written Opinion, BR App. No. 112015023223-0, Jul. 22, 2020, 5 pages of Original Document Only.
Wu et al., "Approximate Matrix Inversion for High-Throughput Data Detection in the Large-scale MIMO Uplink," IEEE International Symposium on Circuits and Systems (ISCAS), May 2013, pp. 2155-2158.
Xiao et al., "A Comparative Study of MIMO Capacity with Different Antenna Topologies," IEEE ICCS'02, vol. 1, Nov. 2002, pp. 431-435.
Xu J., "LTE-Advanced Signal Generation and Measurements using SystemVue," Agilent Technologies, Dec. 23, 2010, 46 pages.
Yang et al., "On the Capacity of Large-MIMO Block-Fading Channels," IEEE Journal on Selected Areas in Communications, vol. 31, No. 2, Feb. 2012, pp. 117-132.
Yin et al., "A Coordinated Approach to Channel Estimation in Large-scale Multiple-antenna Systems", IEEE Journal on Selected Areas in Communications, vol. 31, No. 2, Mar. 2012, pp. 264-273.
Notice of Reasons for Rejection, JP App. No. 2016-234908, Nov. 22, 2018, 10 pages.
Notice of Reasons for Rejection, JP Patent App. No. 20150510498, Sep. 26, 2016, 21 pages.
Notice of Reasons for Rejection, JP Patent App. No. 2016-501744, Mar. 5, 2018, 15 pages.
Notice of Reasons for Rejection, KR App. No. 10- 2014-7009876, Mar. 25, 2019, 11 pages.
Notice to File a Response, KR App. No. 10-2018-7035654, Dec. 14, 2018, 10 pages.
Notification for Granting Patent Right, Chinese Patent App. No. 201180061132.X, Apr. 6, 2017, 6 pages.
Notification of Reason for Refusal, KR App. No. 10-2019-7014768, Jun. 27, 2019, 10 pages (5 pages of English Translation and 5 pages of Original Document).
Notification of Reason for Refusal, KR App. No. 10-2021-7002823, Apr. 14, 2021, 06 pages (03 pages of English Translation and 03 pages of Original Document).
Notification of Reason for Refusal, KR. App. No. 10-2016-7031260, Dec. 4, 2020, 12 pages (7 pages of English Translation and 5 pages of Original Document).
Notification of Reasons for Refusal, JP Patent App. No. 2017-112639, Aug. 13, 2018, 4 pages.
Notification of the 1st Substantive requirement, MX App. No. MX/A/2017/002906, Sep. 13, 2019, 6 pages (3 pages of English Translation and 3 pages of Original Document).
Notification of the 2nd Substantive requirement, MX App. No. MX/A/2017/002906, Jul. 15, 2020, 10 pages (5 pages of English Translation and 5 pages of Original Document).
Notification on Grant of Patent Right for Invention, CN App. No. 201210466082.X, Jan. 26, 2017, 3 pages.
Oberli et al., "Maximum likelihood tracking algorithms for MIMOOFDM, in Communications," IEEE International Conference on Networking, Jun. 20-24, 2004, vol. 4, pp. 2468-2472.
Oday, "Measured Path Loss and Multipath Propagation Characteristics in UHF and Microwave Frequency Bands for Urban Mobile Communications," IEEE, 2001, pp. 337-341.
Office Action and Examination Search Report, CA App. No. 2885817, Jul. 16, 2019, 4 pages.
Office Action and Examination Search Report, CA App. No. 2904981, May 3, 2019, 6 pages.
Office Action and Search Report, Chinese Patent App. No. CN201380035543, Jan. 3, 2017, 22 pages.
Office Action and Search Report, CN App. No. 201780052444.1, Sep. 20, 2022, 20 pages (11 pages of English Translation and 9 pages of Original Document).
Office Action and Search Report, RU App. No. 2016144927/08(072072), Oct. 30, 2018, 12 pages.
Office Action and Search Report, RU Patent App. No. 2014148791/28(078479), Apr. 13, 2017, 14 pages.
Office Action and Search Report, RU Patent App. No. 2015143188/07, Dec. 15, 2017, 13 pages.
Office Action and Search Report, TW App. No. 103107541, Dec. 6, 2017, 15 pages.
Office Action and Search Report, TW App. No. 107123446, Aug. 8, 2019, 27 pages (10 pages of English Translation and 17 pages of Original Document).
Office Action and Search Report, TW Patent App. No. 105143637, Jan. 19, 2018, 12 pages.
Office Action for EP App. No. 08798313.6, May 2, 2017, 7 pages.
Office Action for EP App. No. 10156950.7, May 9, 2017, 9 pages.
Office Action, Au App. No. 2004203336, Jun. 5, 2009, 2 pages.
Office Action, AU App. No. 2019202296, May 12, 2020, 5 pages.
Office Action, CA App. No. 2514383, Jul. 26, 2012, 3 pages.
Office Action, CA App. No. 2816556, May 19, 2020, 3 pages.
Office Action, CA App. No. 2816556, May 30, 2019, 3 pages.
Office Action, CA App. No. 2945987, Apr. 13, 2021, 3 pages.
Office Action, CA App. No. 3025857, Dec. 8, 2020, 5 pages.
Office Action, CN App. No. 200510088676.1, Feb. 5, 2010, 18 pages.
Office Action, CN App. No. 200510088676.1, Jan. 25, 2011, 8 pages.
Office Action, CN App. No. 200510088676.1, Mar. 20, 2009, 24 pages.
Office Action, CN App. No. 200510088676.1, Oct. 26, 2010, 4 pages.
Office Action, CN App. No. 200880102933.4, Dec. 7, 2012, 20 pages.
Office Action, CN App. No. 201380061515.6, Apr. 23, 2019, 2 pages.
Office Action, CN Patent App. No. 201180061132.X, May 27, 2015, 6 pages.
Office Action, CN Patent App. No. 201180061132.X, Oct. 10, 2016, 11 pages.
Office Action, EP App. No. 05254757.7, Dec. 3, 2012, 6 pages.
Office Action, EP App. No. 05254757.7, Dec. 21, 2018, 4 pages.
Office Action, EP App. No. 05254757.7, Apr. 21, 2022, 6 pages.
Office Action, EP App. No. 05254757.7, Nov. 11, 2019, 5 pages.
Office Action, EP App. No. 05254757.7, Sep. 2, 2020, 5 pages.
Office Action, EP App. No. 08798313.6, Oct. 24, 2017, 8 pages.
Office Action, EP App. No. 10156950.7, Dec. 12, 2017, 9 pages.
Office Action, EP App. No. 10156950.7, Jan. 7, 2020, 6 pages.
Non-Final Office Action, U.S. Appl. No. 12/802,988, Apr. 12, 2013, 45 pages.
Non-Final Office Action, U.S. Appl. No. 12/802,988, Jun. 26, 2015, 17 pages.
Non-Final Office Action, U.S. Appl. No. 12/802,988, Mar. 24, 2014, 11 pages.

(56) References Cited

OTHER PUBLICATIONS

Non-Final Office Action, U.S. Appl. No. 12/802,989, Nov. 25, 2014, 17 pages.
Non-Final Office Action, U.S. Appl. No. 12/802,989, Nov. 26, 2013, 27 pages.
Non-Final Office Action, U.S. Appl. No. 13/232,996, Apr. 11, 2013, 23 pages.
Non-Final Office Action, U.S. Appl. No. 13/232,996, Jun. 24, 2015, 15 pages.
Non-Final Office Action, U.S. Appl. No. 13/233,006, Apr. 1, 2016, 9 pages.
Non-Final Office Action, U.S. Appl. No. 13/233,006, Apr. 16, 2013, 9 pages.
Non-Final Office Action, U.S. Appl. No. 13/233,006, Apr. 28, 2017, 10 pages.
Non-Final Office Action, U.S. Appl. No. 13/233,006, Jul. 11, 2018, 29 pages.
Non-Final Office Action, U.S. Appl. No. 13/233,006, Jun. 4, 2015, 12 pages.
Non-Final Office Action, U.S. Appl. No. 13/233,006, Sep. 12, 2013, 6 pages.
Non-Final Office Action, U.S. Appl. No. 13/233,006, Sep. 24, 2014, 9 pages.
Non-Final Office Action, U.S. Appl. No. 13/461,682, Feb. 25, 2014, 37 pages.
Non-Final Office Action, U.S. Appl. No. 13/464,648, Feb. 14, 2014, 11 pages.
Non-Final Office Action, U.S. Appl. No. 13/475,598, Mar. 23, 2015, 14 pages.
Non-Final Office Action, U.S. Appl. No. 13/633,702, Dec. 17, 2013, 21 pages.
Non-Final Office Action, U.S. Appl. No. 13/844,355, Jan. 8, 2015, 23 pages.
Non-Final Office Action, U.S. Appl. No. 14/023,302, Jul. 17, 2014, 37 pages.
Non-Final Office Action, U.S. Appl. No. 14/086,700, Apr. 2, 2015, 12 pages.
Non-Final Office Action, U.S. Appl. No. 14/611,565, Aug. 31, 2015, 21 pages.
Non-Final Office Action, U.S. Appl. No. 14/611,565, Mar. 14, 2017, 23 pages.
Non-Final Office Action, U.S. Appl. No. 14/672,014, Dec. 30, 2016, 7 pages.
Non-Final Office Action, U.S. Appl. No. 14/672,014, Jun. 14, 2018, 129 pages.
Non-Final office action, U.S. Appl. No. 15/057,002, Oct. 23, 2017, 60 pages.
Non-Final Office Action, U.S. Appl. No. 15/201,276, Jan. 25, 2018, 77 pages.
Non-Final Office Action, U.S. Appl. No. 15/201,276, Mar. 1, 2017, 107 pages.
Non-Final Office Action, U.S. Appl. No. 15/340,914, Apr. 25, 2018, 15 pages.
Non-Final Office Action, U.S. Appl. No. 15/340,914, Jul. 21, 2017, 114 pages.
Non-Final Office Action, U.S. Appl. No. 15/616,817, Nov. 1, 2017, 14 pages.
Non-Final Office Action, U.S. Appl. No. 16/436,864, Mar. 4, 2020, 6 pages.
Notice of Acceptance from foreign counterpart Australian Patent Application No. 20160219662, dated May 5, 2017, 3 pages.
Notice of Acceptance from foreign counterpart Australian Patent Application No. AU20140200745, dated Sep. 19, 2016, 3 page.
Notice of Acceptance from foreign counterpart New Zealand Patent Application No. 610463 dated Aug. 5, 2015, 1 page.
Notice of Acceptance from foreign counterpart New Zealand Patent Application No. 717370, dated Jan. 10, 2018, 1 page.
Notice of Acceptance, AU App. No. 2012308632, Sep. 13, 2017, 4 pages.
Notice of Acceptance, AU App. No. 2017210619, Oct. 14, 2019, 4 pages.
Notice of Acceptance, AU App. No. 2017350850, Aug. 10, 2022, 4 pages.
Notice of Acceptance, AU App. No. 2018201553, Nov. 14, 2019, 4 pages.
Notice of Acceptance, AU App. No. 2018253582, Nov. 18, 2019, 3 pages.
Notice of Acceptance, AU Patent App. No. 2013327697, Feb. 15, 2017, 4 pages.
Notice of Acceptance, AU Patent App. No. 2014248533, Jun. 28, 2017, 4 pages.
Notice of Acceptance, New Zealand Patent App. No. 729017, Jun. 28, 2018, 1 page.
Notice of Acceptance, NZ App. No. 738000, Jun. 4, 2019, 1 page.
Notice of Acceptance, NZ App. No. 751530, May 1, 2020, 2 pages.
Notice of Allowance and Search Report, TW Patent App. No. 102134408, Feb. 17, 2017, 9 pages.
Notice of Allowance from counterpart MX Patent App. No. MX/a/2014/002900, Nov. 26, 2015, 4 pages. Translation attached.
Notice of Allowance, U.S. Appl. No. 12/802,976, Mar. 14, 2011, 9 pages.
Notice of Allowance, AU Patent App. No. 2011323559, May 13, 2016, 2 pages.
Rao et al., "Multi-antenna testbeds for research and education in wireless communications", IEEE Communications Magazine, vol. 42, No. 12, Dec. 2004, pp. 72-81.
Rapajic et al., Information Capacity of Random Signature Multiple-Input Multiple Output Channel, IEEE Trans. Commun., 2000, vol. 48, No. 8, pp. 1245-1248.
Rappaport, T, Wireless Communications, Principles and Practice, Second Edition, Prentice Hall, 2002, ISBN 0-13-042232-0, Cover page, Title page, Table of Contents, 13 pages.
Ravindran N., et al., "MIMO Broadcast Channels with Block Diagonalization and Finite Rate Feedback", IEEE, ICASSP Apr. 2007, pp. 111-113-111-16.
Reconfigurable Radio Systems (RRS), Radio Base Station (RBS), Software Defined Radio (SOR), Status Implementations and Costs Aspects Including Future Possibilities, Technical Report, ETSI, No. V1.1.1, 2009, 24 pages.
Rejection Decision, JP Patent App. No. JP2014264325, Oct. 3, 2016, 7 pages.
Requirement for Restriction/Election, U.S. Appl. No. 15/792,610, Nov. 29, 2018, 7 pages.
Requirement for Restriction/Election, U.S. Appl. No. 15/792,610, Jun. 11, 2018, 6 pages.
Riegler et al., "Asymptotic Statistics of the Mutual Information for Spatially Correlated Rician Fading MIMO Channels with Interference", IEEE Trans. Inform. Theory, 2010, vol. 56, No. 4, pp. 1542-1559.
Robinson, S., "Toward an Optimal Algorithm for Matrix Multiplication," Nov. 2005, vol. 38, No. 9, 3 pages.
Ruckus wireless, "Long-range 802.11 n Wi-Fi point-to-pointmultipoint backhaul," Sep. 4, 2015, 2 pages, Retrieved from the Internet:<URL: http:www.ruckuswireless.comproductszaneflex-outdoor7731>.
Rusek et al., "Scaling up MIMO: Opportunities and Challenges with Very Large Arrays", IEEE Signal Proces. Mag., Jan. 2012, vol. 30, No. 1, pp. 1-30.
Rysavy P., "No. silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.
Saleh et al., "A Statistical Model for Indoor Multipath Propagation", Institute of Electrical and Electronics Engineers Journal on Selected Areas in Communications, 1987, vol. SAC-5 (2), pp. 128-137.
Samsung, "Discussion on open-loop CoMP schemes", 3GPP TSG RAN WG1 #58, R1-093377, 3rd Generation Partnership Project, (3GPP), Aug. 24-28, 2009, pp. 1-4.
Schafhuber D et al., "MMSE and Adaptive Prediction of Time-Varying Channels for OFDM Systems", IEEE Trans. Wireless Commun., 2005, vol. 4, No. 2, pp. 593-602.

(56) References Cited

OTHER PUBLICATIONS

Schmidl et al., "Robust frequency and timing synchronization for OFDM", IEEE Trans. Commun., vol. 45, No. 12, Dec. 1997, pp. 1613-1621.
Schubert M., et al., "Joint 'Dirty Paper' Pre-Coding and Downlink Beamforming," Spread Spectrum Techniques and Applications, 2002 IEEE Seventh International Symposium, Dec. 2002, vol. 2, pp. 536-540.
Schuchert et al., "A novel I/O imbalance compensation scheme for the reception of OFDM signals," IEEE Transaction on Consumer Electronics, 2001, pp. 313-318.
Search Report and Written Opinion, BR App. No. 112015012165-9, Jul. 16, 2021, 8 pages (4 pages of English Translation and 4 pages of Original Document).
Second Examination Report, AU App. No. 2017210619, May 31, 2019, 4 pages.
Second Office Action and Search Report, Chinese Patent App. No. 201180061132.X, Mar. 11, 2016, 11 pages.
Second Office Action and Search report, Chinese Patent App. No.201280044869.5, Jan. 17, 2017, 19 pages.
Second Office Action and Search Report, CN App. No. 201580007666. 2, Jul. 30, 2019, 8 pages (4 pages of English Translation and 4 pages of Original Document).
Second Office Action, CN App. No. 201780066182.4, May 7, 2021, 13 pages (9 pages of English Translation and 4 pages of Original Document).
Second Office Action, MX App. No. MX/a/2014/013795, Feb. 3, 2016, 7 pages.
Second Office Action, ON App. No. 201780066182.4, May 7, 2021, 13 pages (9 pages of English Translation and 4 pages of Original Document).
Serpedin et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, Aug. 2000, pp. 2389-2405.
Sharif et al., "On the capacity of MIMO broadcast channel with partial side information," IEEE Trans. Info. Th, Feb. 2005, vol. 51, No. 2, pp. 506-522.
Shen et al., "Low complexity user selection algorithms for multiuser MIMO systems with block diagonalization," IEEE Transactions on Signal Processing, 2005, pp. 1-12.
Shen Z., et al., "Sum capacity of multiuser MIMO broadcast channels with block diagonalization," IEEE Trans. Wireless Comm, 2005, 5 pages.
Shepard C., Argos: Practical Many-Antenna Base Stations, in Proc. ACM Int. Conf. Mobile Computing and Networking (MobiCom), Aug. 2012, 12 pages.
Shepard C., ArgosV2: A Flexible Many-Antenna Research Platform, Extended Abstract for demonstration in Proc. ACM Int. Conf. Mobile Computing and Networking (MobiCom), Oct. 2013, 3 pages.
Shi et al., "Coarse frame and carrier synchronization of OFDM systems: a new metric and comparison", IEEE Trans. Wireless Commun., vol. 3, No. 4, Jul. 2004, pp. 1271-1284.
Shiu et al., "Fading correlation and its effect on the capacity of multielement antenna systems," IEEE Trans. Comm, 2000, vol. 48, No. 3, pp. 502-513.
Shuangqing Wei et al., "On the Asymptoticcapacity of Mimo Systems With Fixed Length Linear Antenna Arrays," IEEE International Conference on Communications, 2003, vol. 4, pp. 2633-2637.
Simon et al., "Digital Communication Over Fading Channels", A Unified Approach to Performance Analysis, Wiley Series in Telecommunications and Signal Processing, 2000, 10 pages.
Simon et al., "Optimizing MIMO Antenna Systems with Channel Covariance Feedback," IEEE Journal on Selected Areas in Communications, 2003, vol. 2003, pp. 406-417.
Spencer et al., "Adaptive Antennas and MIMO Systems for Wireless Communications—An Introduction to the Multi-User MIMI Downlink", IEEE Communications Magazine, Oct. 2004, pp. 60-67.
Spencer et al., "Zero-forcing methods for downlink spatial multiplexing in multiuser MIMO channels," IEEE Trans. Sig. Proc, 2004, vol. 52, pp. 461-471.
Srinidhi et al., "Layered Tabu Search Algorithm for Large-MIMO Detection and a Lower Bound on ML Performance," IEEE Trans. Commun, 2010, 5 pages.
Stancil et al., "Doubling wireless channel capacity using co-polarised, co-located electric and magnetic dipoles", Electronics Letters, 2002, vol. 38, No. 14, pp. 746-747.
Stanley M., "Mobile Data Wave: Who Dares to Invest, Wins," Jun. 13, 2012, 23 pages.
Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.
Stevanovic et al., "Smart Antenna Systems for Mobile Communications", Final Report, Laboratoire d'Electromagnetisme et d'Acoustique, Ecole Polytechnique Federale de Lausanne, CH-1015 Lausanne Suisse, Jan. 2003, 120 pages.
Stoytchev et al., "Compact antenna arrays for MIMO applications," IEEE Proc. IEEE Antennas and Prop. Symp., 2001, vol. 3, pp. 708-711.
Strangeways H., "Determination of The Correlation Distance For Spaced Antennas on Multipath HF Links and Implications for Design of SIMO and MIMO Systems," School of Electronic and Electrical Engineering, University of Leeds, IEEE First European Conf. on Antennas and Prop., 2005, 12 pages.
Strangways H.J., "Investigation of signal correlation for spaced and co-located antennas on multipath HF links and implications for the design of SIMO and MIMO system," IEEE First European Conf. on Antennas and Propagation (EuCAP 2006), Nov. 2006, pp. 1-6.
Strohmer et al., "Application of Time-Reversal with MMSE Equalizer to UWB Communications", Proc. of IEEE Globecom, vol. 5, Nov. 2004, pp. 3123-3127.
Studer et al., "PAR-Aware Large-Scale Multi-User MIMO-OFDM Downlink", IEEE J. Sel. Areas Commun., Sep. 4, 2012, vol. 31, No. 2, pp. 303-313.
Yin et al., "Full-Duplex in Large-Scale Wireless System," Proceeding of the Asilomar Conference on Signals, Systems and Computers, Nov. 2013, 5 pages.
Yin et al., "Implementation trade-offs for linear detection in large-scale MIMO systems," Proceeding Institute of Electrical and Electronics Engineers International Conference on Acoustics Speech, and Signal Processing, May 2013, 5 pages.
Yoo et al., "Multi-Antenna Downlink Channels with Limited Feedback and User Selection," IEEE Journal on Selected Areas in Communications, Sep. 2007, vol. 25, No. 7, pp. 1478-1491.
Yoshida, Susumu, "Coherent Coordinated Multipoint Transmission Techniques for Wireless Distributed Networks", Kyoto University, Available Online at <www.soumu.go.jp/main_content/000256555. pdf>, 2013, 5 pages (3 pages of English Translation and 2 pages of Original Document).
Yu et al., "Sum Capacity of Gaussian Vector Broadcast Channels", IEEE Transactions on Information Theory, vol. 50, No. 9, Sep. 2004, pp. 1875-1892.
Yu et al., "Trellis Precoding for the Broadcast Channel," IEEE Globecom, 2001, vol. 2, pp. 1344-1348.
Zaidel et al., "Vector Precoding for Gaussian MIMO Broadcast Channels: Impact of Replica Symmetry Breaking", Institute of Electrical and Electronics Engineers Transactions on Information Theory, Mar. 2012, vol. 58, No. 3, pp. 1413-1440.
Zakhour et al., "Min-Max Fair Coordinated Beamforming via Large Systems Analysis,", in Proc. of the IEEE International Symposium on Information Theory, St. Petersburg, Jul. 2011, pp. 1990-1994.
Zamir et al., "Capacity and lattice-strategies for cancelling known interference," Proceedings of International Symposium on Information Theory, Honolulu, Hawaii, Nov. 2000, pp. 1-32.
Zetterberg, Per, "Experimental Investigation of TDD Reciprocity based Zero-Forcing Transmit Precoding", EURASIP Journal on Advances in Signal Processing, vol. 2011, Article ID 137541, Jun. 2010, 11 pages.

(56) References Cited

OTHER PUBLICATIONS

Zhang et al. "On Capacity of Large-Scale MIMO Multiple Access Channels with Distributed Sets of Correlated Antennas," IEEE Journal on Selected Areas in Communications, Sep. 26, 2012, vol. 31, No. 2, pp. 1-52.
Zhang et al., "Cochannel Interference Mitigation and Cooperative Processing in Downlink Multicell Multiuser MIMO Networks," EURASIP Journal on Wireless Communications and Networking, vol. 2004, No. 2, Jul. 2004, pp. 222-235.
Zhang et al., "Coordinated Multi-Cell MIMO Systems With Cellular Block Diagonalization", IEEE 2007, pp. 1669-1673.
Zhang et al., "Electromagnetic Lens-focusing Antenna Enabled Massive MIMO", Jun. 6, 2013, pp. 1-7.
Zhang et al., "Hermitian Precoding for Distributed MIMO Systems with Individual Channel State Information," IEEE Journal on Selected Areas in Communications, 2013, vol. 31, No. 2, pp. 241-250.
Zhang et al., "Networked MIMO with Clustered Linear Precoding", IEEE Transactions on Wireless Communications, vol. 8, No. 4, Apr. 2009, pp. 1910-1921.
Zheng et al., "Diversity and multiplexing: a fundamental tradeoff in multiple antenna channels," IEEE Trans. Info. Th., 2003, vol. 49, No. 5, pp. 1073-1096.
Zhou et al., "An Improved LR-aided K-Best Algorithm for MIMO Detection," in Proc. IEEE International Conference on Wireless Communications and Signal Processing (WCSP), Oct. 2012, 5 pages.
Zhuang et al., "Channel models for link and system level simulations", IEEE 802.16 Broadband Wireless Access Working Group, Sep. 2004, 15 pages.
Zogg et al., "Multipath Delay Spread in a Hilly Region at 210 MHz", IEEE Transactions on Vehicular Technology, vol. VT-36, No. 4, Nov. 1987, pp. 184-187.
Zou et al., "Li Reducing the Complexity of Quasi-Maximum-Likelihood Detectors Through Companding for Coded MIMO Systems," IEEE Transactions on Vehicular Technology, Mar. 2012, vol. 2012, pp. 1109-1123.
Zyren J., "Overview on the 3GPP Long Term Evolution Physical Layer," Freescale White Paper, Jul. 2007, 27 pages.
Bengtsson, M., "A Pragmatic Approach to Multi-User Spatial Multiplexing", IEEE 2002, pp. 130-134.
Besson et al., "On parameter estimation of MIMO flat-fading channels with frequency offsets," IEEE Transactions on Transaction, Signal Processing, see also Acoustics, Speech, and Signal Processing, vol. 51, No. 3, 2003, pp. 602-613.
Bhagavatula R., et al., "Sizing up MIMO Arrays," IEEE Vehicular Technology Magazine, 2008, vol. 3 (4), pp. 31-38.
Bjornson et al., "Massive MIMO and Small Cells: Improving Energy Efficiency by Optimal Soft-Cell Coordination", ICT, 2013, Wireless Communications Symposium, pp. 5442-5447.
Bjornson et al., Designing Multi-User MIMO for Energy Efficiency: When is Massive MIMO the Answer?, IEEE Wireless Communications and Networking Conference (WCNC), Istanbul, Turkey, Apr. 2014, 6 pages.
Blelloch, "Introduction to Data Compression", Carnegie Mellon University Tech. Report, Sep. 2010, pp. 1-55.
Boche et al., "Analysis of Different Precoding decoding Strategies for Multiuser Beamforming", IEEE Vehicular Technology Conference, 2003, vol. 1, pp. 39-43.
Boche H., et al., "A General Duality Theory for Uplink and Downlink Beamforming", 2002, vol. 1, pp. 87-91.
Bourdoux et al., "Non-reciprocal transceivers in OFDM/SDMA systems: impact and mitigation", IEEE, 2003, pp. 183-186.
Brodersen et al., "Degrees of Freedom in Multiple Antenna Channels: A Signal Space Approach," IEEE Transactions on Information Theory, 2005, vol. 51, No. 2, pp. 523-536.
Bydon, "Silicon Valley Inventor's Radical Rewrite of Wireless", The Wall Street Journal, Retrieved on Jul. 28, 2011, Available Online at <http:biogs.wsj.comdigits20110728silicon-valley-inventors-radical-rewrite-of-wireless>, 2 pages.

Caire et al., "On the Achievable Throughput of a Multiantenna Gaussian Broadcast Channel", IEEE Transactions on Information Theory, Jul. 23, 2001, vol. 49, pp. 1-46.
Caire et al., "On the achievable throughput of a multiantenna Gaussian broadcast channel," IEEE Transactions on Information Theory, vol. 49, No. 7, Jul. 2003, pp. 1691-1706.
Caire, "On Achivable Rates in a Multi-Antenna Broadcast Downlink," IEEE Transactions on Information Theory, 2003, vol. 49, pp. 1691-1706.
Cannon et al., "Tomographical Imaging Using Uniformly Redundant Arrays, "Applied Optics, vol. 18 No. 7, 1979 pp. 1052-1057.
Catreux et al., "Adaptive Modulation and MIMO Coding for Broadband Wireless Data Networks," IEEE Communications Magazine, 2002, vol. 2, pp. 108-115.
Cerato et al., Hardware implementation of low-complexity detector for large MIMO, in Proc. IEEE ISCAS'2009, Taipei, May 2009, pp. 593-596.
Cetiner et al., "A Reconfigurable Spiral Antenna for Adaptive MIMO Systems," EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Cetiner et al., "Multifunctional Reconfigurable MEMS Integrated Antennas for Adaptive MIMO Systems," Adaptive Antennas and MIMO Systems for Wireless Systems, IEEE Communications Magazine, vol. 42, No. 12, Dec. 2004, pp. 62-70.
Chae et al., "Adaptive MIMO Transmission Techniques for Broadband Wireless Communication Systems", IEEE Communications Magazine, 2010, vol. 48, No. 5, pp. 112-118.
Chae et al., "Coordinated Beamforming with Limited Feedback in the MIMO Broadcast Channel," Special Issue on Exploiting Limited Feedback in Tomorrow's Wireless Comm. Networks, IEEE Journal on Selected Areas in Communications, 2008, vol. 26, No. 8, pp. 1505-1515.
Chandrasekaran et al., "Near-Optimal Large-MIMO Detection Using Randomized MCMC and Randomized Search Algorithms," Proceeding in Institute of Electrical and Electronics Engineers International Conference on Communications, 2011, 5 pages.
Chapter 26—Electromagnetic-Wave Propagation, Reference Data for Radio Engineers, 5th Edition, Howard W. Sams & Co., Inc., 1973, pp. 1-32.
Chen et al., "Transmit selection diversity for unitary precoded multiuser spatial multiplexing systems with linear receivers", IEEE Trans. on Signal Processing, 2005, pp. 1-30.
Chen et al., "Transmit Selection Diversity for Unitary Precoded Multiuser Spatial Multiplexing Systems with Linear Receivers", IEEE Trans. on Signal Processing, 2007, vol. 55, No. 3, pp. 1159-1171.
Chen R., "Multiuser Space-Time Block Coded MIMO System with Downlink," IEEE Communications Society, 2004, pp. 2689-2693.
Chen, R., "Multiuser Space-Time Block Coded MIMO System with Downlink Precoding," IEEE Communications Society, 2004, pp. 2689-2693.
Chockalingam, A., "Low-Complexity Algorithms for Large-MIMO Detection," International Symposium on Communications, Control and Signal Processing, 2010, 6 pages.
Choi et al., "A transmit preprocessing technique for multiuser MIMO systems using a decomposition approach," IEEE Trans. Wireless Comm, 2004, vol. 3, No. 1, pp. 20-24.
Choi et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013, 13 pages.
Choi et al., "Noncoherent Trellis Coded Quantization: A Practical Limited Feedback Technique for Massive MIMO Systems," Nov. 8, 2013, pp. 1-14.
Choi et al., "Opportunistic space division multiple access with beam selection," IEEE Trans. on Communications, 2006, pp. 1-23.

(56) References Cited

OTHER PUBLICATIONS

Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Interpolation Based Unitary Precoding for Spatial Multiplexing MIMO-OFDM with Limited Feedback," Global Telecommunications Conference 2004 (GLOBECOM '04), IEEE, Dec. 3, 2004, pp. 214-218.
Chu et al., "Polyphase codes with good periodic correlation properties (corresp.)", IEEE Trans. Inform. Theory, vol. 18, No. 4, Jul. 1972, pp. 531-532.
Chuah C. N., et al., "Capacity Scaling in MIMO Wireless Systems under Correlated Fading", IEEE Trans. Inform. Theory, 2002, vol. 48 (3), pp. 637-650.
CMCC, "Discussion on CQI definition for non-PMI/RI reporting", 3GPP TSG-RAN WG1 #70, R1-123739, Aug. 13-17, 2012, 6 pages.
Cohn et al., "Group-theoretic Algorithms for Matrix Multiplication", IEEE Symposium on Foundations of Computer Science, 2005, pp. 379-388.
Communication pursuant to Article 94(3) EPC for Application No. EP13856705.2, dated Mar. 13, 2018, 6 pages.
Communication pursuant to Article 94(3) EPC for European U.S. Appl. No. 10/156,954, dated Jan. 25, 2017, 5 pages.
Communication pursuant to Article 94(3) EPC, EP App. No. 19189155.5, Apr. 9, 2021, 6 pages.
Coopersmith D., et al., "Matrix Multiplication via Arithmetic Progression", Journal of Symbolic Computation, 1990, vol. 9, pp. 251-280.
Coopersmith et al., "Matrix Multiplication via Arithmetic Progression", Journal of Symbolic Computation, 1990, vol. 9, pp. 251-280.
Corrected Notice of Allowability, U.S. Appl. No. 15/057,002, Jun. 3, 2019, 11 pages.
Corrected Notice of Allowability, U.S. Appl. No. 16/188,841, Oct. 28, 2020, 7 pages.
Corrected Notice of Allowability, U.S. Appl. No. 16/436,864, Jul. 22, 2020, 2 pages.
Corrected Notice of Allowance, U.S. Appl. No. 13/797,950, Nov. 13, 2018, 16 pages.
Corrected Notice of Allowance, U.S. Appl. No. 13/797,984, Apr. 5, 2018, 12 pages.
Corrected Notice of Allowance, U.S. Appl. No. 13/797,984, Feb. 8, 2018, 4 pages.
Corrected Notice of Allowance, U.S. Appl. No. 14/086,700, Nov. 8, 2018, 104 pages.
Notice of Allowance, U.S. Appl. No. 13/475,598, Oct. 19, 2015, 10 pages.
Notice of Allowance, U.S. Appl. No. 13/797,950, Apr. 16, 2018, 117 pages.
Notice of Allowance, U.S. Appl. No. 13/797,950, Aug. 2, 2018, 23 pages.
Notice of Allowance, U.S. Appl. No. 13/797,984, Jan. 17, 2018, 146 pages.
Notice of Allowance, U.S. Appl. No. 13/797,984, Oct. 19, 2017, 10 pages.
Notice of Allowance, U.S. Appl. No. 13/844,355, Dec. 16, 2019, 2 pages.
Notice of Allowance, U.S. Appl. No. 13/844,355, Oct. 21, 2019, 8 pages.
Notice of Allowance, U.S. Appl. No. 14/023,302, May 17, 2016, 5 pages.
Notice of Allowance, U.S. Appl. No. 14/156,254, Nov. 11, 2015, 29 pages.
Notice of Allowance, U.S. Appl. No. 14/672,014, Sep. 23, 2021, 11 pages.
Notice of Allowance, U.S. Appl. No. 15/057,002, Apr. 16, 2019, 11 pages.
Notice of Allowance, U.S. Appl. No. 15/057,002, Dec. 19, 2018, 68 pages.
Notice of Allowance, U.S. Appl. No. 15/181,383, Jan. 25, 2019, 87 pages.
Notice of Allowance, U.S. Appl. No. 15/181,383, Mar. 20, 2019, 10 pages.
Notice of Allowance, U.S. Appl. No. 15/201,276, Jan. 23, 2019, 29 pages.
Notice of Allowance, U.S. Appl. No. 15/201,276, May 28, 2019, 4 pages.
Notice of Allowance, U.S. Appl. No. 15/340,914, Dec. 2, 2020, 9 pages.
Notice of Allowance, U.S. Appl. No. 15/340,914, Mar. 15, 2021, 4 pages.
Notice of Allowance, U.S. Appl. No. 15/682,076, Jan. 14, 2021, 11 pages.
Notice of Allowance, U.S. Appl. No. 15/682,076, Mar. 24, 2021, 11 pages.
Notice of Allowance, U.S. Appl. No. 15/792,610, Jul. 13, 2021, 10 pages.
Notice of Allowance, U.S. Appl. No. 15/792,610, Nov. 3, 2021, 2 pages.
Notice of Allowance, U.S. Appl. No. 15/792,610, Oct. 2, 2020, 7 pages.
Notice of Allowance, U.S. Appl. No. 15/792,610, Oct. 26, 2021, 2 pages.
Notice of Allowance, U.S. Appl. No. 16/188,841, Sep. 10, 2020, 9 pages.
Notice of Allowance, U.S. Appl. No. 16/208,895, Feb. 8, 2023, 6 pages.
Notice of Allowance, U.S. Appl. No. 16/253,028, Dec. 27, 2019, 10 pages.
Notice of Allowance, U.S. Appl. No. 16/436,864, Jun. 11, 2020, 5 pages.
Notice of Allowance, U.S. Appl. No. 16/578,265, Mar. 31, 2021, 7 pages.
Notice of Allowance, U.S. App. No. 16/719,169, Jun. 17, 2021, 8 pages.
Notice of Allowance, U.S. App. No. 16/719,169, Jun. 30, 2021, 2 pages.
Notice of Allowance, U.S. App. No. 16/719,169, Sep. 16, 2021, 2 pages.
Notice of Allowance, U.S. Appl. No. 17/100,875, Apr. 22, 2022, 8 pages.
Notice of Allowance, U.S. Appl. No. 17/100,875, Aug. 10, 2022, 9 pages.
Notice of Allowance, U.S. Appl. No. 17/234,699, Jul. 28, 2021, 7 pages.
Notice of Allowance, U.S. Appl. No. 17/308,031, Aug. 4, 2021, 7 pages.
Notice of Allowance, U.S. Appl. No. 17/317,856, Oct. 1, 2021, 2 pages.
Notice of Allowance, U.S. Appl. No. 17/317,856, Sep. 9, 2021, 8 pages.
Notice of Allowance, U.S. Appl. No. 17/317,856, Sep. 23, 2021, 8 pages.
Notice of Allowance, U.S. Appl. No. 17/361,252, Nov. 18, 2021, 14 pages.
Notice of Allowance, U.S. Appl. No. 17/379,985, Dec. 15, 2021, 7 pages.
Notice of Allowance, U.S. Appl. No. 17/498,666, Oct. 13, 2022, 7 pages.
Notice of Allowance, U.S. Appl. No. 17/498,666, Sep. 29, 2022, 10 pages.
Notice of Allowance, U.S. Appl. No. 17/541,809, Mar. 15, 2022, 5 pages.
Notice of Allowance, U.S. Appl. No. 17/586,765, Apr. 7, 2022, 7 pages.
Notice of Allowance, U.S. Appl. No. 17/586,765, Jul. 27, 2022, 7 pages.
Notice of Allowance, U.S. App. No. 17/948,193, Dec. 21, 2022, 5 pages.
Notice of Allowance, U.S. Appl. No. 12/630,627, Sep. 25, 2013, 11 pages.
Notice of Allowance, U.S. Appl. No. 12/802,938, Apr. 4, 2013, 16 pages.

(56) References Cited

OTHER PUBLICATIONS

Notice of Allowance, U.S. Appl. No. 12/802,938, May 24, 2013, 10 pages.
Notice of Allowance, CA App. No. 2,848,355, Apr. 3, 2020, 1 page.
Notice of Allowance, CA App. No. 2695799, Feb. 9, 2016, 1 page.
Notice of Allowance, CA App. No. 2816556, May 18, 2021, 1 page.
Notice of Allowance, Canadian Patent App. No. P14906, Jun. 1, 2015, 1 page.
Notice of Allowance, CN App. No. 201480016091.6, Apr. 24, 2020, 8 pages (3 pages of English Translation and 5 pages of Original Document).
Notice of Allowance, IL App. No. 248265, May 7, 2020, 3 pages.
Notice of Allowance, IL App. No. 269145, Aug. 23, 2020, 3 pages of Original Document Only.
Notice of Allowance, KR App. No. 10-2014-7009876, Oct. 4, 2019, 3 pages (1 page of English Translation and 2 pages of Original Document).
Notice of Allowance, KR App. No. 10-2015-7014235, Oct. 28, 2020, 3 pages (1 pages of English Translation and 2 page of Original Document).
Notice of Allowance, KR App. No. 10-2017-7002596, Feb. 27, 2019, 3 pages.
Notice of Allowance, KR App. No. 10-2018-7035654, Oct. 2, 2019, 4 pages (2 pages of English Translation and 2 pages of Original Document).
Notice of Allowance, KR Patent App. No. 2015-7002560, Feb. 4, 2016, 2 pages.
Notice of Allowance, KR. App. No. 10-2014-7035524, Oct. 14, 2020, 4 pages (1 page of English Translation and 3 pages of Original Document).
Notice of Allowance, TW App. No. 107123446, Nov. 20, 2019, 3 pages of Original Document Only.
Notice of Allowance, U.S. Appl. No. 16/578,265, Jan. 28, 2021, 7 pages.
Notice of Allowance, U.S. Appl. No. 10/817,731, Sep. 30, 2010, 6 pages.
Notice of Allowance, U.S. Appl. No. 10/902,978, Apr. 16, 2008, 7 pages.
Notice of Allowance, U.S. Appl. No. 10/902,978, Jun. 27, 2008, 7 pages.
Notice of Allowance, U.S. Appl. No. 11/256,478, Jan. 26, 2010, 9 pages.
Notice of Allowance, U.S. Appl. No. 11/256,478, Jul. 30, 2009, 9 pages.
Notice of Allowance, U.S. Appl. No. 11/256,478, Oct. 29, 2009, 16 pages.
Notice of Allowance, U.S. App. No. 11/894,362, Mar. 23, 2009, 10 pages.
Notice of Allowance, U.S. Appl. No. 11/894,362, Nov. 10, 2009, 5 pages.
Notice of Allowance, U.S. App. No. 11/894, 362, Sep. 3, 2009, 12 pages.
Notice of Allowance, U.S. Appl. No. 11/894,394, Jun. 26, 2009, 7 pages.
Notice of Allowance, U.S. Appl. No. 11/894,394, Jul. 30, 2009, 14 pages.
Notice of Allowance, U.S. Appl. No. 11/894,394, Mar. 6, 2009, 11 pages.
Notice of Allowance, U.S. Appl. No. 11/894,540, Nov. 9, 2009, 5 pages.
Notice of Allowance, U.S. Appl. No. 11/894,540, Sep. 14, 2009, 13 pages.
Notice of Allowance, U.S. Appl. No. 12/143,503, Apr. 11, 2011, 9 pages.
Notice of Allowance, U.S. Appl. No. 12/143,503, Aug. 18, 2011, 12 pages.
Notice of Allowance, U.S. Appl. No. 12/143,503), Dec. 9, 2011, 11 pages.
Notice of Allowance, U.S. Appl. No. 12/637,643, Jan. 17, 2013, 11 pages.
Notice of Allowance, U.S. Appl. No. 12/802,938, Dec. 6, 2012, 37 pages.
Notice of Allowance, U.S. Appl. No. 12/802,938, Sep. 19, 2012, 8 pages.
Notice of Allowance, U.S. Appl. No. 12/802,975, Apr. 17, 2020, 12 pages.
Notice of Allowance, U.S. Appl. No. 12/802,975, Aug. 26, 2020, 14 pages.
Notice of Allowance, U.S. Appl. No. 12/802,976, Apr. 14, 2011, 8 pages.
Notice of Allowance, U.S. Appl. No. 12/802,976, Aug. 22, 2011, 8 pages.
Notice of Allowance, U.S. Appl. No. 12/802,976, Dec. 9, 2011, 11 pages.
Notice of Allowance, U.S. Appl. No. 12/802,976, Nov. 29, 2010, 6 pages.
Notice of Allowance, U.S. Appl. No. 12/802,988, Nov. 15, 2018, 11 pages.
Notice of Allowance, U.S. Appl. No. 12/917,257, Dec. 6, 2012, 8 pages.
Notice of Allowance, U.S. Appl. No. 12/917,257, Feb. 15, 2013, 18 pages.
Notice of Allowance, U.S. Appl. No. 13/232,996, Jan. 9, 2019, 11 pages.
Notice of Allowance, U.S. Appl. No. 13/232,996 , Mar. 20, 2019, 10 pages.
Notice of Allowance, U.S. Appl. No. 13/233,006, Apr. 3, 2019, 19 pages.
Notice of Allowance, U.S. Appl. No. 13/233,006, Jul. 12, 2019, 12 pages.
Notice of Allowance, U.S. Appl. No. 13/233,006, May 30, 2019, 12 pages.
Notice of Allowance, U.S. Appl. No. 13/475,596, Oct. 19, 2015, 29 pages.
Sulonen et al. "Comparison of MIMO Antenna Configurations in Picocell and Microcell Environments," IEEE Journal on Selected Areas in Communications, 2003, vol. 21, No. 5, pp. 703-712.
Summons to attend oral proceedings pursuant to Rule 115(1) EPC, EP App. No. 12762167.0, Nov. 29, 2017, 8 pages.
Summons to attend oral proceedings pursuant to Rule 115(1) EPC, EP App. No. 13784690.3, Jul. 6, 2020, 5 pages.
Summons to attend oral proceedings pursuant to Rule 115(1) EPC, EP App. No. 13843203.4, Dec. 21, 2020, 9 pages.
Summons to attend oral proceedings pursuant to Rule 115(1) EPC, EP App. No. 13856705.2, Nov. 5, 2018, 7 pages.
Summons to attend oral proceedings pursuant to Rule 115(1) EPC, EP App. No. 14779084.4, Nov. 29, 2019, 9 pages.
Summons to attend oral proceedings, EP App. No. 10156954.9, Jan. 30, 2019, 8 pages.
Supplemental Notice of Allowability, U.S. Appl. No. 12/802,975, Oct. 28, 2020, 2 pages.
Supplemental Notice of Allowability, U.S. Appl. No. 15/340,914, Jan. 13, 2021, 5 pages.
Supplemental Notice of Allowance, U.S. Appl. No. 12/802,958, Dec. 3, 2018, 11 pages.
Supplementary European Search Report, EP App. No. 13790935, Dec. 1, 2015, 9 pages.
Supplementary Partial European Search Report and Search Opinion, EP App No. 17864744.2, May 13, 2020, 16 pages.
Supplementary Partial European Search Report, EP App. No. 11838640.8, Mar. 2, 2017, 13 pages.
Supplementary Partial Search Report, EP App. No. EP14770916, Oct. 21, 2016, 6 pages.
Supplementary Search Report, EP App. No. 05733294, Apr. 5, 2012, 4 pages.
Suraweera et al., Multi-Pair Amplify-and-Forward Relaying with Very Large Antenna Arrays, Proceedings in IEEE International Conference on Communications (ICC), Budapest, Hungary, Jun. 2013, 7 pages.
Suthisopapan et al., "Near Capacity Approaching Capacity of Large MIMO Systems by Non-Binary LDPC Codes and MMSE Detection", in Proc. of the IEEE International Symposium on Information Theory, Mar. 2012, 7 pages.

(56) References Cited

OTHER PUBLICATIONS

Suzuki et al., Large-scale multiple antenna fixed wireless systems for rural areas, Proceedings in IEEE PIMRC, Sep. 2012, 6 pages.
Suzuki H., et al., Highly Spectrally Efficient Ngara Rural Wireless Broadband Access Demonstrator, Proceedings in IEEE International Symposium on Communications and Information Technologies (ISCIT), Oct. 2012, 6 pages.
Svac et al., Soft-Heuristic Detectors for Large MIMO Systems, IEEE Trans. Signal Processing, 2013, vol. 61, No. 18, pp. 4573-4586.
Svantesson T., et al., "Analysis of Electromagnetic Field Polarizations in Multiantenna Systems," IEEE Transactions on Wireless Communications, vol. 3 (2), Mar. 2004, pp. 641-646.
Svantesson T., et al., "On Capacity and Correlation of Multi-Antenna Systems Employing Multiple Polarizations," IEEE Antennas and Propagation Society, 2002, vol. 3, pp. 202-205.
Takeuchi et al., "On an Achievable Rate of Large Rayleigh Block-Fading MIMO Channels with No CSI," IEEE Transactions on Information Theory, 2011, 47 pages.
Taluja et al., Diversity Limits of Compact Broadband Multi-Antenna Systems, IEEE J. Sel. Areas Communication, 2013, vol. 31, No. 2, pp. 326-337.
Tang et al., "Joint frequency offset estimation and interference cancellation for MIMO-OFDM systems [mobile radio]," 2004 IEEE 60th Vehicular Technology Conference, VTC2004-Fal, 2004, vol. 3, pp. 1553-1557.
Tanumay et al., "A Novel Monte-Carlo-Sampling-Based Receiver for Large-Scale Uplink Multiuser MIMO Systems," IEEE Transactions on Vehicular Technology, 2013, vol. 62, No. 7, pp. 3019-3038.
Taricco et al., "Asymptotic Mutual Information Statistics of Separately-Correlated Rician Fading MIMO Channels," IEEE Trans. Inform. Theory, Aug. 2008, vol. 54, No. 8, pp. 3490-3504.
Tarighat et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.
Tarighat et al., "MIMO OFDM receivers for systems with IQ imbalances," IEEE Trans. Sig. Pro, for orthogonal space-time block codes (OSTBC), 2005, vol. 53, pp. 3583-3596.
Tarokh et al., "Space-time block codes from orthogonal designs," IEEE Trans. Info, vol. 45, 1999, pp. 1456-1467.
Tarokh et al., "Space-Time Codes for High Data Rate Wireless Communication: Performance Criterion and Code Construction," IEEE Transactions on Information Theory, 1998, vol. 44, pp. 744-765.
Teletar I. E., "Capacity of Multi-antenna Gaussian Channels", European Transactions on Telecommunications, vol. 10, Nov. 1999, pp. 1-28.
Teukolsky S. A., "Numerical Recipes in C: The Art of Scientific Computing", Cambridge University Press, 1992, 949 pages.
Texas Instruments, "Aspects of Coordinated Multi-Point Transmission for Advanced E-Utra," Nov. 11-15, 2008, 3GPP TSG RAN WG1 #55, R1-084444, 5 pages.
The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broadband-revolution.
Third Office Action, Chinese Patent App. No. 201280044869.5, Aug. 31, 2017, 15 pages.
Third Office Action, CN App. No. 201480016091.6, Jul. 10, 2019, 5 pages (2 pages of English Translation and 3 pages of Original Document).
Third Office Action, MX App. No. MX/a/2014/013795, Jul. 27, 2016, 6 pages.
Tomlinson M., "New Automatic Equaliser Employing Modulo Arithmetic," Electronics Letters, 1971, vol. 7 (5/6), pp. 138-139.
Tran et al. "A Conic Quadratic Programming Approach to Physical Layer Multicasting for Large-Scale Antenna Arrays," IEEE Signal Processing Letters, Jan. 1, 2014, vol. 21, No. 1, pp. 114-117.
Truong K.T., et al. "Effects of Channel Aging in Massive MIMO Systems," Journal of Communications and Networks, Special Issue on Massive MIMO, 2013, vol. 15 (4), pp. 338-351.
Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.
Tsakalaki et al., "On the Beamforming Performance of Large-Scale Antenna Arrays", Proc. Loughborough Antennas and Propagation Conference (LAPC), Nov. 12-13, 2012, 4 pages.
Tse et al., "Diversity-multiplexing tradeoff in multiple-access channels", IEEE Trans. Info. Th., Mar. 2004, vol. 50, No. 9, pp. 1859-1874.
Tse et al., "Performance Tradeoffs between Maximum Ratio Transmission and Switched-Transmit Diversity", in Proc. 11.sup.th IEEE International Symposium on Personal, Indoor and Mobile Radio Communication, vol. 2, Sep. 2000, pp. 1485-1489.
Tureli et al., "OFDM blind carrier offset estimation: Esprit", IEEE Trans. Commun., vol. 48, No. 9, Sep. 2000, pp. 1459-1461.
Tyler et al., "Adaptive antennas: the Calibration Problem", IEEE Comm. Mag., Dec. 2004, pp. 114-122.
Ubuquiti, "airFiber", Available Online at <http:f/www.ubnt.com/airfiber>, Retreived on Sep. 4, 2015, 10 pages.
Ubuquiti, "airMAX", Available Online at <http:www.ubnt.comairmax>, 2015, 10 pages.
Uthansakul P., et al., MIMO antenna selection using CSI from reciprocal channel, Int. Journal of Elect. and Info. Eng., 2010, vol. 4, No. 10, pp. 482-491.
Final Office Action, U.S. Appl. No. 10/817,731, Sep. 11, 2009, 36 pages.
Final Office Action, U.S. Appl. No. 12/630,627, Apr. 2, 2013, 23 pages.
Final Office Action, U.S. Appl. No. 12/630,627, Oct. 20, 2011, 13 pages.
Final Office Action, U.S. Appl. No. 12/802,958, Apr. 15, 2015, 24 pages.
Final Office Action, U.S. Appl. No. 12/802,958, Apr. 29, 2016, 33 pages.
Final Office Action, U.S. Appl. No. 12/802,958, Jun. 25, 2013, 48 pages.
Final Office Action, U.S. Appl. No. 12/802,958, Jun. 7, 2017, 18 pages.
Final Office Action, U.S. Appl. No. 12/802,974, Aug. 1, 2014, 23 pages.
Final Office Action, U.S. Appl. No. 12/802,974, Nov. 30, 2015, 22 pages.
Final Office Action, U.S. Appl. No. 12/802,975, Aug. 4, 2014, 40 pages.
Final Office Action, U.S. Appl. No. 12/802,975, Dec. 14, 2015, 26 pages.
Final Office Action, U.S. Appl. No. 12/802,975, Dec. 22, 2016, 29 pages.
Final Office Action, U.S. Appl. No. 12/802,975, Jun. 22, 2018, 27 pages.
Final Office Action, U.S. Appl. No. 12/802,975, Oct. 18, 2019, 21 pages.
Final Office Action, U.S. Appl. No. 12/802,988, Aug. 2, 2013, 13 pages.
Final Office Action, U.S. Appl. No. 12/802,988, Feb. 8, 2017, 13 pages.
Final Office Action, U.S. Appl. No. 12/802,988, Jan. 13, 2016, 11 pages.
Final Office Action, U.S. Appl. No. 12/802,988, Jan. 22, 2018, 11 pages.
Final Office Action, U.S. Appl. No. 12/802,988, Oct. 21, 2014, 13 pages.
Final Office Action, U.S. Appl. No. 12/802,988, Sep. 5, 2012, 8 pages.
Final Office Action, U.S. Appl. No. 12/802,989, Aug. 25, 2015, 24 pages.

(56) References Cited

OTHER PUBLICATIONS

Final Office Action, U.S. Appl. No. 12/802,989, Jun. 12, 2014, 17 pages.
Final Office Action, U.S. Appl. No. 12/802,989, Nov. 2, 2016, 14 pages.
Final Office Action, U.S. Appl. No. 12/802,989, Nov. 27, 2012, 12 pages.
Final Office Action, U.S. Appl. No. 13/232,996, Apr. 11, 2017, 149 pages.
Final Office Action, U.S. Appl. No. 13/232,996, Jul. 31, 2013, 12 pages.
Final Office Action, U.S. Appl. No. 13/232,996, Mar. 21, 2018, 20 pages.
Final Office Action, U.S. Appl. No. 13/232,996, Nov. 12, 2015, 14 pages.
Final Office Action, U.S. Appl. No. 13/232,996, Oct. 23, 2014, 15 pages.
Final Office Action, U.S. Appl. No. 13/464,648, Aug. 1, 2013, 10 pages.
Final Office Action, U.S. Appl. No. 13/475,598, Aug. 27, 2014, 30 pages.
Final Office Action, U.S. Appl. No. 13/797,950, Aug. 24, 2017, 74 pages.
Final Office Action, U.S. Appl. No. 13/797,950, Feb. 2, 2016, 65 pages.
Final Office Action, U.S. Appl. No. 13/797,971, Oct. 9, 2015, 52 pages.
Final Office Action, U.S. Appl. No. 13/797,984, Aug. 20, 2015, 15 pages.
Final Office Action, U.S. Appl. No. 13/797,984, Sep. 29, 2016, 13 pages.
Final Office Action, U.S. Appl. No. 13/844,355, Aug. 12, 2015, 20 pages.
Final Office Action, U.S. Appl. No. 13/844,355, Dec. 15, 2016, 23 pages.
Final Office Action, U.S. Appl. No. 13/844,355, Feb. 7, 2018, 24 pages.
Final Office Action, U.S. Appl. No. 13/844,355, Feb. 21, 2019, 34 pages.
Final Office Action, U.S. Appl. No. 13/844,355, Jun. 3, 2019, 26 pages.
Final Office Action, U.S. Appl. No. 14/023,302, Mar. 2, 2015, 5 pages.
Final Office Action, U.S. Appl. No. 14/086,700, Oct. 14, 2016, 11 pages.
Final Office Action, U.S. Appl. No. 14/086,700, Sep. 2, 2015, 9 pages.
Final Office Action, U.S. Appl. No. 14/611,565, May 10, 2021, 7 pages.
Final Office Action, U.S. Appl. No. 14/611,565, Dec. 4, 2019, 19 pages.
Final Office Action, U.S. Appl. No. 14/611,565, Jul. 12, 2022, 12 pages.
Final Office Action, U.S. Appl. No. 14/611,565, Jun. 16, 2016, 22 pages.
Final Office Action, U.S. Appl. No. 14/611,565, Oct. 25, 2017, 25 pages.
Final Office Action, U.S. Appl. No. 14/611,565, Oct. 25, 2018, 20 pages.
Hong et al. "Joint Base Station Clustering and Beamformer Design for Partial Coordinated Transmission in Heterogenous Networks," IEEE Journal on Selected Areas in Communications, 2013, vol. 31, No. 2, pp. 226-240.
Hosseini et al., "Massive MIMO and Small Cells: How to Densify Heterogeneous Networks," Wireless Communications Symposium, IEEE ICC, 2013, pp. 5442-5447.
Hoydis et al., "Iterative Deterministic Equivalents for the Performance Analysis of Communication Systems," Dec. 18, 2011, pp. 1-43.

Huang et al., "Joint Beamforming and Power Control in Coordinated Multicell: Max-Min Duality, Effective Network and Large System Transition," IEEE Transactions on Wireless Communications, 2013, pp. 1-14.
Huawei, et al., "CoMP Clarification of definitions and TP," R1-084351, Nov. 10-14, 2008, 3GPP TSG RAN WG1 Meeting #55, 7 pages.
Huff et al., "A Novel Radiation Pattern and Frequency Reconfigurable Single Turn Square Spiral Microstrip Antenna", IEEE Microwave and Wireless Components Letters, vol. 13, No. 2, Feb. 2003, pp. 57-59.
Huh et al., Multi-cell MIMO Downlink with Cell Cooperation and Fair Scheduling: A Large-System Limit Analysis, IEEE Transactions on Information Theory, 2011, vol. 57, No. 12, pp. 7771-7786.
Huh H., et al., Achieving "Massive MIMO" Spectral Efficiency with a Not-so-Large Number of Antennas. IEEE Transactions on Wireless Communications, Sep. 2012, vol. 11 (9), pp. 3226-3239.
IEEE 802.22, "IEEE 802.22 Working Group on Wireless Regional Area Networks", Retrieved on Aug. 14, 2014, Available Online at <http:www.ieee802.org/22/>, 1 page.
IntelliCell: A Fully Adaptive Approach to Smart Antennas, ArrayComm, Incorporated, WP-ISA-031502-2.0, 2002, pp. 1-18.
Intention to Grant, EP App. No. 13790935.4, Jun. 24, 2020, 8 pages.
Intention to Grant, EP App. No. 14770916.6, Apr. 28, 2021, 8 pages.
International Preliminary Report on Patentability and Written Opinion, App. No. PCT/US2013/071749, Jun. 4, 2015, 7 pages.
International Preliminary Report on Patentability and Written Opinion, App. No. PCT/US2014/025102, Sep. 24, 2015, 10 pages.
International Preliminary Report on Patentability and Written Opinion, App. No. PCT/US2014/025108, Sep. 24, 2015, 8 pages.
International Preliminary Report On Patentability and Written Opinion, App. No. PCT/US2014/025123, Sep. 24, 2015, 10 pages.
International Preliminary Report on Patentability and Written Opinion, App. No. PCT/US2015/014511, Aug. 18, 2016, 5 pages.
International Preliminary Report on Patentability from foreign counterpart PCT/US2013/061493, Apr. 16, 2015, 7 pages.
International Preliminary Report on Patentability, App. No. PCT/US11/58663, May 7, 2013, 26 pages.
International Preliminary Report on Patentability, App. No. PCT/US2012/054937, Mar. 27, 2014, 13 pages.
International Preliminary Report on Patentability, App. No. PCT/US2013/039580, Nov. 4, 2014, 7 pages.
International Preliminary Report on Patentability, App. No. PCT/US2013/041726, Nov. 18, 2014, 6 pages.
International Preliminary Report on Patentability, PCT App. No. PCT/US06/41009, Apr. 23, 2008, 4 pages.
International Preliminary Report on Patentability, PCT App. No. PCT/US2005/11033, Jun. 3, 2008, 7 pages.
International Preliminary Report on Patentability, PCT App. No. PCT/US2008/073780, Feb. 24, 2010, 10 pages.
International Preliminary Report on Patentability, PCT App. No. PCT/US2015/023436, Oct. 27, 2016, 6 pages.
International Preliminary Report on Patentability, PCT App. No. PCT/US2017/047963, Mar. 7, 2019, 8 pages.
International Preliminary Report on Patentability, PCT App. No. PCT/US2017/058291, May 9, 2019, 7 pages.
International Preliminary Report on Patentability, PCT App. No. PCT/US2021/026431, Oct. 20, 2022, 5 pages.
International Search Report and the Written Opinion, App. No. PCT/US15/14511, May 18, 2015, 7 pages.
International Search Report and the Written Opinion, App. No. PCT/US2013/061493, Dec. 6, 2013, 9 pages.
International Search Report and Written Opinion, App. No. PCT/US13/41726, Jul. 16, 2013, 7 pages.
International Search Report and Written Opinion, App. No. PCT/US2012/054937, Apr. 2, 2013, 17 pages.
International Search Report and Written Opinion, App. No. PCT/US2013/039580, Aug. 20, 2013, 12 pages.
International Search Report and Written opinion, App. No. PCT/US2013/071749, Apr. 8, 2014, 9 pages.
International Search Report and Written opinion, App. No. PCT/US2014/025102, Jul. 18, 2014, 11 pages.
International Search Report and Written opinion, App. No. PCT/US2014/025105, Jul. 14, 2014, 12 pages.

(56) References Cited

OTHER PUBLICATIONS

International Search Report and Written Opinion, App. No. PCT/US2014/025108, Sep. 19, 2014, 10 Pages.
International Search Report and Written opinion, App. No. PCT/US2014/025123, Jul. 18, 2014, 11 pages.
International Search Report and Written Opinion, App. No. PCT/US2015/023436, Aug. 19, 2015, 10 pages.
International Search Report and Written Opinion, App. No. PCT/US2017/047963, Nov. 3, 2017, 9 pages.
International Search Report and Written Opinion, App. No. PCT/US2017/058291, Mar. 8, 2018, 12 pages.
International Search Report and Written Opinion, PCT App. No. PCT/US 06/41009, May 24, 2007, 6 pages.
International Search Report and Written opinion, PCT App. No. PCT/US05/11033, May 2, 2008, 10 pages.
International Search Report and Written Opinion, PCT App. No. PCT/US11/58663, Mar. 29, 2012, 27 pages.
International Search Report and Written Opinion, PCT App. No. PCT/US2008/073780, Nov. 19, 2008.
International Search Report and Written Opinion, PCT App. No. PCT/US2021/026431, Jun. 29, 2021, 6 pages.
Itu, "ISM Band," Available Online at <http://www.itu.int/ITUR/terrestrial/faq/index.html#g013>, Aug. 14, 2014, pp. 1-8.
J. Duplicity, et al., "MU-MIMO in LTE systems", EURASIP Journal on Wireless Communications and Networking, Mar. 2011, 10 pages.
J. G. Proakis, Communication System Engineering, Prentice Hall, 1994, 11 pages.
"Electromagnetic-Wave Propagation", HW Sams Publishers, Reference Data for Radio Engineers, "Electromagnetic-Wave Propagation", 5th Edition, 1973, Chapter 26., (1973), 1-32.
"MIMO System uses SOMA for IEEE802.11", Available Online at <http://www.electronicstalk.com/news/ime/ime149.html>, Electronicstalk, 2004, pp. 1-3.
3GPP Technical Specification Group, "Spatial channel model, SCM-134 text V6.0", Spatial Channel Model AHG (Combined ad-hoc from 3GPP and 3GPP2), Apr. 2003, pp. 1-45.
3GPP Tr 25.876 V7.0.0 (Mar. 2007), Technical Report, "3rd Generation Partnership Project; Technical Specification Group Radio Access Network"; Multiple Input Multiple Output in UTRA; (Release 7), pp. 2-76.
3GPP TR 25.912, "Feasibility Study for Evolved UTRA and Utran", V9.0.0 (Oct. 2009), Oct. 2009, pp. 1-66.
3GPP TR 25.913, "Requirements for Evolved UTRA (E-UTRA) and Evolved Utran (E-UTRAN)", V8.0.0 (Jan. 2009), Jan. 2009, pp. 1-20.
3GPP TR 36.819, "3rd Generation Partnership Project; Technical Specification Group Radio Access Network; Coordinated multi-point operation for LTE physical layer aspects (Release 11)", Dec. 20, 2011, 69 pages.
3GPP TS 36.211 V8.7.0 (May 2009), Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, "3rd Generation Partnership Project; Technical Specification Group Radio Access Network, Coordinated multi-point operation for LTE physical layer aspects (Release 11)", 3GPP Draft; DRAFT36819-B10, 3rd Generation Partnership Project; (3GPP), Dec. 20, 2011, V11.1.0, pp. 1-69.
3GPP, "LTE", downloaded from http://www.3gpp.org/LTE on Aug. 14, 2014, 4 pages.
3GPP, "UMTS", Universal Mobile Telecommunications System, pp. 1-2, printed on Nov. 17, 2014, Retrieved from the Internet: < URL: www.3gpp. orgarticleumts>.
3GPP, ETS1136 212 V9.1.0 (2010), "Technical Specification LTE; Evolved Universal Terrestrial Radio Access (E-UTRA); Multiplexing and Channel Coding (3GPP TS 36.212 VERION 9.1.0 Release 9) 3GPP, ETS1136 212 V9.1.C (2010)" 63 pages.

3Gpp, TS 36.201, "Evolved Universal Terrestrial Radio Access (E-UTRA); LTE Physical Layer-General Description (Release 11)," Oct. 2012, pp. 1-14.
3GPP, TS 36.211, "Evolved Universal Terrestrial Radio Access (E-UTRA); Physical Channels and Modulation (Release 11)," pp. 1-107, Oct. 2012, submitted as Part 1 and Part 2.
3GPP, TS 36.212, Evolved Universal Terrestrial Radio Access (E-UTRA); Multiplexing and channel coding (Release 11) pp. 1-80, Oct. 2012, submitted as Part 1 and Part 2.
3GPP, TS 36.212.V8.7.0 (May 2009), "Technical Specification 3rd Generation Partnership Project; Technical Specification Group Radio Access Network; Evolved Universal Terrestrial Radio Access (E-UTRA); Multiplexing and channel Coding (Release 8) 3GPP, TS 36.212.V8.7.0 (May 2009)," May 2009, 60 pages.
3GPP, TS 36.213, "Evolved Universal Terrestrial Radio Access (E-UTRA); Physical layer procedures (Release 11)," Oct. 2012, 145 pages.
3GPP, TS 36.808, "Evolved Universal Terrestrial Radio Access (E-UTRA); Carrier Aggregation (Release 1O)", v10.0.0, Jun. 2012, 28 pages.
Abandonment, U.S. Appl. No. 13/475,598, Feb. 8, 2016, 1 page.
Abandonment, U.S. Appl. No. 14/086,700, Dec. 26, 2017, 2 pages.
Abbasi N., "Capacity estimation of HF-MIMO systems", International Conference on Ionospheric Systems and Techniques, 2009, 5 pages.
Adrian et al., "Quantum Tagging: Authenticating Location via Quantum Information and Relativistic Signalling Constraints,", Phys. Rev. A84, 012326 (2011), arXiv: 1008.2147, 2010, 9 pages.
Advisory Action for U.S. Appl. No. 12/802,989, May 4, 2017, 3 pages.
Advisory Action, U.S. Appl. No. 13/844,355, Jul. 17, 2019, 3 pages.
Advisory Action, U.S. Appl. No. 14/611,565, Feb. 7, 2020, 3 pages.
Advisory Office Action, U.S. Appl. No. 14/611,565, Nov. 10, 2020, 3 pages.
Aggarwal et al., "On the Design of Large Scale Wireless Systems," IEEE Journal of Selected Areas Communications, 2013, vol. 31. No. 2, pp. 215-225.
Airgo, "Homepage: Airgo—Wireless without Limits", Available Online at <http:www.airgonetworks.com>, printed on Apr. 9, 2004, 1 page.
Akbudak et al., "CoMP in Heterogeneous networks: A Low-Complexity Linear Transceiver Design, "Workshop on Cooperative and Cognitive Mobile Networks, Communications (ICC), 2012 IEEE International Conference on, IEEE, Jun. 10, 2012, pp. 5624-5629.
Aktas et al., "Scaling Results on the Sum Capacity of Cellular Networks with MIMO Links", IEEE Transactions on Information Theory, 2006, vol. 52, pp. 3264-3274.
Akyildiz et al., "The Evolution to 4G Cellular Systems: LTE-Advanced," Physical Communication, vol. 3, 2010, pp. 217-244.
Alamouti et al., "A simple transmit diversity technique for wireless communications," IEEE Journal on Selected Areas in Communications, 1998, vol. 16, No. 8, pp. 1451-1458.
Allowance Receipt, MX App. No. MX/a/2019/010059, May 3, 2021, 3 pages (Original Document Only).
Alrabadi et al., "Beamforming via Large and Dense Antenna Arrays above a Clutter," Institute of Electrical and Electronics Engineers Journal on Selected Areas in Communications, 2013, vol. 31, No. 2, pp. 314-325.
Andersen et al., "The MIMO Cube—a Compact MIMO Antenna," IEEE Proceedings of Wireless Personal Multimedia Communications International Symposium, vol. 1, Oct. 2002, pp. 112-114.
Andersen J. B., "Antenna Arrays in Mobile Communications: Gain, diversity, and Channel Capacity. 1," IEEE Antennas and Propagation Magazine, vol. 42, No. 2, Apr. 2000, pp. 12-16.
Anderson et al., "Beamforming in large-scale MIMO Multiuser Links Under a Per-node Power Constraint," Proceedings in International Symposium on Wireless Communication Systems, Aug. 2012, pp. 821-825.
Andrews et al., "Tripling the Capacity of Wireless Communications using Electromagnetic Polarization", Nature, vol. 409, Jan. 2001, pp. 316-318.

(56) References Cited

OTHER PUBLICATIONS

Andrews J. G., "Seven Ways That Hetnet are a Cellular Paradigm Shift," IEEE Communications Magazine, Mar. 2013, [online], Retrieved from the Internet: http://users.ece.utexas.edu/-jandrews/pubs/And HetNet CommMag2012v3.pdf, pp. 136-144.
Anritsu, "LTE resource guide", 18 p. 2009, www.US.anritsu.com.
Araujo et al., "Channel Estimation for Millimeter-Wave Very-Large MIMO Systems," EUSPICO 2014, in proceedings, Sep. 1-5, 2014, 5 pages.
Arnau et al., "Dissection of Multibeam Satellite Communications with a Large-scale Antenna System Toolbox," European Wireless 2014 (EW2014), May 14-16, 2014, pp. 548-553.
Arraycomm, "Field-Proven Results," Improving wireless economics through MAS software, printed on Mar. 28, 2011, www.arraycomm.comserve.phppage=proof, 3 pages.
Artigue C., et al.,"On the Precoder Design of Flat Fading MIMO Systems Equipped with MMSE Receivers: A Large System Approach", IEEE Trans. Inform. Theory, 2011, vol. 57 (7), pp. 4138-4155.
AT&T, "1946: First Mobile Telephone Call" 1 p. Jun. 17, 1946, Available Online at <http:www.corp.att.comattlabsreputationtimeline46mobile.html>.
Baker M., "LTE-Advanced Physical Layer," Alcatel-Lucent, Dec. 2009, 48 pages.
Barbieri A., et al., "Coordinated Downlink Multi-point Communications in Heterogeneous Cellular Networks", (Qualcomm), Information Theory and App. Workshop, Feb. 2012, pp. 7-16.
BelAir Networks, "Small cells", Available Online at <URL:http:www.belairnetworks.comsitesdefaultfilesVVP SmallCells.pdf>, 2007 , 4 pages.
Benedetto et al., "Analysis of the effect of the I/Q baseband i-Iter mismatch in an OFDM modem," Wireless personal communications, 2000, pp. 175-186.
Bengtsson E. L., "UE Antenna Properties and Their Influence on Massive MIMO System Performance," 2002, 5 pages.
First Office Action, TW Patent App. No. 102117728, Aug. 9, 2016, 11 pages.
Fletcher et al., "Mutual coupling in multi-element array antennas and its influence on MIMO channel capacity," IEEE Electronics Letters, 2003, vol. 39 (4), pp. 342-344.
Forenza A., et al., "Impact of antenna geometry on MIMO communication in indoor clustered channels," Proc. IEEE Antennas and Prop. Symp, 2004, vol. 2, pp. 1700-1703.
Forenza et al., "Adaptive MIMO Transmission for Exploiting the Capacity of Spatially Correlated Channels," IEEE Trans. on Veh. Tech, 2007, vol. 56, No. 2, pp. 619-630.
Forenza et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.
Forenza et al., "Benefit of Pattern Diversity Via 2-element Array of Circular Patch Antennas in Indoor Clustered MIMO Channels", IEEE Trans. on Communications, vol. 54, No. 5, May 2006, pp. 943-954.
Forenza et al., "Link Adaptation and Channel Prediction in Wireless OFDM Systems," Proceeding of IEEE International Midwest Symposium on Circuits and Systems, 2002, pp. 211-214.
Forenza et al., "Optimization Methodology for Designing 2-CPAs Exploiting Pattern Diversity in Clustered MIMO Channels", Institute of Electrical and Electronics Engineers Transactions on Communications, 2008, vol. 56, No. 10, pp. 1748-1759.
Forenza et al., "Switching Between OSTBC and Spatial Multiplexing with Linear Receivers in Spatially Correlated MIMO Channels", IEEE, 2006, pp. 1-5.
Foschin et al., "Coordinating multiple antenna cellular networks to achieve enormous spectral efficiency", Proceedings of the IEEE, Aug. 2006, vol. 153, No. 4, pp. 548-555.
Foschini et al., "Simplified processing for high spectral efficiency wireless communication employing multi-element arrays", IEEE Jour. Select. Areas in Comm., vol. 17, No. 11, Nov. 1999, pp. 1841-1852.

Foschini et al., "The Value of Coherent Base Station Coordination", Conference on In-formation Sciences and Systems (CISS 2005), Mar. 16-18, 2005, 6 pages.
Fourth Office Action, CN App. No. 201480016091.6, Dec. 10, 2019, 6 pages (3 pages of English Translation and 3 pages of Original Document).
Further Examination Report (Postponed Acceptance), New Zealand Patent App. No. 728719, Jan. 31, 2018, 2 pages.
Further Examination Report, New Zealand App. No. 701567, Aug. 24, 2016, 6 pages.
Further Examination Report, New Zealand App. No. 701691, Sep. 26, 2016, 3 pages.
Further Examination Report, New Zealand Patent App. No. 717370, Aug. 3, 2017, 4 pages.
Fusco et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.
Gao et al., "Linear Pre-Coding Performance in Measured Very-Large MIMO Channels," IEEE Vehicular Technology, 2011, pp. 1-5.
Garcia et al., "Channel Model for Train to Train Communication Using the 400 MHz Band", in Proc. of IEEE Vehicular Technology Conference, May 2008, pp. 3082-3086.
Gesbert et al., "From Theory to Practice: An Overview of MIMO Space—Time Coded Wireless Systems," IEEE Journal on Selected Areas in Communications, 2003, vol. 21, No. 3, pp. 281-302.
Gesbert et al., "Multi-Cell MIMO Cooperative Networks: A New Look at Interference," IEEE Journal on Selected Areas in Communications, Dec. 2010, vol. 28, No. 9, pp. 1380-1408.
Gesbert et al., "Outdoor MIMO Wireless Channels: Models and Performance Prediction", IEEE Transactions on Communications, vol. 50, No. 12, Dec. 2002, pp. 1926-1934.
Ghogho et al., "Training design for multipath channel and frequency offset estimation in MIMO systems", Signal Processing, IEEE Transactions on [see also Acoustics, Speech, and Signal Processing, IEEE Transactions on], vol. 54, No. 10, Oct. 2006, pp. 3957-3965.
Glazunov et al., "Experimental Characterization of the Propagation Channel along a Very Large Virtual Array in a Reverberation Chamber", Progress In Electromagnetics Research B, Jan. 2014, vol. 59, pp. 205-217.
Goldman D., "Sorry, America: Your Wireless Airwaves are Full", CNN Money, Available Online at <http://money.cnn.com/2012/02/21/technology/spectrum crunch/index.html>, 2012, 3 pages.
Gopalakrishnan et al., "An Analysis of Pilot Contamination on Multi-User MIMO Cellular Systems with Many Antennas," Proceedings in Signal Processing Advances in Wireless Communications, 2011, pp. 381-385.
Govindasamy et al., "Asymptotic Spectral Efficiency of the Uplink in Spatially Distributed Wireless Networks with Multi-Antenna Base Stations," IEEE Transactions on Communications, 2013, vol. 61, No. 7, 100 pages.
GSMA, "GSM technology" Printed on Aug. 14, 2014, Available Online at <http://www.gsmworld.com/technology/index.htm>, 1 page.
Guey et al., "Modeling and Evaluation of MIMO Systems Exploiting Channel Reciprocity in TDD Mode," VTC 2004-Fall, IEEE 60th, Oct. 2004, pp. 4265-4269.
Guillaud et al., "A Practical Method for Wireless Channel Reciprocity Exploitation Through Relative Calibration", IEEE Proceedings of Sign Processing, Aug. 2005, vol. 1, pp. 403-406.
Guillaud et al., "A Specular Approach to MIMO Frequency selective Channel Tracking and Prediction," Fifth IEEE Workshop on Signal Processing Advances in Wireless Communications, Jul. 11-14, 2004, pp. 59-63.
Gunashekar G., "Investigations into the Feasibility of MIMO Techniques within the HF Band: Preliminary Results," Radio Science, 2009, 33 pages.
Guthy et al., "Large System Analysis of Projection Based Algorithms for the MIMO Broadcast Channel", in Proc. of the IEEE Intl Symp. Inform. Theory, Austin, U.S.A., Jun. 2010, 5 pages.
Guthy et al., "Large System Analysis of Sum Capacity in the Gaussian MIMO Broadcast Channel", IEEE J. Sel. Areas Communication, 2013, vol. 31, No. 2, pp. 149-159.

(56) References Cited

OTHER PUBLICATIONS

Guthy et al., "Large System Analysis of the Successive Encoding Successive Allocation Method for the MIMO BC", Proc. of the International ITG Workshop on Smart Antennas, Bremen, Germany, Feb. 2010.
Hachem et al., "A New Approach for Mutual Information Analysis of Large Dimensional Multi-Antenna Channels," IEEE Transactions on Information Theory, 2008, vol. 54, No. 9, pp. 3987-4004.
Hakkarainen et al., "Widely-Linear Beamforming and RF Impairment Suppression in Massive Antenna Arrays", Journal of Communications and Networks, 2013, vol. 15, No. 4, pp. 383-397.
Hallen H., "Long-Range Prediction of Fading Signals", Institute of Electrical and Electronics Engineers Signal Processing Magazine, 2000, vol. 17, No. 3, pp. 62-75.
Haring, L. , "Residual carrier and sampling frequency synchronization in multiuser OFDM systems", VTC-Spring. IEEE 63rd Vehicular Technology Conference, vol. 4, 2006, pp. 1937-1941.
Hazlett et al., "Radio Spectrum for a Hungry Wireless World", Sep. 22, 2011, 41 pages.
Heath et al., "Antenna selection for spatial multiplexing systems with linear receivers," IEEE Trans. Comm, 2001, vol. 5, pp. 142-144.
Heath et al., "Switching between diversity and multiplexing in MIMO systems", IEEE Trans. Comm., vol. 53, No. 6, Jun. 2005, pp. 962-968.
Heath et al., "Switching between Multiplexing and Diversity Based on Constellation Distance," Proc. of Allerton Conf on 208, Comm. Control and Comp, Oct. 4-6, 2000, pp. 212-221.
Heath R et al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26, No. 8, pp. 1337-1340.
Hewlett Packard, "GPS and Precision Timing Applications", Application Note 1272, May 1996, pp. 1-28.
High Frequency Active Auroroal Research Program—Homepage, Available Online at <http:www.haarp.alaska.edu>, Printed on Apr. 9, 2004, 1 page.
Hochwald et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53, No. 1, pp. 195-202.
Hochwald et al., "A Vector-Perturbation Technique for Near-Capacity Multiantenna Multiuser Communication—Part II: Perturbation", Institute of Electrical and Electronics Engineers Transactions on Communications, 2005, vol. 53, No. 3, pp. 537-544.
Hochwald et al., "Multi-Antenna Channel Hardening and its Implications for Rate Feedback and Scheduling", Institute of Electrical and Electronics Engineers Transactions on Information Theory, 2004, vol. 50, No. 9, pp. 1893-1909.
Office Action, MX App. No. MX/A/2019/001966, Mar. 16, 2022, 5 pages of original document only.
Office Action, MX Patent App. No. MX/a/2014/002900, May 25, 2015, 7 pages.
Office Action, MX Patent App. No. MX/a/2014/013377, Mar. 22, 2016, 20 pages.
Office Action, MX Patent App. No. MX/a/2014/013377, Nov. 30, 2017, 4 pages.
Office Action, MX Patent App. No. Mx/a/2015/002992, Nov. 8, 2016, 4 pages.
Office Action, New Zealand Patent App. No. 610463, Jan. 22, 2014, 2 pages.
Office Action, RU App. No. 2014151216, Sep. 30, 2016, 12 pages.
Office Action, RU App. No. 2019104259, Aug. 20, 2020, 14 pages (7 pages of English Translation and 7 pages of Original Document).
Office Action, RU Patent App. No. 2016144927, Dec. 21, 2016, 6 pages.
Office Action, TW App No. 102117728, Nov. 29, 2016, 6 pages (3 pages of English Translation and 3 pages of Original Document).
Office Action, TW App. No. 094125985, Jan. 6, 2012, 7 pages.
Office Action, TW App. No. 100139880, Jan. 26, 2017, 7 pages.
Office Action, TW App. No. 103107541, Sep. 28, 2018, 7 pages.
Office Action, TW App. No. 108118765, Apr. 16, 2020, 6 pages (3 pages of English Translation and 3 pages of Original Document).
Office Action, TW App. No. 108130461, Oct. 30, 2020, 16 pages (7 pages of English Translation and 9 pages of Original Document).
Office Action, TW App. No. 108148122, Jul. 8, 2020, 19 pages (8 pages of English Translation and 11 pages of Original Document).
Office Action, TW App. No. 109105764, Sep. 9, 2020, 47 pages (21 pages of English Translation and 26 pages of Original Document).
Office Action, TW App. No. 110125850, Dec. 16, 2021, 7 pages (4 pages of English Translation and 3 pages of Original Document).
Office Action, TW App. No. 111124746, Mar. 15, 2023, 3 pages (Only English Translation).
Office Action, TW Patent App. No. 101133865, Oct. 28, 2016, 5 pages.
Office Action, TW Patent App. No. 102116145, Mar. 31, 2017, 7 pages.
Office Action, U.S. Appl. No. 12/802,988, Aug. 14, 2013, 26 pages.
Onggosanusi et al., High Rate Space-Time Block Coded Scheme: Performance and Improvement in Correlated Fading Channels, Proc. IEEE Wireless Comm. and Net. Conf, Mar. 2002, vol. 1, pp. 194-199.
Optimized Markov Chain Monte Carlo for Signal Detection in MIMO Systems: An Analysis of the Stationary Distribution and Mixing Time, Signal Processing, vol. 62, No. 17, Sep. 2014.
Ozgur et al., "Spatial Degrees of Freedom of Large Distributed MIMO Systems and Wireless Ad Hoc Networks", Institute of Electrical and Electronics Engineers Journal on Selected Areas in Communications, 2013, vol. 31, No. 2, pp. 202-214.
Pan, et al., "Precoding and Power allocation for Cooperative MIMO systems", International Conference on Wireless Communications, Networking and Mobile Computing, IEEE, 2006, 4 pages.
Panasonic, "Target scenarios for new carrier types," 3GPP TSG-RAN WGI#72, R1-130684, Jan. 28, 2013-Feb. 1, 2013, 7 pages.
Papadogiannis et al."Efficient Selective Feedback Design for Multicell Cooperative Networks," Institute of Electrical and Electronics Engineers Transactions on Vehicular Technology, 2010, vol. 60, No. 1, pp. 196-205.
Papadopoulos et al., Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010, pp. 636-643.
Parkvall et al., "LTE Advanced-Evolving LTE Towards Imt-Advanced," Ericsson, IEEE VTC, Sep. 2008, 5 pages.
Partial Supplementary Search Report, EP App. No. 15780522.7, Oct. 20, 2017, 7 pages.
Paulraj et al., "Introduction to Space-Time Wireless Communications", 2003, 33 Pages.
Paulraj, "Is OFDMA, MIMO and OS the right stuff for mobile broad-band?" 63 pages, http://www.ieeevtc.org/vtc2005fall/presentations/paulraj.pdf, Sep. 2005.
Payami et al., Channel Measurements and Analysis for Very Large Array Systems At 2.6 GHZ, in Proc. 6th European Conference on Antennas and Propagation, EuCAP 2012, Prague, Czech Republic, Mar. 26, 2012, 5 pages.
Per-Erik et al., "VDSL2: Next Important Broadband Technology", Ericsson Review No. 1, 2006, pp. 36-47.
Perlman et al., "Distributed-Input Distributed-Output (Dido), Wireless Technology: A New Approach to Multiuser Wireless," Retrieved from http://www.rearden.com/DIDO/DIDO White Paper 110727.pdf, Aug. 2011, 19 pages.
Piazza et al., "Design and Evaluation of a Reconfigurable Antenna Array for MIMO Systems", IEEE Transactions on Antennas and Propagation, 2008, vol. 56, No. 3, pp. 869-881.
Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.

(56) References Cited

OTHER PUBLICATIONS

Pitarokoilis et al., "On the Optimality of Single-Carrier Transmission in Large-Scale Antenna Systems," IEEE Wireless Commun. Lett., Aug. 2012, vol. 1, No. 4, pp. 276-279.

Pitarokoilis, "Effect of Oscillator Phase Noise on Uplink Performance of Large MU-MIMO Systems," in Proc. of the 50th Annual Allerton Conference on Communication, Control, and Computing, Oct. 2012, 9 pages.

Pohl et al., "Antenna spacing in MIMO indoor channels", Proc. IEEE Veh. Technol. Conf., vol. 2,, Jun. 2002, pp. 749-753.

Pollock et al., "Antenna Saturation Effects on MIMO Capacity," IEEE International Conference on Communications, 2003, vol. 4, pp. 2301-2305.

Ponnampalam et al., "On DL Preceding for 11ac", IEEE 802.11-10/01119r0, Medialek, Sep. 2010, 8 pages.

Preliminary Report on Patentability and Written Opinion, App. No. PCT/US2014/025105, Sep. 24, 2015, 10 pages.

Proakis J., "Digital Communications Fourth edition," 2001, pp. 9, Department of Electrical and Computer Engineering, Northeastern University, ISBN 0-07-232111-3, Cover page, Title page, Table of Contents.

Qian, "Partially Adaptive Beamforming for Correlated Interference Rejection", IEEE Trans. on Sign. Proc., 1995, vol. 43, No. 2, pp. 506-515.

Qibi, "A Forward Link Performance Study of the 1 xEV-DO Rev. 0 System Using Field Measurements and Simulations," Lucent Technologies. Retrieved from the Internet: http://www.cdg.org/resources/white%5Fpapers/files/white_papers/files/Luce-nt%201xEV-DO%20Rev%200%20Mar%2004.pdf, Mar. 2004, 19 pages.

Qualcomm Incorporated, "Definition of Virtual Antenna Mapping (VAM) and Applicability of S-CPICH Power Accuracy Requirement", 3GPP TSG-WG4 Meeting 58Ad hoc #Jan. 2011, R4-112408, Apr. 11-15, 2011, 6 pages.

Qualcomm, "The 1000x data challenge, the latest on wireless, voice, services and chipset evolution", 4G World, Oct. 31, 2012 61 pages submitted as Parts 1-3.

Rao et al., "I/Q mismatch cancellation for MIMO-OFDM systems", In Personal, Indoor and Mobile Radio Communications, PIMRC 2004. 15th IEEE International Symposium on, vol. 4, 2004, pp. 2710-2714.

Non-Final Office Action, U.S. Appl. No. 13/844,355, Aug. 27, 2018, 39 pages.

Non-Final Office Action, U.S. Appl. No. 13/844,355, Jun. 30, 2017, 159 pages.

Non-final Office Action, U.S. Appl. No. 13/844,355, Mar. 21, 2019, 31 pages.

Non-Final Office Action, U.S. Appl. No. 14/023,302, Jun. 11, 2015, 8 pages.

Non-Final Office Action, U.S. Appl. No. 14/086,700, Mar. 4, 2016, 10 pages.

Non-Final Office Action, U.S. Appl. No. 14/086,700, May 25, 2017, 12 pages.

Non-Final Office Action, U.S. Appl. No. 14/156,254, Sep. 11, 2014, 44 pages.

Non-Final Office Action, U.S. Appl. No. 14/611,565, Apr. 19, 2018, 141 pages.

Non-Final Office Action, U.S. Appl. No. 14/611,565, Apr. 4, 2019, 35 pages.

Non-Final Office Action, U.S. Appl. No. 14/611,565, Feb. 26, 2021, 11 pages.

Non-Final Office Action, U.S. Appl. No. 14/611,565, Jan. 4, 2023, 13 pages.

Non-Final Office Action, U.S. Appl. No. 14/611,565, Mar. 25, 2020, 5 pages.

Non-Final Office Action, U.S. Appl. No. 14/611,565, Nov. 5, 2021, 7 pages.

Non-Final Office Action, U.S. Appl. No. 14/672,014, Feb. 22, 2021, 12 pages.

Non-Final Office Action, U.S. Appl. No. 14/672,014, Jun. 8, 2020, 11 pages.

Non-Final Office Action, U.S. Appl. No. 15/181,383, Jun. 25, 2018, 7 pages.

Non-Final Office Action, U.S. Appl. No. 15/181,383, May 22, 2017, 48 pages.

Non-Final Office Action, U.S. Appl. No. 15/340,914, Aug. 8, 2019, 13 pages.

Non-Final Office Action, U.S. Appl. No. 15/340,914, Mar. 25, 2020, 15 pages.

Non-Final Office Action, U.S. Appl. No. 15/682,076, Jan. 28, 2019, 20 pages.

Non-Final Office Action, U.S. Appl. No. 15/682,076, May 27, 2020, 8 pages.

Non-Final Office Action, U.S. Appl. No. 15/792,610, Apr. 18, 2019, 147 pages.

Non-Final Office Action, U.S. Appl. No. 15/792,610, Apr. 29, 2020, 7 pages.

Non-Final Office Action, U.S. Appl. No. 15/792,610, Jan. 13, 2021, 8 pages.

Non-Final Office Action, U.S. Appl. No. 16/188,841, Jan. 22, 2020, 9 pages.

Non-Final Office Action, U.S. Appl. No. 16/208,895, Sep. 9, 2021, 7 pages.

Non-Final Office Action, U.S. Appl. No. 16/208,895, Apr. 26, 2019, 7 pages.

Non-Final Office Action, U.S. Appl. No. 16/208,895, Jan. 3, 2020, 7 pages.

Non-Final Office Action, U.S. Appl. No. 16/208,895, Jul. 28, 2020, 7 pages.

Non-Final Office Action, U.S. Appl. No. 16/208,895, Sep. 8, 2022, 7 pages.

Non-Final Office Action, U.S. Appl. No. 16/253,028, Oct. 18, 2019, 10 pages.

Non-Final Office Action, U.S. Appl. No. 16/578,265, May 12, 2020, 8 pages.

Non-Final Office Action, U.S. App. No. 16/719, 169, Feb. 4, 2021, 15 pages.

Non-Final Office Action, U.S. Appl. No. 17/100,875, Nov. 9, 2021, 10 pages.

Non-Final Office Action, U.S. Appl. No. 17/224,977, Feb. 22, 2023, 7 pages.

Non-Final Office Action, U.S. Appl. No. 17/234,699, Jul. 15, 2021, 9 pages.

Non-Final Office Action, U.S. Appl. No. 17/308,031, Jul. 15, 2021, 12 pages.

Non-Final Office Action, U.S. Appl. No. 17/317,856, Jul. 19, 2021, 39 pages.

Non-Final Office Action, U.S. Appl. No. 17/361,252, Oct. 20, 2021, 10 pages.

Non-Final Office Action, U.S. Appl. No. 17/379,985, Aug. 26, 2021, 10 pages.

Non-Final Office Action, U.S. Appl. No. 17/498,666, Aug. 18, 2022, 7 pages.

Non-Final Office Action, U.S. Appl. No. 17/498,666, Dec. 29, 2021, 22 pages.

Non-Final Office Action, U.S. Appl. No. 17/541,809, Feb. 8, 2022, 9 pages.

Non-Final Office Action, U.S. Appl. No. 17/946,856, Mar. 17, 2023, 12 pages.

Non-Final Office Action, U.S. App. No. 17/948,193, Nov. 22, 2022, 23 pages.

Non-Final Office Action, U.S. App. No. 16/208, 895, Apr. 15, 2022, 6 pages.

Non-Final Office Action, U.S. Appl. No. 12/802,958, Jun. 23, 2014, 24 pages.

Non-Final Office Action, U.S. Appl. No. 12/802,974, Aug. 1, 2013, 35 pages.

Non-Final Office Action, U.S. Appl. No. 12/802,975, Aug. 14, 2013, 26 pages.

Non-Final Office Action, U.S. Appl. No. 12/802,975, May 7, 2015, 25 pages.

Corrected Notice of Allowance, U.S. Appl. No. 15/792,610, Oct. 6, 2020, 4 pages.

(56) References Cited

OTHER PUBLICATIONS

Couillet et al., "A Deterministic Equivalent for the Analysis of Correlated MIMO Multiple Access Channels," IEEE Trans. Inform. Theory, 2011, vol. 57, No. 6, pp. 3493-3514.
Coulson et al., "Maximum likelihood synchronization for OFDM using a pilot symbol: analysis," IEEE Journal on Selected Areas in Communications, 2001, vol. 19, No. 12, pp. 2495-2503.
Dahlman E., et al., "4G: LTE/LTE-Advanced for Mobile Broadband", Elsevier, 2011, Cover page, Title page, Copyright page, Table of Contents, 21 pages.
Dai et al., "Carrier frequency offset estimation for OFDM/SDMA systems using consecutive pilots," IEEE Proceedings Communications, 2005, vol. 152, pp. 624-632.
Dai et al., "Reduced-complexity performance-lossless (quasi-)maximum-likelihood detectors for S-QAM modulated MIMO systems," Electronics Letters, 2013, vol. 49, No. 11, pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17, No. 5, pp. 916-919.
Daniel, J., "Introduction to public safety: RF Signal Distribution Using Fiber Optics", Available Online at <http://www.rfsolutions.com/fiber.pdf>, 2009, 13 pages.
Datta et al., "A Hybrid RTS-BP Algorithm for Improved Detection of Large-MIMO M-QAM Signals," in Proc. IEEE National Conference on Communication, 2011, 6 pages.
Datta et al., "A Novel MCMC Based Receiver for Large-Scale Uplink Multiuser MIMO Systems," Jan. 2012, 37 pages.
Datta et al., "Random-Restart Reactive Tabu Search Algorithm for Detection in Large-MIMO Systems," IEEE Communications Letters, 2010, vol. 14, No. 12, pp. 1107-1109.
Debbah et al., "MIMO Channel Modelling and the Principle of Maximum Entropy," IEEE Transactions on Information Theory, 2005, vol. 51, No. 5, pp. 1667-1690.
Decision of Grant a Patent, JP App. No. 2016120928, Apr. 10, 2017, 6 pages.
Decision of Grant, JP Patent App. No. 2015-510498, Jun. 14, 2017, 6 pages.
Decision of Grant, RU App. No. 2014151216, Jan. 31, 2017, 18 pages.
Decision of Grant, RU App. No. 2016144927, Nov. 29, 2019, 8 pages of Original Document Only.
Decision of Refusal, JP App. No. 2016-562961, Oct. 28, 2020, 5 pages (4 pages of English Translation and 1 page of Original Document).
Decision of Refusal, JP App. No. 2019-093904, Feb. 7, 2022, 4 pages (2 pages of English Translation and 2 pages of Original Document).
Decision of Refusal, KR App. No. 2010-7006265, Apr. 23, 2015, 2 pages.
Decision of Refusal. JP App. No. 2014530763, Dec. 19, 2016, 6 pages (3 pages of English Translation and 3 pages of Original Document).
Decision to grant a European patent, EP App. No. 10156950.7, May 8, 2020, 2 pages.
Decision to grant a European patent, EP App. No. 11838640.8, Feb. 7, 2019, 2 pages.
Decision to Grant a Patent, EP App. No. 13790935.4, Sep. 24, 2020, 2 pages.
Decision to Grant a Patent, JP App. No. 2017- 082862, Dec. 10, 2018, 7 pages.
Decision to Grant a patent, JP App. No. 2017- 110950, Nov. 15, 2017, 6 pages.
Decision to Grant, EP App. No. 14770916.6, May 28, 2021, 2 pages.
Degen et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Derrick et al., "Energy-Efficient Resource Allocation in OFDMA Systems with Large Nos. of Base Station Antennas", 2011, 30 pages.
Devasirvatham, et al., "Time Delay Spread Measurements At 850 MHz and 1 7 GHz Inside A Metropolitan Office Building", Electronics Letters, Feb. 2, 1989, vol. 25, No. 3, pp. 194-196.
Devasirvatham, et al., Radio Propagation Measurements At 850MHz. 1.7GHZ and 4GHz Inside Two Dissimilar Office Buildings, Electronics Letter Mar. 29, 1990 vol. 26 No. 7, pp. 445-447.
Devasirvatham., "Time Delay Spread and Signal Level Measurements of 850 MHz Radio Waves in Building Environments," IEEE Transactions on Antennas and Propagation, 1986, vol. AP-34 (11), pp. 1300-1305.
Devillers et al., "Mutual coupling effects in multiuser massive MIMO base stations", IEEE Antennas and Propagation Society International Symposium (APSURSI), Jul. 2012, 2 pages.
Dietrich et al., "Spatial, polarization, and pattern diversity for wireless handheld terminals," Proc. IEEE Antennas and Prop. Symp, 2001, vol. 49, pp. 1271-1281.
Dighe et al., "Analysis of Transmit-Receive Diversity in Rayleigh Fading", IEEE Transactions on Communications, vol. 51, No. 4, Apr. 2003, pp. 694-703.
DigitalAir wireless, "GeoDesy Laser Links 1.25Gbps Full Duplex", Available Onlibne at <http:www.digitalairwireless.comoutdoor-wireless-networkspoint-to-point-wirelesslaser-fso-linksgeodesy-fso-laser-links.html>, Retrieved on Oct. 2, 2015, 4 pages.
DigitalAir wireless, "Outdoor Wireless", Available Online at <URL: http:www.digitalairwireless.comoutdoor-wireless-networks.html>, Retreived on Sep. 29, 2015, 5 pages.
Ding et al., "On The Sum Rate of Channel Subspace Feedback for Multi-Antenna Broadcast Channels," in Proc., IEEE Globecom, vol. 5, Nov. 2005, pp. 2699-2703.
Divisional Notification, CN App. No. 201710491990.7, Jul. 13, 2020, 4 pages (2 pages of English Translation and 2 pages of Original Document).
Dohler et al., "A Step towards MIMO: Virtual Antenna Arrays," European Cooperation in the Field of Scientific and Technical Research, 2003, 9 pages.
Dong et al., "Multiple-input multiple-output wireless communication systems using antenna pattern diversity," Proceedings of IEEE Globe Telecommunications Conference, 2002, vol. 1, pp. 997-1001.
Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.
Dupuy, et al., "On the Capacity Achieving Covariance Matrix for Frequency Selective MIMO Channels Using the Asymptotic Approach", IEEE Trans. Inform. Theory. 2010, pp. 2153-2157.
Dupuy, et al., On the Capacity Achieving Covariance Matrix for Frequency Selective MIMO Channels Using the Asymptotic Approach, IEEE Trans. Inform. Theory, 2011, vol. 57 (9), pp. 5737-5753.
Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.
Eklund et al., "IEEE Standard 802.16: A Technical Overview of the WirelessMAN Air Interface for Broadband Wireless Access," IEEE Communications Magazine, Available Online at <http://ieee802.org/16/docs/02/C80216-02_05.pdf>, Jun. 2002, 12 pages.
Ekstrom et al., "Technical Solutions for the 3G Long-Term Evolution", IEEE Communications Magazine, 2006, pp. 38-45.
Erceg et al., "TGn Channel Models," IEEE 802.11-03940r4, May 2004, 45 pages.
Ericsson, The evolution of EDGE, Available Online at <http:www.ericsson.com/res/docs/whitepapersevolution_to_edge.pdf>, Feb. 2007, 18 pages.
ETSI Reconfigurable Radio Systems: Status and Future Directions on Software Defined Radio and Cognitive Radio Standards, IEEE Communications Magazine, IEEE Service Center, Sep. 2010, vol. 48, No. 9, pp. 78-86.
Nokia Siemens Networks, "2020: Beyond 4g, Radio Evolution for the Gigabit Experience", White Paper, 2011, www.nokiasiemensnetworks.com, 16 pages.

(56) References Cited

OTHER PUBLICATIONS

Non Final Office Action, U.S. Appl. No. 16/505,593, Sep. 10, 2020, 12 pages.
Non Final Office Action, U.S. Appl. No. 17/528,811, Oct. 26, 2022, 14 pages.
Non-Final Office Action, U.S. App. No. 13/844, 355, Aug. 12, 2019, 14 pages.
Non-Final Office Action, U.S. Appl. No. 10/817,731, Jan. 4, 2008, 14 pages.
Non-Final Office Action, U.S. Appl. No. 10/817,731, Jan. 21, 2009, 23 pages.
Non-Final Office Action, U.S. Appl. No. 10/817,731, Mar. 15, 2010, 26 pages.
Non-Final Office Action, U.S. Appl. No. 10/817,731, May 18, 2007, 16 pages.
Non-Final Office Action, U.S. Appl. No. 10/902,978, Apr. 10, 2008, 8 pages.
Non-Final Office Action, U.S. Appl. No. 10/902,978, Nov. 6, 2007, 11 pages.
Non-Final Office Action, U.S. Appl. No. 11/256,478, Sep. 19, 2008, 14 pages.
Non-Final Office Action, U.S. Appl. No. 11/894,362, Oct. 29, 2008, 17 pages.
Non-Final Office Action, U.S. Appl. No. 11/894,394, Oct. 28, 2008, 13 pages.
Non-Final Office Action, U.S. Appl. No. 11/894,540, Apr. 29, 2009, 8 pages.
Non-Final Office Action, U.S. Appl. No. 11/894,540, Oct. 29, 2008, 13 pages.
Non-Final Office Action, U.S. Appl. No. 12/143,503, Dec. 9, 2010, 15 pages.
Non-Final Office Action, U.S. Appl. No. 12/630,627, Aug. 22, 2012, 23 pages.
Non-Final Office Action, U.S. Appl. No. 12/630,627, Mar. 16, 2011, 5 pages.
Non-Final Office Action, U.S. Appl. No. 12/637,643, Jun. 7, 2012, 25 pages.
Non-Final Office Action, U.S. Appl. No. 12/637,643, Sep. 23, 2011, 18 pages.
Non-Final Office Action, U.S. Appl. No. 12/802,958, Aug. 13, 2015, 22 pages.
Non-Final Office Action, U.S. Appl. No. 12/802,958, Jan. 16, 2018, 118 pages.
Non-Final Office Action, U.S. Appl. No. 12/802,958, Nov. 4, 2016, 19 pages.
Non-Final Office Action, U.S. Appl. No. 12/802,958, Nov. 21, 2012, 17 pages.
Non-Final Office Action, U.S. Appl. No. 12/802,974, Apr. 24, 2015, 27 pages.
Non-Final Office Action, U.S. Appl. No. 12/802,974, Dec. 19, 2012, 7 pages.
Non-Final Office Action, U.S. Appl. No. 12/802,975, Aug. 1, 2013, 21 pages.
Non-Final Office Action, U.S. Appl. No. 12/802,975, Dec. 19, 2012, 16 pages.
Non-Final Office Action, U.S. Appl. No. 12/802,975, Jan. 14, 2019, 112 pages.
Non-Final Office Action, U.S. Appl. No. 12/802,975, Jul. 1, 2016, 21 pages.
Non-Final Office Action, U.S. Appl. No. 12/802,975, Sep. 14, 2017, 23 pages.
Non-Final Office Action, U.S. Appl. No. 12/802,988, Apr. 17, 2012, 10 pages.
Non-Final Office Action, U.S. Appl. No. 12/802,988, Aug. 15, 2016, 19 pages.
Non-Final Office Action, U.S. Appl. No. 12/802,988, Sep. 15, 2017, 11 pages.
Non-Final Office Action, U.S. Appl. No. 12/802,989, Jun. 14, 2012, 10 pages.
Non-Final Office Action, U.S. Appl. No. 12/802,989, Mar. 30, 2016, 35 pages.
Non-Final Office Action, U.S. Appl. No. 13/232,996, Jun. 20, 2016, 30 pages.
Non-Final Office Action, U.S. Appl. No. 13/232,996, Mar. 21, 2014, 9 pages.
Non-Final Office Action, U.S. Appl. No. 13/232,996, Nov. 5, 2018, 36 pages.
Non-Final Office Action, U.S. Appl. No. 13/232,996, Sep. 21, 2017, 15 pages.
Non-Final Office Action, U.S. Appl. No. 13/464,648, Feb. 12, 2013, 12 pages.
Non-Final Office Action, U.S. Appl. No. 13/475,598, Dec. 30, 2013, 16 pages.
Non-Final Office Action, U.S. Appl. No. 13/797,950, Jan. 11, 2017, 65 pages.
Non-Final Office Action, U.S. Appl. No. 13/797,950, May 11, 2015, 61 pages.
Non-Final Office Action, U.S. Appl. No. 13/797,971, May 11, 2015, 52 pages.
Non-Final Office Action, U.S. Appl. No. 13/797,971, Oct. 4, 2016, 56 pages.
Non-Final Office Action, U.S. Appl. No. 13/797,984, Feb. 28, 2017, 13 pages.
Non-Final Office Action, U.S. Appl. No. 13/797,984, Jan. 14, 2016, 14 pages.
Non-Final Office Action, U.S. Appl. No. 13/797,984, Jan. 29, 2015, 15 pages.
Non-Final Office Action, U.S. Appl. No. 13/844,355, Apr. 18, 2016, 21 pages.
Notice of Allowance, U.S. Appl. No. 12/802,974, Feb. 28, 2017, 15 pages.
Notice of Allowance, U.S. Appl. No. 12/802,974, Jun. 30, 2017, 89 pages.
Notice of Allowance, U.S. Appl. No. 12/802,974, Oct. 4, 2017, 17 pages.
Notice of Allowance, U.S. Appl. No. 12/802,974, Sep. 29, 2016, 5 pages.
Notice of Allowance, U.S. Appl. No. 12/802,974, Sep. 13, 2016, 43 pages.
Notice of Allowance, U.S. Appl. No. 12/802,988, Sep. 25, 2018, 96 pages.
Notice of Allowance, U.S. Appl. No. 12/802,989, Jun. 27, 2017, 121 pages.
Notice of Allowance, U.S. Appl. No. 12/917,257, May 31, 2013, 12 pages.
Notice of Allowance, U.S. Appl. No. 13/232,996, Oct. 12, 2016, 5 pages.
Notice of Allowance, U.S. Appl. No. 13/232,996, Oct. 26, 2016, 4 pages.
Notice of Allowance, U.S. Appl. No. 13/461,682, Oct. 2, 2014, 10 pages.
Notice of Allowance, U.S. Appl. No. 13/464,648, Aug. 14, 2015, 21 pages.
Notice of Allowance, U.S. Appl. No. 13/464,648, Aug. 25, 2015, 4 pages.
Notice of Allowance, U.S. Appl. No. 13/464,648, Feb. 23, 2016, 15 pages.
Notice of Allowance, U.S. Appl. No. 13/464,648, Nov. 30, 2015, 12 pages.
Notice of Allowance, U.S. Appl. No. 13/464,648, Sep. 19, 2014, 5 pages.
Notice of Allowance, U.S. Appl. No. 13/464,648, Apr. 24, 2015, 23 pages.
Notice of Allowance, U.S. Appl. No. 13/464,648, Jan. 9, 2015, 11 pages.
Notice of Allowance, U.S. Appl. No. 13/475,598, Feb. 14, 2017, 41 pages.
Notice of Allowance, U.S. Appl. No. 13/633,702, Aug. 15, 2014, 11 pages.
Notice of Allowance, U.S. Appl. No. 13/633,702, Jan. 6, 2015, 27 pages.

(56) References Cited

OTHER PUBLICATIONS

Notice of Allowance, U.S. Appl. No. 13/797,971, Jan. 29, 2018, 15 pages.
Notice of Allowance, U.S. Appl. No. 13/797,971, May 4, 2017, 8 pages.
Notice of Allowance, U.S. Appl. No. 13/797,971, Oct. 18, 2017, 144 pages.
Notice of Allowance, U.S. Appl. No. 14/023,302, Apr. 27, 2016, 3 pages.
Notice of Allowance, U.S. Appl. No. 14/023,302, Feb. 5, 2016, 27 pages.
Notice of Allowance, U.S. Appl. No. 14/023,302, Oct. 9, 2015, 5 pages.
Notice of Allowance, U.S. Appl. No. 14/086,700, Feb. 28, 2018, 5 pages.
Notice of Allowance, U.S. Appl. No. 14/086,700, May 18, 2018, 21 pages.
Notice of Allowance, U.S. Appl. No. 14/086,700, Sep. 28, 2018, 21 pages.
Notice of Allowance, U.S. Appl. No. 14/156,254, Feb. 26, 2016, 21 pages.
Notice of Allowance, U.S. Appl. No. 14/156,254, Jul. 8, 2015, 7 pages.
Notice of Allowance, U.S. Appl. No. 14/156,254, Mar. 12, 2015, 5 pages.
Notice of Allowance, U.S. Appl. No. 14/156,254, Nov. 3, 2015, 29 pages.
Notice of Allowance, U.S. Appl. No. 15/201,276, Oct. 11, 2018, 5 pages.
Notice of Allowance, U.S. Appl. No. 15/201,276, Nov. 27, 2017, 7 pages.
Notice of Allowance, U.S. Appl. No. 15/616,817, Jun. 26, 2018, 131 pages.
Notice of Allowance, U.S. Appl. No. 15/616,817, Oct. 22, 2018, 21 pages.
Notice of Allowance, U.S. Appl. No. 15/616,817, Apr. 25, 2018, 10 pages.
Notice of Allowance, U.S. Appl. No. 16/253,028, Feb. 25, 2020, 7 pages.
Notice of Allowance, U.S. Appl. No. 16/253,028, Mar. 12, 2020, 7 pages.
Notice of Allowance from U.S. Appl. No. 12/802,958, Sep. 19, 2018, 22 pages.
Notice of Final Rejection, KR App. No. 10-2015-7028298, Mar. 14, 2022, 8 pages (4 pages of English Translation and 4 pages of Original Document).
Notice of Final Rejection, KR App. No. 10-2020-7002077, Oct. 15, 2020, 8 pages (4 pages of English Translation and 4 pages of Original Document).
Notice of Grant, CN App. No. 201210464974.6, Jul. 1, 2015, 3 pages.
Notice of Reason for Rejection, KR App. No. 10-2019-7006428, Jun. 28, 2021, 20 pages (11 pages of English Translation and 9 pages of Original Document).
Notice of Reasons for Refusal, JP App. No. 2019-074024, Aug. 3, 2020, 10 pages (6 pages of English Translation and 4 pages of Original Document).
Notice of Reasons for Refusal, JP App. No. 2019-093904, May 27, 2021, 5 pages (3 pages of English Translation and 2 pages of Original Document).
Notice of Reasons for Refusal, JP App. No. 2019-109413, Sep. 10, 2020, 8 pages (5 pages of English Translation and 3 pages of Original Document).
Notice of Reasons for Rejection, JP App. No. 2016-234908, May 23, 2019, 6 pages (3 pages of English Translation and 3 pages of Original Document).

* cited by examiner

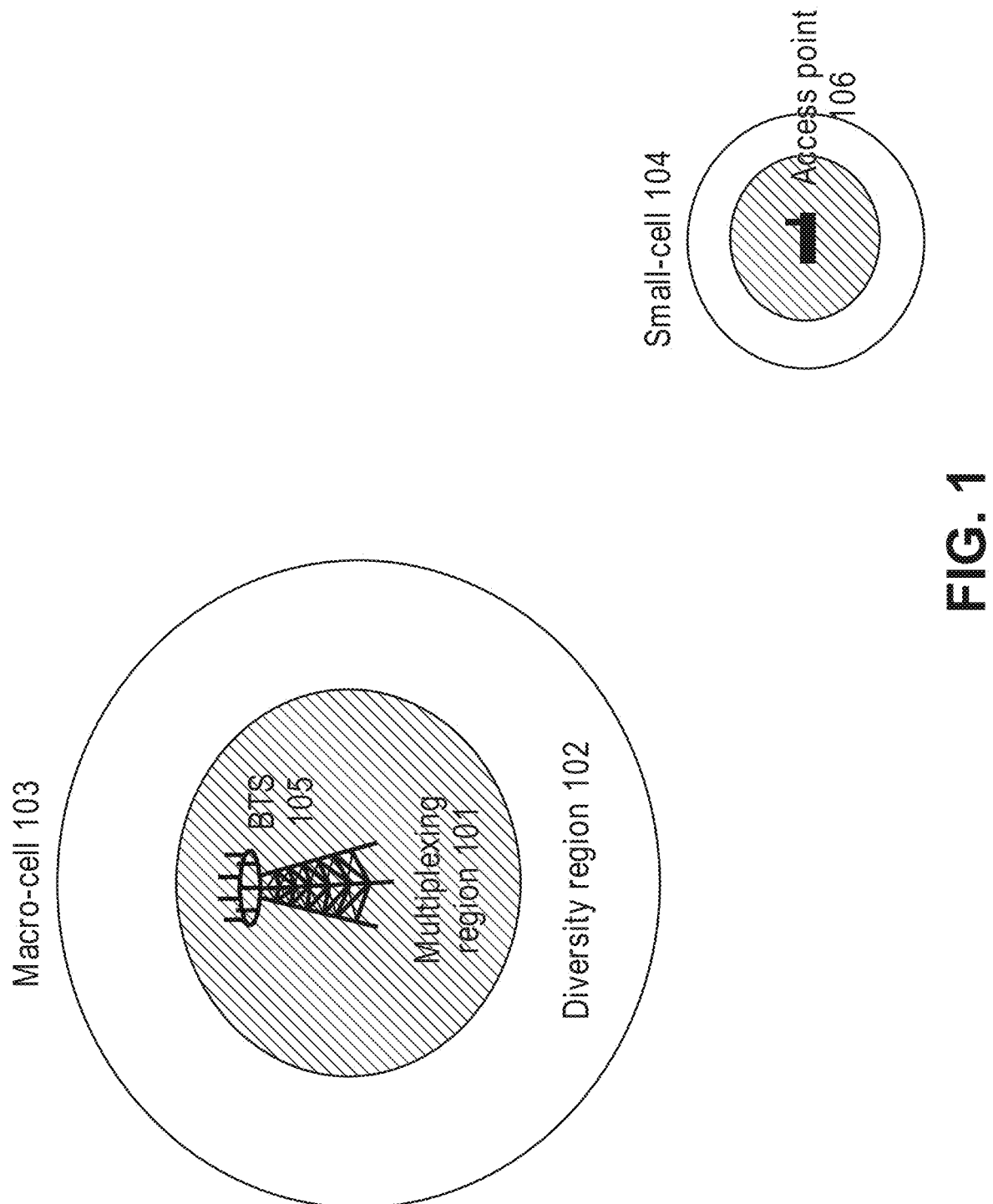

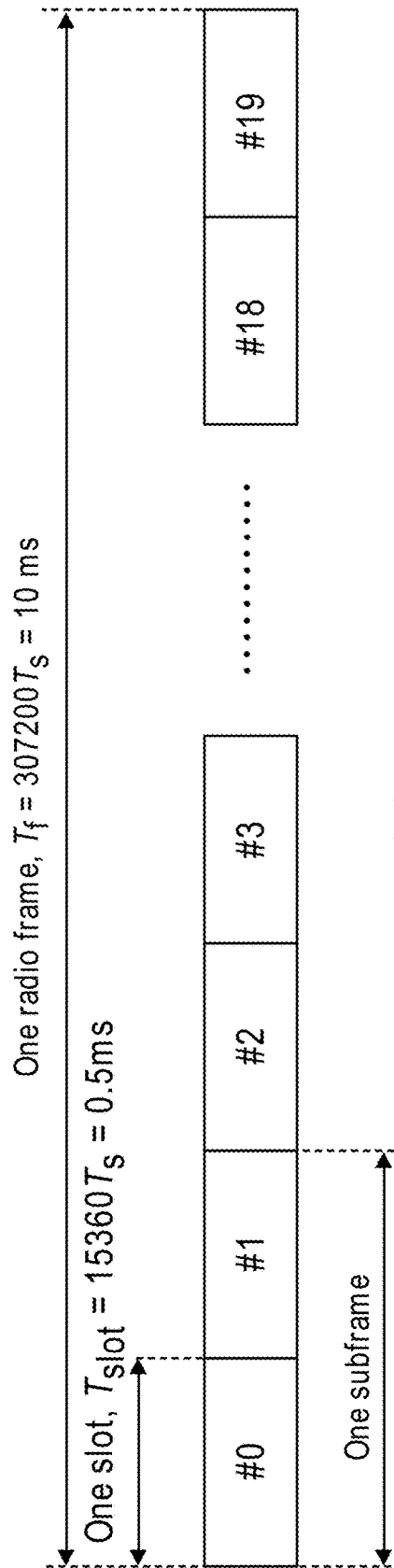
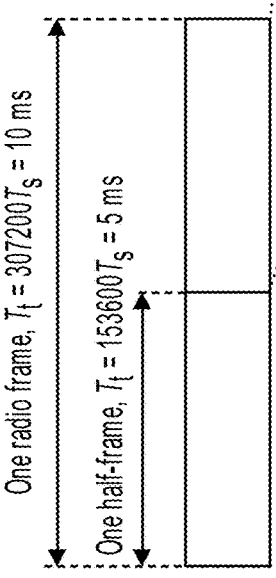
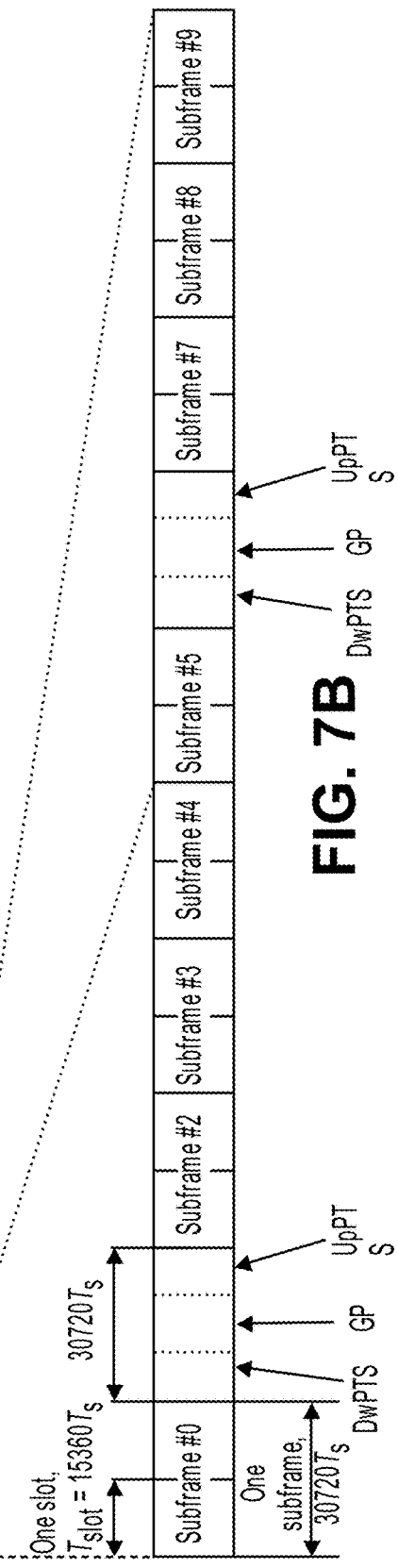
FIG. 7A
FIG. 7B

SYSTEMS AND METHODS FOR RADIO FREQUENCY CALIBRATION EXPLOITING CHANNEL RECIPROCITY IN DISTRIBUTED INPUT DISTRIBUTED OUTPUT WIRELESS COMMUNICATIONS

CROSS REFERENCE TO RELATED APPLICATION

This application is a continuation of co-pending U.S. patent application Ser. No. 18/109,207 filed Feb. 13, 2023, which is a continuation of U.S. patent application Ser. No. 17/498,666, filed Oct. 11, 2021, now U.S. Issued U.S. Pat. No. 11,581,924, Issued on Feb. 14, 2023, which is a continuation of U.S. patent application Ser. No. 16/719,169, filed on Dec. 18, 2019, now U.S. Issued U.S. Pat. No. 11,146,313, issued on Oct. 12, 2021, which is a continuation of U.S. patent application Ser. No. 13/844,355, which was filed Mar. 15, 2013, now U.S. Issued U.S. Pat. No. 10,547,358, Issued on Jan. 28, 2020, all of which is herein incorporated by reference.

RELATED APPLICATIONS

This application may be related to the following co-pending U.S. Patent Applications ("Related Patents and Applications"):

U.S. application Ser. No. 13/797,984, entitled "Systems and Methods for exploiting inter-cell multiplexing gain in wireless systems via distributed input distributed output technology"

U.S. application Ser. No. 13/797,971, entitled "Systems and Methods for exploiting inter-cell multiplexing gain in wireless systems via distributed input distributed output technology"

U.S. application Ser. No. 13/797,950, entitled "Systems and Methods for exploiting inter-cell multiplexing gain in wireless systems via distributed input distributed output technology"

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

BACKGROUND

In the last three decades, the wireless cellular market has experienced increasing number of subscribers worldwide as well as demand for better services shifting from voice to web-browsing and real-time HD video streaming. This increasing demand for services that requires higher data rate, lower latency and improved reliability has driven a radical evolution of wireless technologies through different standards. Beginning from the first generation analog AMPS and TACS (for voice service) in the early 1980s, to 2G and 2.5G digital GSM, IS-95 and GPRS (for voice and data services) in the 1990s, to 3G with UMTS and CDMA2000 (for web-browsing) in the early 2000s, and finally LTE (for high-speed internet connectivity) currently under deployment in different countries worldwide.

Long-term evolution (LTE) is the standard developed by the 3rd generation partnership project (3GPP) for fourth generation (4G) wireless cellular systems. LTE can achieve theoretically up to 4× improvement in downlink spectral efficiency over previous 3G and HSPA+ standards by exploiting the spatial components of wireless channels via multiple-input multiple-output (MIMO) technology. LTE-Advanced is the evolution of LTE, currently under standardization, that will enable theoretically up to 8× increase in spectral efficiency over 3G standard systems.

Despite this technology evolution, it is very likely that in the next three years wireless carriers will not be able to satisfy the growing demand for data rate due to raising market penetration of smartphones and tables, offering more data-hungry applications like real-time HD video streaming, video conferencing and gaming. It has been estimated that capacity of wireless networks will grow 5× in Europe from 2011 to 2015 due to improved technologies such as LTE as well as more spectrum made available by the government [Reference 25]. For example, the FCC is planning to free 500 MHz of spectrum by 2020 (of which 300 MHz will be available by 2015) to promote wireless Internet connectivity throughout the US as part of the National Broadband Plan [Reference 24]. Unfortunately, the forecast for capacity usage by 2015 is 23× over 2011 in Europe [Reference 25] and similar spectrum deficit is expected to happen in the US by 2014 [References 26-27]. As a result of this data crunch, revenues for wireless carriers may drop below their CAPEX and OPEX with potentially devastating impact on the wireless market [Reference 28].

As capacity gains offered by LTE deployment and increased spectrum availability are insufficient, the only foreseeable solution to prevent this upcoming spectrum crisis is to promote new wireless technologies [Reference 29]. LTE-Advanced (the evolution of LTE standard) promises additional gains over LTE through more sophisticated MIMO techniques and by increasing the density of "small cells" [Reference 30]. However, there are limits to the number of cells that can fit a certain area without incurring interference issues or increasing the complexity of the backhaul to allow coordination across cells.

One promising technology that will provide orders of magnitude increase in spectral efficiency over wireless links without the limitations of conventional cellular systems is distributed-input distributed-output (DIDO) technology (see Related Patents and Applications referenced above). The present invention describes DIDO technology employed in the context of cellular systems (such as LTE or LTE-Advanced), both within and without the constraints of cellular standards, to provide significant performance benefits over conventional wireless systems. We begin with an overview on MIMO and review different spatial processing techniques employed by LTE and LTE-Advanced. Then we show how the present invention provides significant capacity gains for next generation wireless communications systems compared to prior art approaches.

MIMO employs multiple antennas at the transmitter and receiver sides of the wireless link and uses spatial processing to improve link reliability via diversity techniques (i.e., diversity gain) or provide higher data rate via multiplexing schemes (i.e., multiplexing gain) [References 1-2]. Diversity gain is a measure of enhanced robustness to signal fading, resulting in higher signal-to-noise ratio (SNR) for fixed data rate. Multiplexing gain is obtained by exploiting additional spatial degrees of freedom of the wireless channel to increase data rate for fixed probability of error. Fundamental tradeoffs between diversity and multiplexing in MIMO systems were described in [References 3-4].

In practical MIMO systems, link adaptation techniques can be used to switch dynamically between diversity and multiplexing schemes based on propagation conditions [References 20-23]. For example, link adaptation schemes described in [References 22-23] showed that beamforming or Orthogonal Space-Time Block Codes (OSTBC) are preferred schemes in low SNR regime or channels characterized by low spatial selectivity. By contrast, spatial multiplexing can provide significant gain in data rate for channels with high SNR and high spatial selectivity. For example, FIG. 1 shows that cells can be divided in two regions: i) multiplexing region 101, characterized by high SNR (due to proximity to the cell tower or base station) where the spatial degrees of freedom of the channel can be exploited via spatial multiplexing to increase data rate; ii) diversity region 102 or cell-edge, where spatial multiplexing techniques are not as effective and diversity methods can be used to improve SNR and coverage (yielding only marginal increase in data rate). Note that the circle of the macrocell 103 in FIG. 1 labels the shaded center of the circle as the "multiplexing region" and the unshaded outer region of the circle as the "diversity region". This same region designation is used throughout FIGS. 1,3-5, where the shaded region is the "multiplexing region" and the unshaded region is the "diversity region", even if they are not labeled. For example, the same designation is used for the small-cell 104 in FIG. 1.

The LTE (Release 8) and LTE-Advanced (Release 10) standards define a set of ten transmission modes (TM) including either diversity or multiplexing schemes [References 35,85-86]:

Mode 1: Single antenna port, port 0
Mode 2: Transmit diversity
Mode 3: Large-delay cyclic delay diversity (CDD), extension of open-loop spatial multiplexing for single-user MIMO (SU-MIMO)
Mode 4: Closed-loop spatial multiplexing for SU-MIMO
Mode 5: Multi-user MIMO (MU-MIMO).
Mode 6: Closed-loop spatial multiplexing, using a single transmission layer
Mode 7: Single antenna port, UE-specific RS (port 5)
Mode 8: Single or dual-layer transmission with UE-specific RS (ports 7 and/or 8)
Mode 9: Single or up to eight layers closed-loop SU-MIMO (added in Release 10)
Mode 10: Multi-layer closed-loop SU-MIMO, up to eight layers (added in Release 10)

Hereafter we describe diversity and multiplexing schemes commonly used in cellular systems as well as specific methods employed in LTE as outlined above, and compare them against techniques that are unique for DIDO communications. We first identify two types of transmission methods: i) intra-cell methods (exploiting micro-diversity in cellular systems), using multiple antennas to improve link reliability or data rate within one cell; ii) inter-cell methods (exploiting macro-diversity), allowing cooperation between cells to provide additional diversity or multiplexing gains. Then we describe how the present invention provides significant advantages (including spectral capacity gain) over prior art.

1. Intra-Cell Diversity Methods

Intra-cell diversity methods operate within one cell and are designed to increase SNR in scenarios with poor link quality (e.g., users at the cell-edge subject to high pathloss from the central tower or base station). Typical diversity schemes employed in MIMO communications are beamforming [References 5-11] and orthogonal space-time block codes (OSTBC) [References 12-15].

Diversity techniques supported by the LTE standard are transmit diversity, closed-loop rank-1 precoding and dedicated beamforming [References 31-35]. Transmit diversity scheme supports two or four transmit antennas over the downlink (DL) and only two antennas for the uplink (UL). In the DL channel, it is implemented via space-frequency block codes (SFBC) combined with frequency-switched transmit diversity (FSTD) to exploit space as well as frequency selectivity [Reference 31]. Rank-1 precoding creates a dedicated beam to one user based on quantized weights selected from a codebook (pre-designed using limited feedback techniques [References 36-42]) to reduce the feedback overhead from the user equipment (UE) to the base transceiver station (BTS 105 in FIG. 1, or eNodeB using LTE terminology). Alternatively, dedicated beamforming weights can be computed based on UE-specific reference signal.

2. Intra-cell Multiplexing Methods

MIMO multiplexing schemes [References 1,19] provide gain in data rate in high SNR regime and in scenarios with enough spatial degrees of freedom in the channel (e.g., rich multipath environments with high spatial selectivity [References 16-18]) to support multiple parallel data streams over wireless links.

The LTE standard supports different multiplexing techniques for single-user MIMO (SU-MIMO) and multi-user MIMO (MU-MIMO) [Reference 31]. SU-MIMO schemes have two modes of operation: i) closed-loop, exploiting feedback information from the UE to select the DL precoding weights; ii) open-loop, used when feedback from the UE is unavailable or the UE is moving too fast to support closed-loop schemes. Closed-loop schemes use a set of pre-computed weights selected from a codebook. These weights can support two or four transmit antennas as well as one to four parallel data streams (identified by number of layers of the precoding matrix), depending on the UE request and decision of the scheduler at the BTS. LTE-Advanced will include new transmission modes up to MIMO 8×8 to provide up to 8× increase in spectral efficiency via spatial processing [Reference 62].

MU-MIMO schemes are defined for both UL and DL channels [References 31,50]. In the UL, every UE sends a reference signal to the BTS (consisting of cyclically shifted version of the Zadoff-Chu sequence [Reference 33]). Those reference signals are orthogonal, such that the BTS can estimate the channel from all UEs and demodulate data streams from multiple UEs simultaneously via spatial processing. In the DL, precoding weights for different UEs are selected from codebooks based on the feedback from the UEs and the scheduler (similarly to closed-loop SU-MIMO schemes) and only rank-1 precoding is allowed for every UE (e.g., each UE receives only one data stream).

Intra-cell multiplexing techniques employing spatial processing provide satisfactory performance only in propagation scenarios characterized by high SNR (or SINR) and high spatial selectivity (multipath-rich environments). For conventional macrocells, these conditions may be harder to achieve as BTSs are typically far from the UEs and the distribution of the SINR is typically centered at low values [Reference 43]. In these scenarios, MU-MIMO schemes or diversity techniques may be better choices than SU-MIMO with spatial multiplexing.

Other techniques and network solutions contemplated by LTE-Advanced to achieve additional multiplexing gain (without requiring spatial processing through MIMO) are: carrier aggregation (CA) and small cells. CA [References 30, 44-47] combines different portions of the RF spectrum to increase signal bandwidth up to 100 MHz [Reference 85], thereby yielding higher data rates. Intra-band CA combines different bands within the same portion of the spectrum. As such it can use the same RF chain for multiple channels, and multiple data streams are recombined in software. Inter-band CA requires different RF chains to operate at different portions of the spectrum as well as signal processing to recombine multiple data streams from different bands.

The key idea of small cells [References 30,47] is to reduce the size of conventional macro-cells, thereby allowing higher cell density and larger throughput per area of coverage. Small-cells are typically deployed through inexpensive access points 106 with low power transmission (as depicted in FIG. 1) as opposed to tall and expensive cell towers used for macro-cells. Two types of small cells are defined in LTE-Advanced: i) metrocells, for outdoor installation in urban areas, supporting up 32 to 64 simultaneous users; and ii) femtocells, for indoor use, can serve at most 4 active users. One advantage of small cells is that the density of UEs close to the BTS is statistically higher, yielding better SNR that can be exploited via spatial multiplexing to increase data rate. There are, however, still many concerns about practical deployment of small cells, particularly related to the backhaul. In fact, it may be challenging to reach BTSs of every small cell via high-speed wireline connections, especially considering the high density of metrocells and femtocells in a given coverage area. While using Line-Of-Sight (LOS) backhaul to small cells can often be implemented inexpensively, compared to wireline backhaul, there often are no practical LOS backhaul paths available for preferred small cell BTS placements, and there is no general solution for Non-Line-Of-Sight (NLOS) wireless backhaul to small cell BTSs. Moreover, small cells require complex real-time coordination across BTSs to avoid interference as in self-organized networks (SON) [References 30,51-52] and sophisticated cell-planning tools (even more complex than conventional cellular systems, due to higher density of small cells) to plan their optimal location [References 48,49]. Finally, handoff is a limiting factor for small cells deployment, particularly in scenarios where groups of subscribers switch cells at the same time, causing large amount of handoff overhead over the backhaul, resulting in high latency and unavoidable dropped calls.

It can be trivially shown there is no practical general solution that enables small cells to co-exist with macrocells and achieve optimal, or necessarily even improved, throughput. Among the myriad of such unsolvable situations is when a small cell is located such that its UEs unavoidably overlap with a macrocell transmission and the small cell and the macrocell use the same frequencies to reach their respective UEs. Clearly in this situation, the macrocell transmission will interfere with the small cell transmission. While there may be some approach that mitigates such interference for particular circumstances of a particular macrocell, a particular small cell, the particular macrocell and small cell UEs involved, the throughput requirements of those UEs, and environmental circumstances, etc., any such approach would be highly specific, not only to the static plan of the macrocell and small cell, but to the dynamic circumstances of a particular time interval. Typically, the full throughput of the channel to each UE cannot be achieved.

3. Inter-Cell Diversity Methods

In a heterogeneous network (HetNet) [Reference 90] where macro-cells coexist with small-cells (e.g., metro-cells, pico-cells and femto-cells) it is necessary to employ different techniques to eliminate inter-cell interference. While HetNets provide better coverage through small-cells, the gains in data rate are only marginal since they require sharing the spectrum through different forms of frequency reuse patterns or using spatial processing to remove interference rather than achieve multiplexing gain. The LTE standards employ inter-cell interference coordination (ICIC)

schemes to remove interference particularly at the cell-edge. There are two types of ICIC methods: cell-autonomous and coordinated between BTSs.

Cell-autonomous ICIC schemes avoid inter-cell interference via different frequency reuse patterns depicted in FIG. 2, where the hexagons represent the cells and the colors refer to different carrier frequencies. Three types of schemes are considered in LTE: i) full frequency reuse (or reuse 1), where the cells utilize all the available bandwidth as in FIG. 2a, thereby producing high interference at the cell-edge; ii) hard frequency reuse (HFR), where every cell is assigned with a different frequency band as in FIG. 2b (with typical reuse factor of 3) to avoid interference across adjacent cells; iii) fractional frequency reuse (FFR), where the center of the cell is assigned with the whole available bandwidth as in frequency reuse 1, whereas the cell-edge operates in HFR mode to mitigate inter-cell interference as in FIG. 2c.

Coordinated ICIC methods enable cooperation across BTSs to improve performance of wireless networks. These techniques are a special case of methods taught in Related Patents and Applications above to enable cooperation across wireless transceivers in the general case of distributed antenna networks for multiple UEs all using the same frequency simultaneously. Cooperation across BTSs to remove inter-cell interference for the particular case of cellular systems for a single UE at a given time at a given frequency was described in [Reference 53]. The system in [Reference 53] divides every macrocell into multiple subcells and enables soft-handoff across subcells by employing dedicated beamforming from coordinated BTSs to improve link robustness at a single UE at a single frequency, as it moves along the subcell boundaries.

More recently, this class of cooperative wireless cellular networks has been defined in the MIMO literature as "network MIMO" or "coordinated multi-point" (COMP) systems. Theoretical analysis and simulated results on the benefits obtained in network MIMO by eliminating inter-cell interference are presented in [References 54-61]. The key advantage of network MIMO and CoMP is to remove inter-cell interference in the overlapping regions of the cells denoted as "interference region" 301 in FIG. 3 for the case of macro-cells 302.

COMP networks are actively becoming part of LTE-Advanced standard as a solution to mitigate inter-cell interference in next generation cellular networks [References 62-64]. Three COMP solutions have been proposed so far in the standard to remove inter-cell interference: i) coordinated scheduling/beamforming (CS/CB), where the UE receives its data stream from only one BTS via beamfoming and coordination across BTSs is enabled to remove interference via beamforming or scheduling techniques; ii) dynamic cell selection (DCS) that chooses dynamically the cell for every UE on a per-subframe basis, transparently to the UE; iii) joint transmission (JT), where data for given UE is jointly transmitted from multiple BTSs to improve received signal quality and eliminate inter-cell interference. COMP-JT yields larger gains than CoMP-CS/CB at the expenses of higher overhead in the backhaul to enable coordination across BTSs.

4. Inter-cell Multiplexing Methods

Prior art multi-user wireless systems add complexity and introduce limitations to wireless networks which result in a situation where a given user's experience (e.g. available throughput, latency, predictability, reliability) is impacted by the utilization of the spectrum by other users in the area. Given the increasing demands for aggregate throughput within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

Prior art intra-cell diversity and multiplexing methods can only provide up to a theoretical 4× increase in throughput over current cellular networks for LTE (through MIMO 4×4) or at most a theoretical 8× for LTE-Advanced (through MIMO 8×8), although higher orders of MIMO achieve diminishing improvements in increasing throughput in a given multipath environment, particularly as UEs (such as smartphones) get smaller and more constrained in terms of antenna placement. Other marginal throughput gains in next generation cellular systems may be obtained from additional spectrum allocation (e.g., FCC national broadband plan), exploited via carrier aggregation techniques, and more dense distribution of BTSs via small cell networks and SON [References 30,46]. All the above techniques, however, still rely heavily on spectrum or time sharing techniques to enable multi-user transmissions, since the spectral efficiency gains obtained by spatial processing is limited.

While prior art inter-cell methods (e.g., network MIMO and CoMP systems [References 53-64]) can improve reliability of cellular networks by eliminating inter-cell interference, their capacity gains are only marginal. In fact, those systems constrain power transmitted from every BTS to be contained within the cell boundaries and are only effective to eliminate inter-cell interference due to power leakage across cells. FIG. 3 shows one example of cellular networks with three BTSs, each one characterized by its own coverage area or cell. The power transmitted from each BTS is constrained to limit the amount of interference across cells, depicted in FIG. 3 by the areas where the cells overlap. As these systems operate in the low SINR regime at the interference region, their gains in spectral efficiency is only marginal, similarly to intra-cell schemes for SU-MIMO. To truly obtain significant capacity gains in inter-cell cooperative networks, power constraints limited to cell-boundaries must be relaxed and spatial multiplexing techniques should be enabled throughout the cells where the SINR is high (not just at the cell-edge with poor SINR performance as in prior art approaches).

FIG. 4 shows the case where the power transmitted from the three BTSs 401 all transmitting simultaneously at the same frequency is increased, thereby allowing a higher level of interference throughout the cell 402. In prior art systems, such interference would result in incoherent interference (disrupting UE signal reception) throughout the interfering areas of the BTSs, but this interference is actually exploited in the present invention through novel inter-cell multiplexing methods using spatial processing to create areas of coherent interference (enhancing UE signal reception) around every UE, thereby providing simultaneous non-interfering data streams to every UE and increasing their SINR throughout the cell.

The scenario depicted in FIG. 4 is described in [Reference 89] for the particular case of cellular systems. The system in [Reference 89] consists of several BTSs identifying different cells that are grouped into clusters. Cooperation is allowed only across BTSs from adjacent cells within the same clusters. In this case it was shown that, as the power transmitted from the BTSs increases, there is a limit to the capacity (or spectral efficiency) achievable through inter-cell multiplexing methods. In fact, as the transmit power increases, the out-of-cluster interference increases proportionally, producing a saturation regime for the SINR and consequently for the capacity. As a consequence of this effect, the system in [Reference 89] can theoretically achieve at most 3× gain in capacity (i.e., at most three cells within the cluster) and any additional cell included in the cluster would reduce capacity due to increased out-of-cluster interference (e.g., the case of 21 cells per cluster yields lower capacity than the case of 3 cells per cluster). We observe that the fundamental capacity limit in [Reference 89] holds because the BTSs are constrained to predefined locations, as in cellular systems, and multiplexing gain is achieved by increasing transmit power from the BTSs. To obtain theoretically unlimited capacity gain via inter-cell multiplexing methods, the constraint on the BTS placement must be removed, allowing the BTSs to be placed anywhere is convenient.

It would thus be desirable to provide a system that achieves orders of magnitudes increase in spectral efficiency exploiting inter-cell multiplexing gain via spatial processing by removing any constraint on the power transmitted from distributed BTSs 501 as well as on their placement. FIG. 5 shows one example where many additional access points 502 are added to deliberately increase the level of incoherent interference throughout the cell 503, that is exploited in the present invention to generate areas of coherent interference around UEs, thereby yielding theoretically unlimited inter-cell multiplexing gain. The additional access points are placed serendipitously wherever it is convenient and are not constrained to any specific cell planning, as in cellular systems described in prior art. In an exemplary embodiment of the invention, the serendipitous access points are distributed-input distributed-output (DIDO) access points and the inter-cell multiplexing gain is achieved through DIDO methods described in Related Patents and Applications and [References 77-78]. In another embodiment, the serendipitous access points are low power transceivers, similar to inexpensive Wi-Fi access points or small-cells [References 30,47], thereby providing smaller areas of coverage overlapping throughout the macro-cell as shown in FIG. 5.

We observe that prior art inter-cell methods [References 53-64] avoid incoherent interference by intentionally limiting the transmit power from every BTS as in FIG. 3 and eliminate residual inter-cell interference (on the overlapping areas between cells) via spatial processing, thereby providing improved SINR and inter-cell diversity gain. We further observe that [Reference 89] constrains BTS placement to cell planning while increasing transmit power, thereby limiting the achievable capacity due to out-of-cluster interference, and as such it is still limited by interference. By contrast, the present invention exploits incoherent interference to create coherent interference around the UEs, by transmitting higher power from every BTS serendipitously placed, thereby improving signal quality at the UE that is necessary condition to obtain inter-cell multiplexing gain throughout the cell via spatial processing. As such, the systems described in prior art cannot be used to achieve unlimited inter-cell multiplexing gain via spatial processing, since there is not sufficient SINR throughout the cell (due to the limited transmit power from the BTSs or the out-of-cluster interference when transmit power is increased) to enable inter-cell multiplexing methods as in the present invention. Moreover, the systems described in prior art would be inoperable to achieve the multiplexing gain achieved in the present invention depicted in FIGS. 4-5, given that prior art systems were designed to avoid inter-cell interference within the diversity regions shown in the shaded area of FIG. 1 and FIGS. 3-5 rather than exploit inter-cell interference in the multiplexing regions to obtain inter-cell multiplexing gain as achieved in the present invention.

BRIEF DESCRIPTION OF THE DRAWINGS

A better understanding of the present invention can be obtained from the following detailed description in conjunction with the drawings, in which:

FIG. 1 illustrates multiplexing and diversity regions for a macro-cell and a small-cell.

FIG. 7A illustrates the LTE frame structure for FDD operation.

FIG. 7B illustrates the LTE frame structure for TDD operation.

DETAILED DESCRIPTION

Figure 2C:
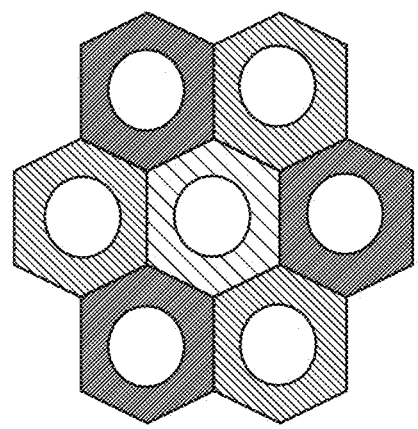
FIG. 2C illustrates fractional frequency reuse (FFR) pattern in conventional cellular systems.
Figure 2B:
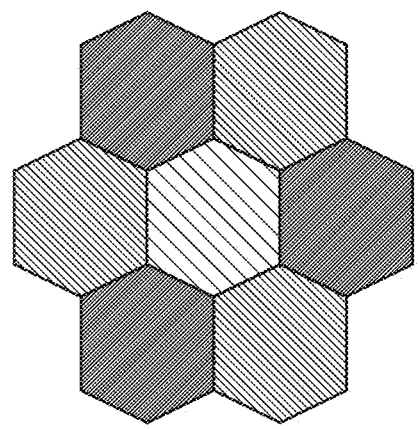
FIG. 2B illustrates hard frequency reuse (HFR) pattern in conventional cellular systems.
Figure 2A:
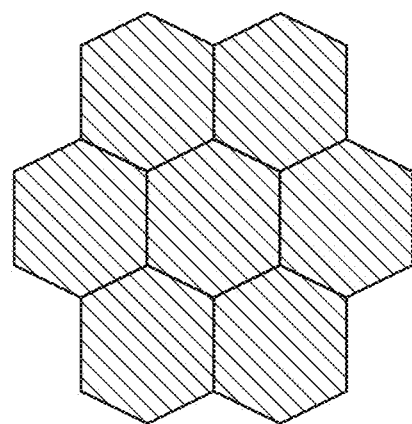
FIG. 2A illustrates full frequency reuse pattern in conventional cellular systems.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "Related Patents and Applications."

U.S. application Ser. No. 13/633,702, entitled "Systems and Methods for wireless backhaul in distributed-input distributed-output wireless systems"

U.S. application Ser. No. 13/475,598, entitled "Systems and Methods to enhance spatial diversity in distributed-input distributed-output wireless systems"

U.S. application Ser. No. 13/233,006, entitled "System and Methods for planned evolution and obsolescence of multiuser spectrum"

U.S. application Ser. No. 13/232,996, entitled "Systems and Methods to Exploit Areas of Coherence in Wireless Systems"

U.S. application Ser. No. 13/464,648, entitled "System and Methods to Compensate for Doppler Effects in Distributed-Input Distributed Output Systems"

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 8,170,081, issued May 1, 2012, entitled "System And Method For Adjusting DIDO Interference Cancellation Based On Signal Strength Measurements"

U.S. Pat. No. 8,160,121, issued Apr. 17, 2012, entitled, "System and Method For Distributed Input-Distributed Output Wireless Communications";

U.S. Pat. No. 7,885,354, issued Feb. 8, 2011, entitled "System and Method For Enhancing Near Vertical Incidence Skywave ("NVIS") Communication Using Space-Time Coding."

U.S. Pat. No. 7,711,030, issued May 4, 2010, entitled "System and Method For Spatial-Multiplexed Tropospheric Scatter Communications";

U.S. Pat. No. 7,636,381, issued Dec. 22, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,599,420, issued Oct. 6, 2009, entitled "System and Method for Distributed Input Distributed Output Wireless Communication";

U.S. Pat. No. 7,418,053, issued Aug. 26, 2008, entitled "System and Method for Distributed Input Distributed Output Wireless Communication";

To reduce the size and complexity of the present patent application, the disclosure of some of the Related Patents and Applications is not explicitly set forth below. Please see the Related Patents and Applications for a full description of the disclosure.

The present invention describes system and methods to exploit inter-cell multiplexing gain in wireless communications networks via spatial processing, employing a multiple antenna system (MAS) with multi-user (MU) transmissions (a Multi-User Multiple Antenna System, or "MU-MAS"), where the multiple antennas are placed serendipitously. In one embodiment of the invention, the power transmitted from the multiple antennas is constrained to minimize interference at cell boundaries (as in conventional cellular systems) and spatial processing methods are employed only to eliminate inter-cell interference. In another embodiment of the invention, the power transmitted from the multiple antennas is not constrained to any particular power level (as long as their power emission level falls within the regulatory, safety or practical (e.g. available power, transmitter and/or antenna specifications) limits), thereby creating intentionally higher levels of inter-cell interference throughout the cell that is exploited to achieve inter-cell multiplexing gain and increase the capacity of the wireless communications network.

Figure 3:
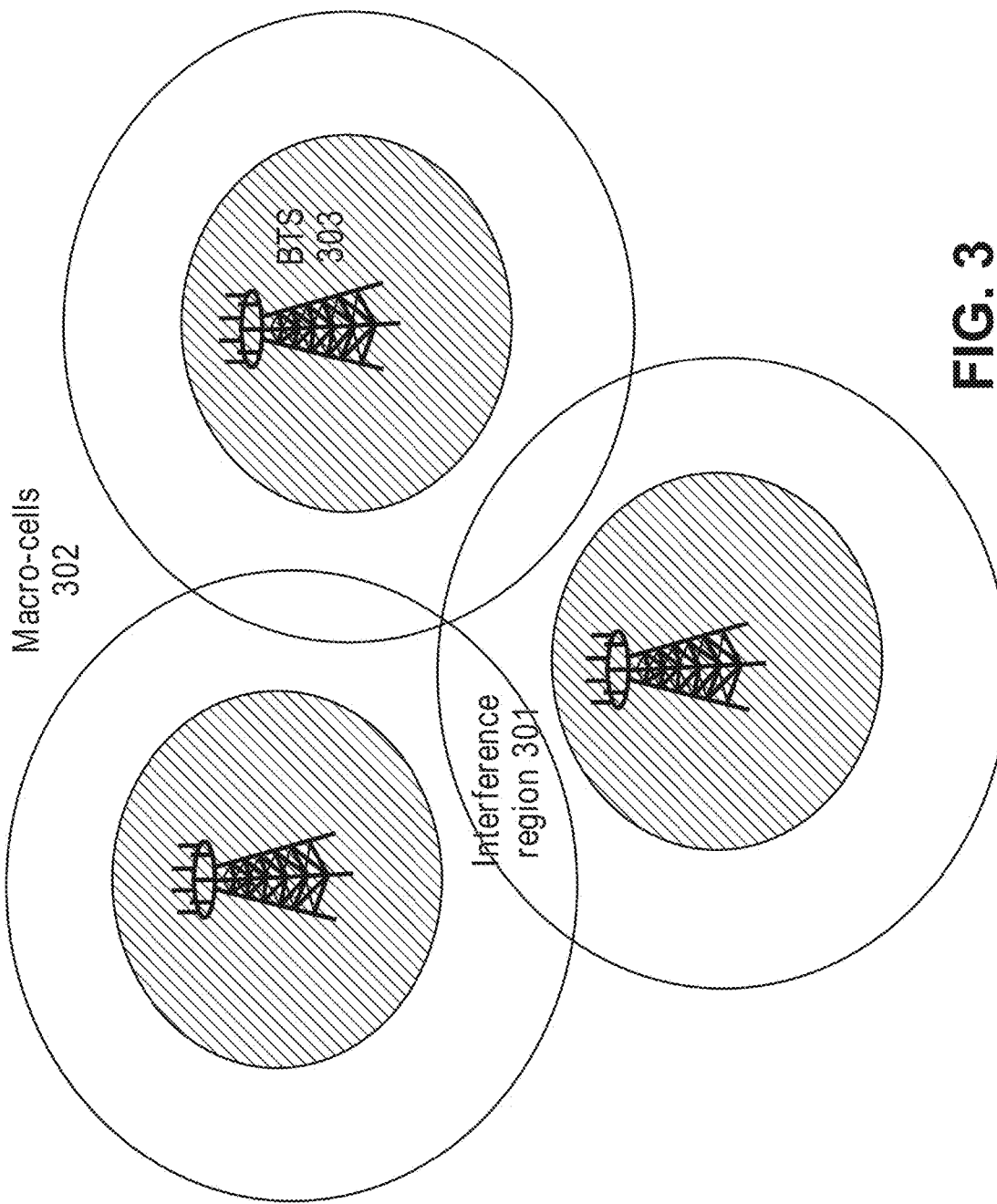
FIG. 3 illustrates the interference region between adjacent macro-cells.
Figure 4:
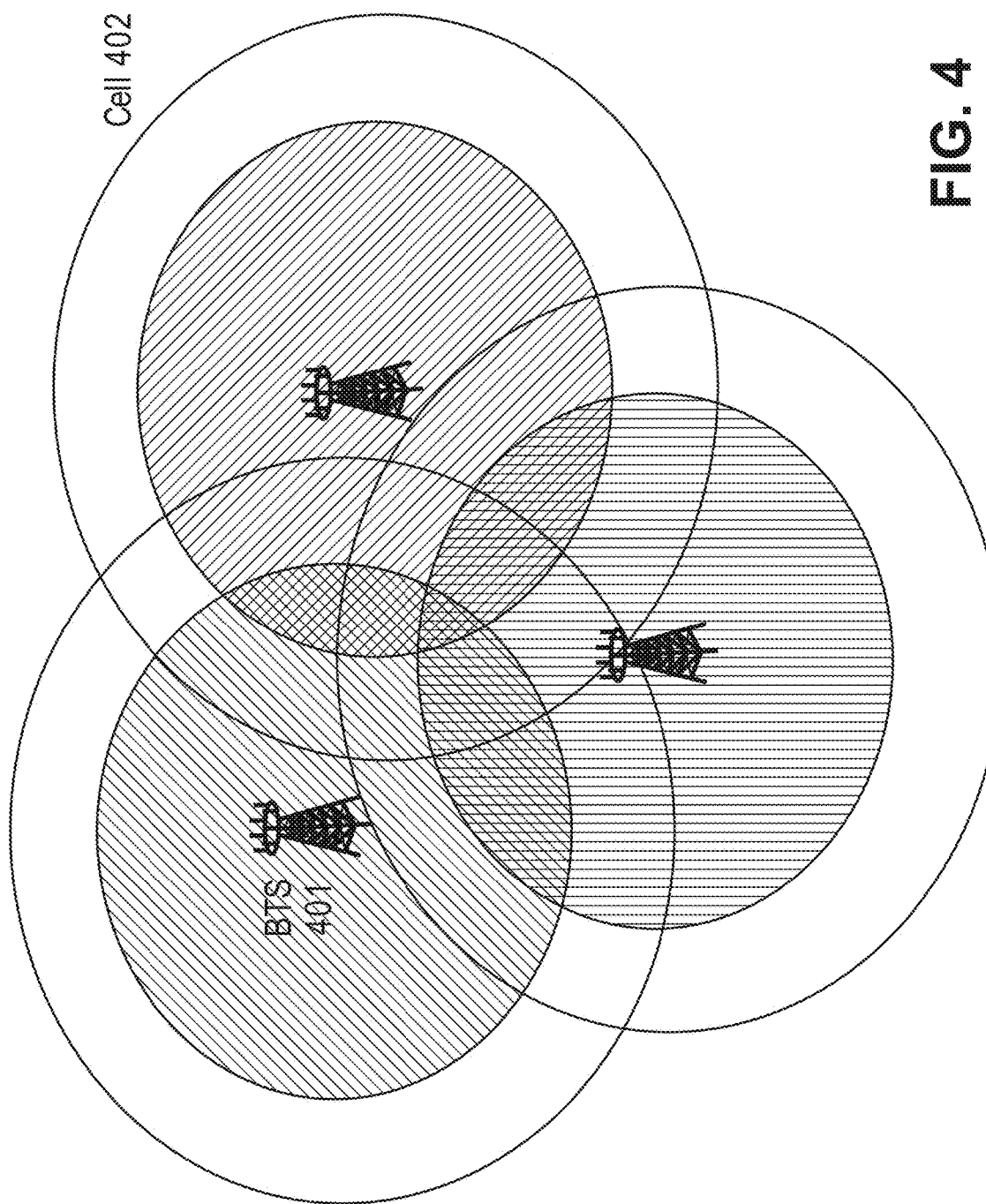
FIG. 4 illustrates multiple BTSs transmitting at higher power to increase the level of interference between cells.
Figure 5:
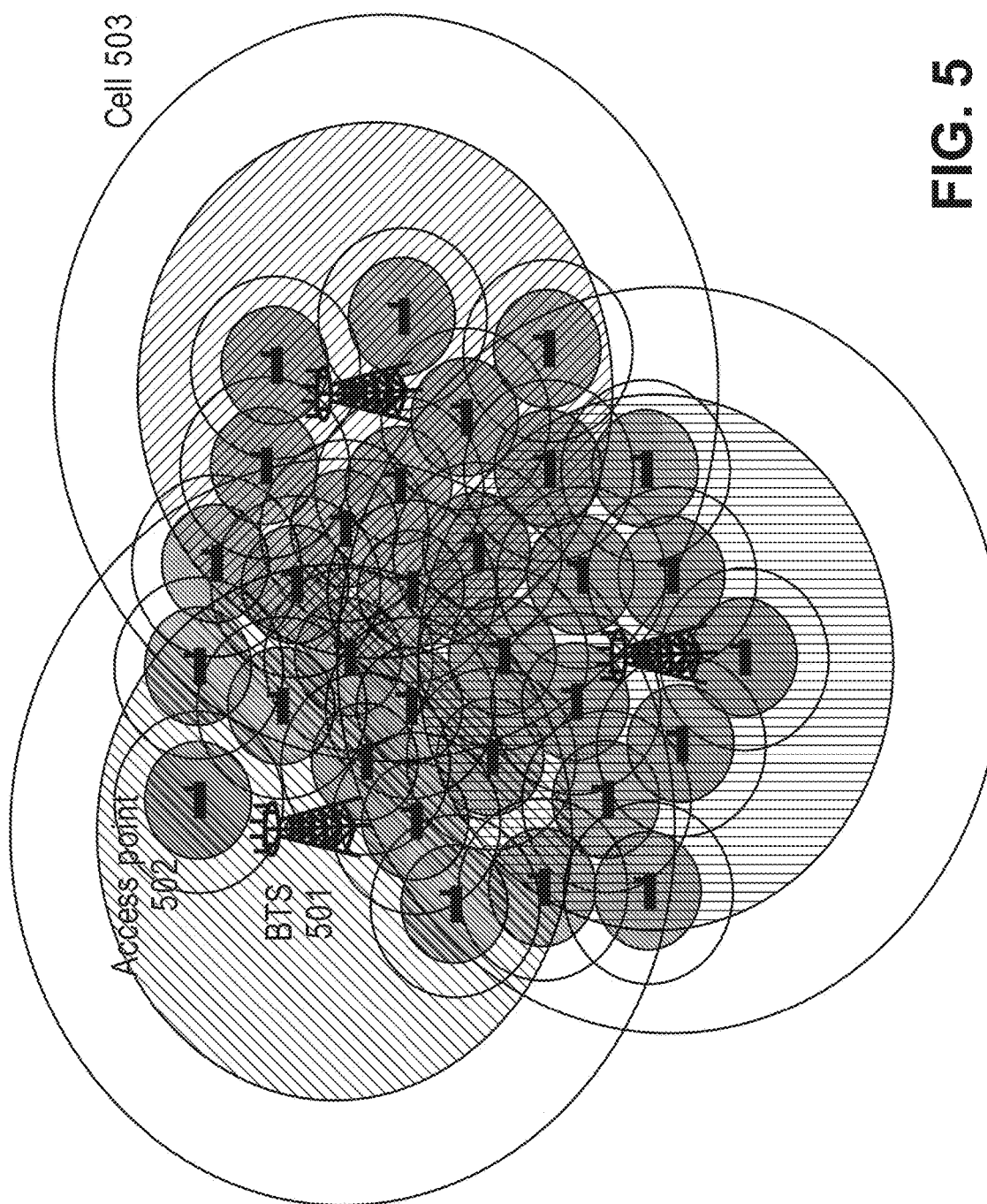
FIG. 5 illustrates one example where many access points are added to deliberately increase the level of incoherent interference throughout the cell.

In one embodiment, the wireless communications network is a cellular network as in FIGS. 1 and 3, such as a cellular network based on LTE standards and the multiple antennas serendipitously deployed are transceivers for macro-cells or small-cells. In another embodiment of the invention, the wireless communications network is not constrained to any particular cell layout and the cell boundaries can extend over larger areas as in FIGS. 4-5. For example, the wireless communications network could be a wireless local area network (WLAN) with multiple antennas being WiFi access points, or a mesh, ad-hoc or sensor network, or a distributed antenna system, or a DIDO system with access points placed serendipitously without any transmit power constraint. But, such example network structures should not be considered as limiting the general applicability of the present invention to wireless communications networks. The present invention applies to any wireless network where multiplexing gain is achieved by transmitting signals from multiple antennas that interfere where received by multiple UEs so as to create simultaneous non-interfering data streams to multiple UEs.

The MU-MAS consists of a centralized processor, a network and M transceiver stations (or distributed antennas)

communicating wirelessly to N client devices or UEs. The centralized processor unit receives N streams of information with different network content (e.g., videos, web-pages, video games, text, voice, etc., streamed from Web servers or other network sources) intended for different client devices. Hereafter, we use the term "stream of information" to refer to any stream of data sent over the network containing information that can be demodulated or decoded as a stand-alone stream, according to certain modulation/coding scheme or protocol, to produce any data, including but not limited to audio, Web and video content. In one embodiment, the stream of information is a sequence of bits carrying network content that can be demodulated or decoded as a standalone stream.

The centralized processor utilizes precoding transformation to combine (according to algorithms, such as those described in the Related Patents and Applications) the N streams of information from the network content into M streams of bits. By way of example, but not limitation, the precoding transformation can be linear (e.g., zero-forcing [Reference 65], block-diagonalization [References 66-67], matrix inversion, etc.) or non-linear (e.g., dirty-paper coding [References 68-70] or Tomlinson-Harashima precoding [References 71-72], lattice techniques or trellis precoding [References 73-74], vector perturbation techniques [References 75-76]). Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the centralized processor and quantized over given number of bits to be sent to one of the M transceiver stations.

Precoding is computed at the centralized processor by employing the Channel State Information (CSI) and applied over the DL or UL channels to multiplex data streams to or from multiple users. In one embodiment of the invention, the centralized processor is aware of the CSI between the distributed antennas and the client devices, and utilizes the CSI to precode data sent over the DL or UL channels. In the same embodiment, the CSI is estimated at the client devices and fed back to the distributed antennas. In another embodiment, the DL-CSI is derived at the distributed antennas from the UL-CSI using radio frequency (RF) calibration and exploiting UL/DL channel reciprocity.

Figure 13:
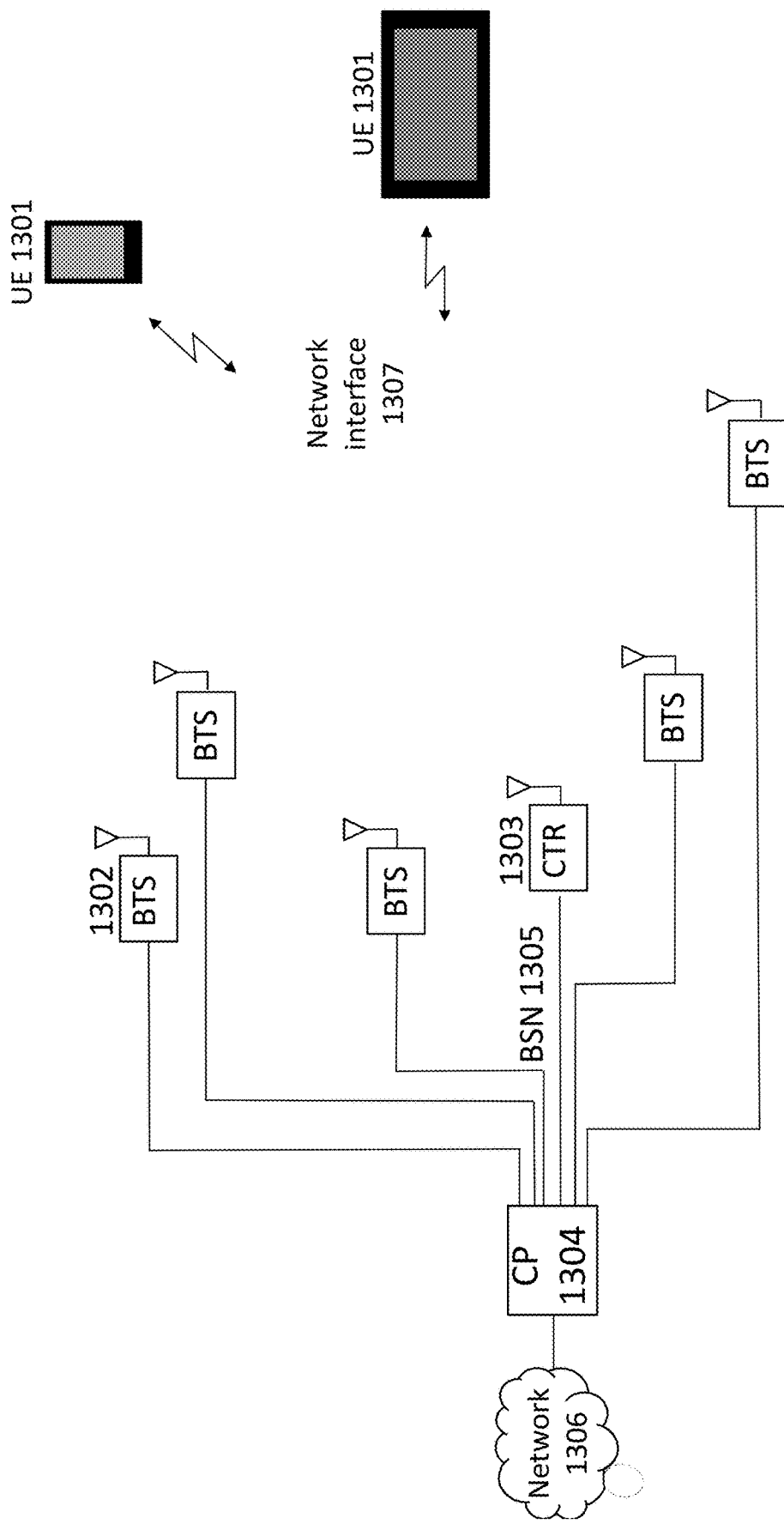
FIG. 13 illustrates one embodiment of a MU-MAS consisting of CP, distributed BTSs and multiple UEs.

In one embodiment, the MU-MAS is a distributed-input distributed-output (DIDO) system as described in Related Patents and Patent Applications. In another embodiment, the MU-MAS depicted in FIG. 13 consists of:

User Equipment (UE) 1301: An RF transceiver for fixed and/or mobile clients receiving data streams over the downlink (DL) channel from the backhaul and transmitting data to the backhaul via the uplink (UL) channel.

Base Transceiver Station (BTS) 1302: The BTSs interface the backhaul with the wireless channel. BTSs of one embodiment are access points consisting of Digital-to-Analog Converter (DAC)/Analog-to-Digital Converter (ADC) and radio frequency (RF) chain to convert the baseband signal to RF. In some cases, the BTS is a simple RF transceiver equipped with power amplifier/antenna and the RF signal is carried to the BTS via RF-over-fiber technology as described in Related Patents and Applications.

Controller (CTR) 1303: A CTR is one particular type of BTS designed for certain specialized features such as transmitting training signals for time/frequency synchronization of the BTSs and/or the UEs, receiving/transmitting control information from/to the UEs, receiving the channel state information (CSI) or channel quality information from the UEs. One or multiple CTR stations can be included in any MU-MAS system. When multiple CTRs are available, the information to or from those stations can be combined to increase diversity and improve link quality. In one embodiment, the CSI is received from multiple CTRs via maximum ratio combining (MRC) techniques to improve CSI demodulation. In another embodiment, the control information is sent from multiple CTRs via maximum ratio transmission (MRT) to improve SNR at the receiver side. The scope of the invention is not limited to MRC or MRT, and any other diversity technique (such as antenna selection, etc.) can be employed to improve wireless links between CTRs and UEs.

Centralized Processor (CP) 1304: The CP is a server interfacing the Internet or other types of external networks 1306 with the backhaul. In one embodiment, the CP computes the MU-MAS baseband processing and sends the waveforms to the distributed BTSs for DL transmission.

Base Station Network (BSN) 1305: The BSN is the network connecting the CP to the distributed BTSs carrying information for either the DL or the UL channel. The BSN is a wireline or a wireless network or a combination of the two. For example, the BSN is a DSL, cable, optical fiber network, or Line-of-Sight (LOS) or Non-Line-of-Sight (NLOS) wireless link. Furthermore, the BSN is a proprietary network, or a local area network, or the Internet.

Hereafter we describe how the above MU-MAS framework is incorporated into the LTE standard for cellular systems (and also non-cellular system utilizing LTE protocols) to achieve additional gains in spectral efficiency. We begin with a general overview of LTE framework and modulation techniques employed in the DL and UL channels. Then we provide a brief description of the physical layer frame structure and resource allocation in the LTE standard. Finally, we define MU-MAS precoding methods for downlink (DL) and uplink (UL) channels in multi-user scenarios using the LTE framework. For the DL schemes, we propose two solutions: open-loop and closed-loop DIDO schemes.

Figure 6:
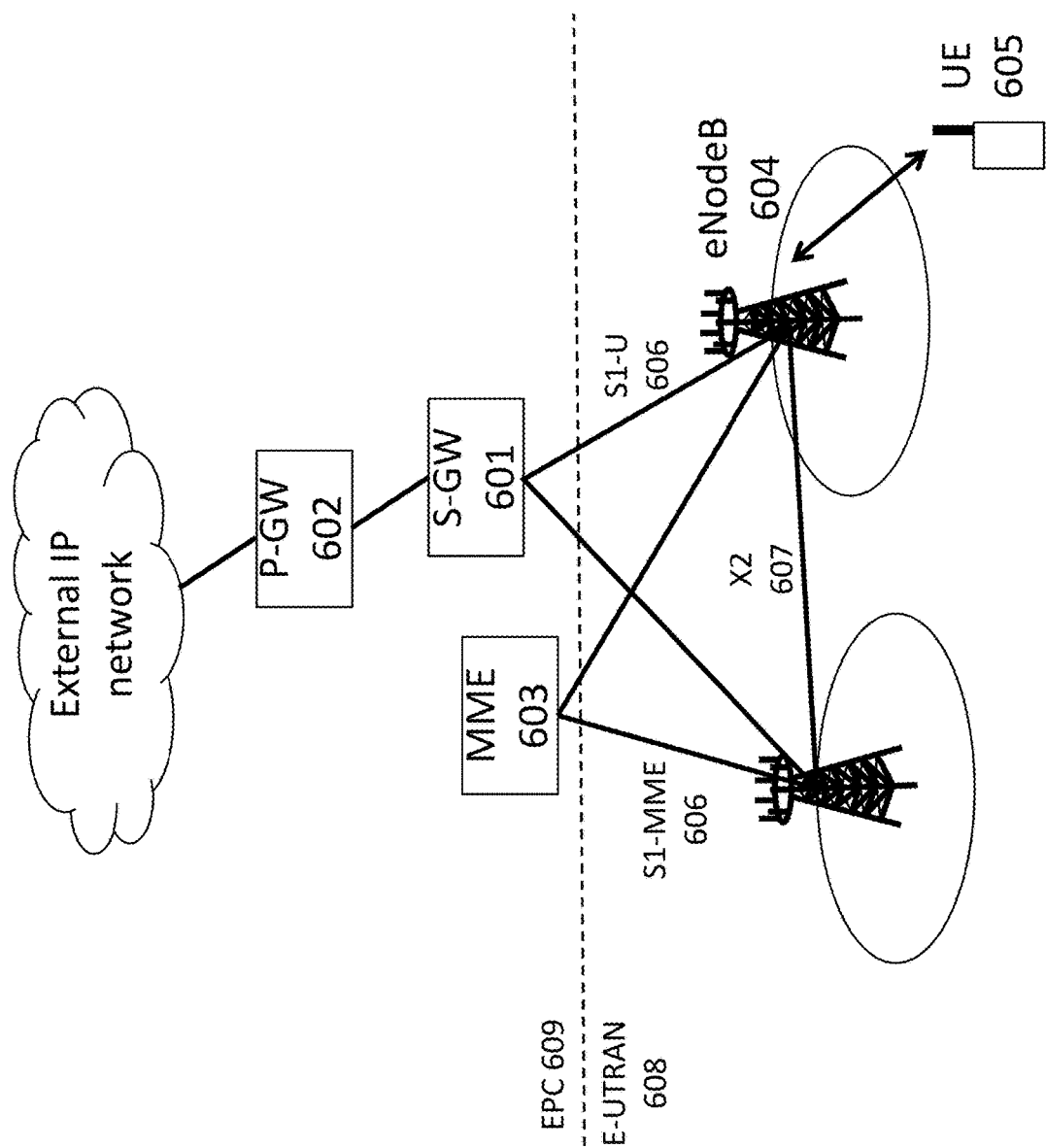
FIG. 6 illustrates the network elements in LTE networks.

LTE is designed with a flat network architecture (as opposed a hierarchical architecture from previous cellular standards) to provide: reduced latency, reduced packet losses via ARQ, reduced call setup time, improved coverage and throughput via macro-diversity. The network elements in LTE networks depicted in FIG. 6 are per [Reference 79]:

GW (gateway): is the router connecting the LTE network to external networks (i.e., the Internet). The GW is split into serving gateway (S-GW) 601 that terminates the E-UTRAN interface 608 and PDN gateway (P-GW) 602 being the interface with external networks. The S-GW and P-GW are part of the so called evolved packet core (EPC) 609;

MME (mobility management entity) 603: manages mobility, security parameters and UE identity. The MME is also part of the LTE EPC;

eNodeB (enhanced Node-B) 604: is the base station handling radio resource management, user mobility and scheduling;

UE (user equipment) 605: is the mobile station.

S1 and X2 interfaces (606 and 607): are the wireline or wireless backhauls between the MME and eNodeBs (S1-MME), the S-GW and eNodeBs (S1-U) and between multiple eNodeBs (X2).

In one embodiment of the invention, the MU-MAS network is an LTE network wherein the UE is the LTE UE, the BTS is the LTE eNodeB, the CTR is the LTE eNodeB or MME, the CP is the LTE GW, the BSN is the S1 or X1 interface. Hereafter we use the terms distributed antennas, BTS and eNodeB interchangeably to refer to any base station in MU-MAS, DIDO or LTE systems.

The LTE frame has duration of 10 msec and consists of ten subframes as depicted in FIG. 7 [References 33,80]. Every subframe is divided in two slots of duration 0.5 msec each. The LTE standards defines two types of frames: i) type 1 for FDD operation as in FIG. 7a), where all subframes are assigned either for the DL or UL channels; ii) type 2 for TDD operation as in FIG. 7b), where part of the subframes are assigned to the DL and part to the UL (depending on the selected configuration), whereas a few subframes are reserved for "special use". These is at least one special subframe per frame and it consists of three fields: i) downlink pilot time slot (DwPTS) reserved for DL transmission; ii) guard period (GP); iii) uplink pilot time slot (UpPTS), for UL transmission.

Figure 8A:
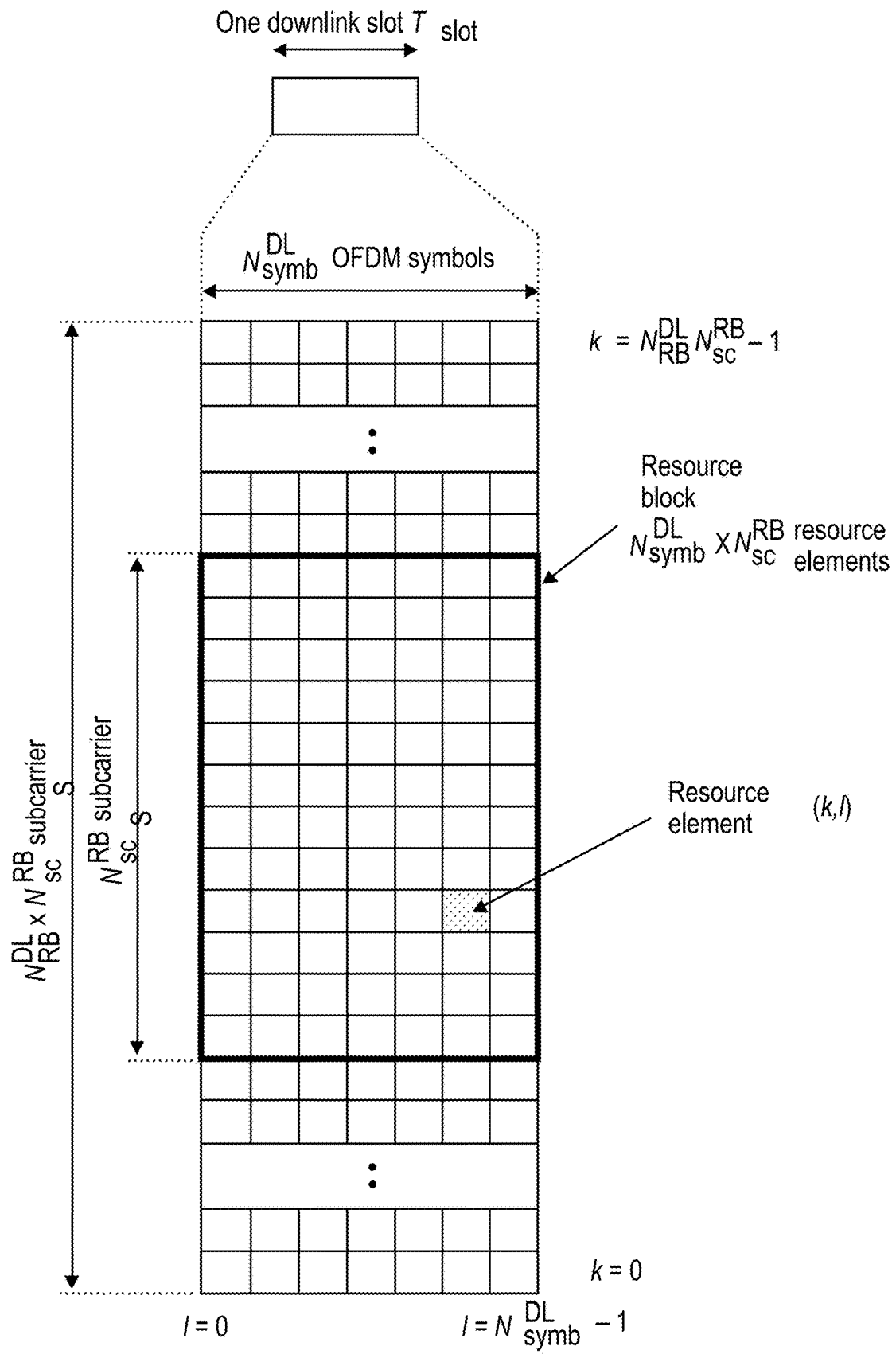
FIG. 8A illustrates the LTE "resource elements" and "resource blocks" in the OFDM DL channel.
Figure 8B:
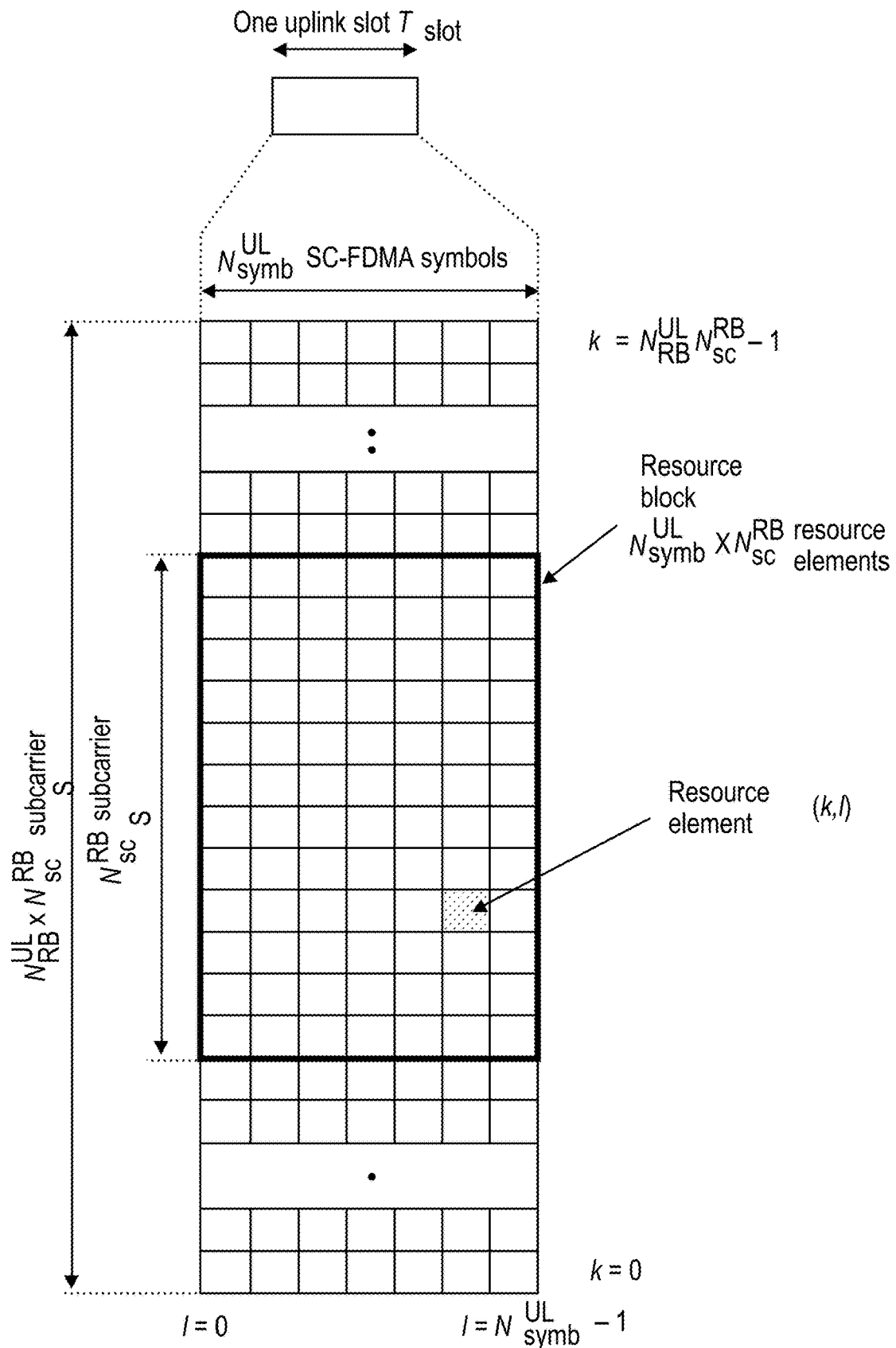
FIG. 8B illustrates the LTE "resource elements" and "resource blocks" in the SC-FDMA UL channel.

LTE employs orthogonal frequency division multiplexing (OFDM) and orthogonal frequency division multiple access (OFDMA) modulation for the DL and single-carrier frequency division multiple access (SC-FDMA) for the UL. The "resource element" (RE) is the smallest modulation structure in LTE and consists of one OFDM subcarrier in frequency and one OFDM symbol duration in time, as shown in FIG. 8a for the DL channel and in FIG. 8b for the UL channel. The "resource block" (RB) consists of 12 subcarriers in frequency and one 0.5 msec slot in time (consisting of 3 to 7 OFDM symbol periods, depending on DL versus UL channel and type of cyclic prefix). Resource blocks for every UE are assigned on a subframe basis. Since the MU-MAS in the present invention uses spatial processing to send multiple data streams to different UEs, at every subframe all resource blocks can be allocated to the same UE. In one embodiment, all or a subset of resource blocks are allocated to every UE and simultaneous non-interfering data streams are sent to the UEs via precoding.

To setup the link between the BTS and the UEs, the LTE standard defines the synchronization procedure. The BTS sends two consecutive signals to the UE: the primary synchronization signal (P-SS) sent over the primary synchronization channel (PSCH) and the secondary synchronization signal (S-SS) sent over the secondary synchronization channel (SSCH). Both signals are used by the UE for time/frequency synchronization as well as to retrieve the cell ID. The P-SS consists of length-63 Zadoff-Chu sequence from which the UE derives the physical layer ID (0 to 2). The S-SS is an interleaved concatenation of two length-31 binary sequences and is used to derive the cell ID group number (0 to 167). From the two identity numbers above, the UE derives the physical cell ID (PCI, defined from 0 to 503).

Figure 9:
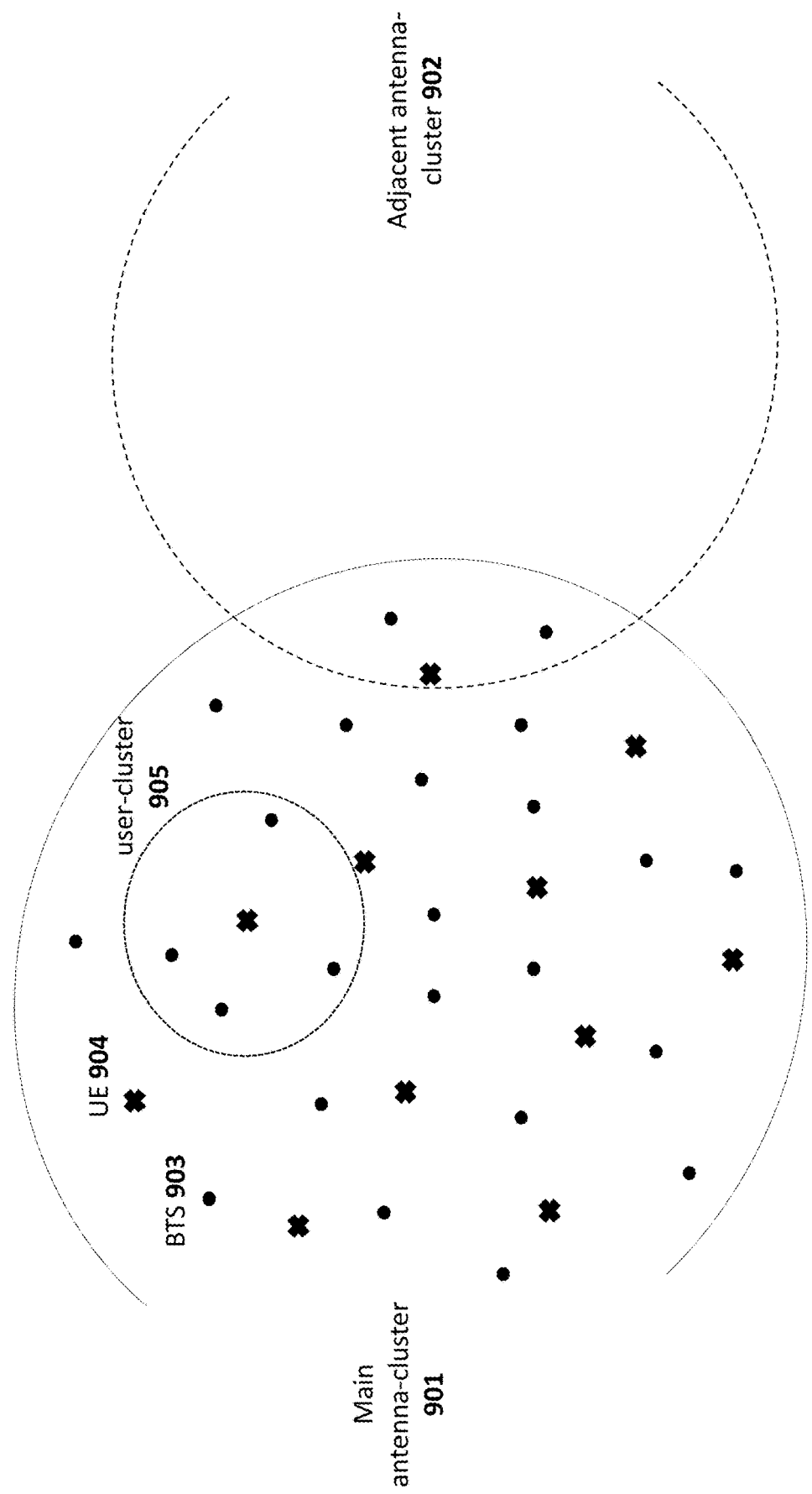
FIG. 9 illustrates one embodiment of a multi-user (MU) multiple antenna system (MAS), or MU-MAS, consisting of antenna-clusters and user-clusters.

In the MU-MAS system described in the present invention, there are no cell boundaries as the power transmitted from the BTSs is increased intentionally to produce interference that is exploited to create areas of coherence around the UEs. In the present invention, different BTSs are grouped into "antenna-clusters" or "DIDO-clusters" as defined in related U.S. Pat. No. 8,170,081, issued May 1, 2012, entitled "System And Method For Adjusting DIDO Interference Cancellation Based On Signal Strength Measurements". For example, FIG. 9 shows the main antenna-cluster 901 and one adjacent antenna-cluster 902. Every antenna-cluster consists of multiple BTSs 903.

The cell ID can be used in MU-MAS and DIDO systems to differentiate the antenna-clusters. In one embodiment of the invention, the same cell ID is transmitted from all BTSs of the same antenna-cluster via the P-SS and S-SS. In the same embodiment, different antenna-clusters employ different cell IDs. In another embodiment of the invention, all BTSs within the same antenna-cluster 1001 are grouped into "antenna-subclusters" 1003 depicted in FIG. 10 with different shaded colors and a different cell ID 1004 is associated to every antenna-subcluster. In one embodiment, the antenna-subclusters are defined statically according to pre-defined cluster planning or based on GPS positioning information. In another embodiment, the antenna-subclusters are defined dynamically based on measurements of relative signal strength between BTSs or GPS positioning information. In a different embodiment of the invention, a different cell ID is assigned to every area of coherence (described in related co-pending U.S. application Ser. No. 13/232,996, entitled "Systems and Methods to Exploit Areas of Coherence in Wireless Systems") associated to the UEs.

When all BTSs within the same antenna-cluster or antenna-subcluster transmit the LTE broadcast channels (e.g., P-SS and S-SS) to the UEs, destructive interference may degrade the performance of time or frequency synchronization enabled by the broadcast channel. Destructive interference may be caused by multipaths generated from spatially distributed BTSs that recombine incoherently at some UE locations. To avoid or mitigate this effect, in one embodiment of the invention, only one BTS out of all BTSs within the same antenna-cluster or antenna-subcluster transmits the LTE broadcast channels (e.g., P-SS and S-SS) to all UEs. In the same embodiment, the BTS that transmits the LTE broadcast channels is selected to maximize the power received at the UEs over the broadcast channels. In another embodiment, only a limited set of BTSs is selected to transmit simultaneously the LTE broadcast channels to all UEs, such that destructive interference is avoided at the UE. In a different embodiment of the invention, the LTE broadcast channels are sent at higher power than the payload to reach all the UEs within the same antenna-cluster or antenna-subcluster.

As described above, LTE-Advanced supports carrier aggregation (CA) schemes to increase data rate over the DL channel. In MU-MASs, CA can be used in combination with precoding to increase per-user data rate. In one embodiment of this invention, transmit precoding is applied to different portions of the RF spectrum (inter-band CA) or different bands within the same portion of the spectrum (intra-band CA) to increase per-user data rate. When employing inter-band CA, pathloss at different bands may change significantly as those bands are centered at different carrier frequencies. In conventional LTE cellular systems, frequency bands at lower carrier frequencies may experience lower pathloss than higher carrier frequencies. Hence, applying inter-band CA in cellular systems may cause undesired inter-cell interference at lower carrier frequencies. By contrast, the MU-MAS in the present invention is not limited by interference at the cell boundary as the BTSs are distributed and there is no concept of cell. This more flexible system layout allows different methods for inter-band CA in MU-MAS. In one embodiment of the present invention, the MU-MAS enables inter-band CA by employing one set of BTSs to operate at lower carrier frequencies and another set of BTSs to operate at higher carrier frequencies, such that the two sets intersect or one set is the subset of the other. In another embodiment, the MU-MAS with precoding employs CA methods in conjunction with frequency hopping patterns to improve robustness against frequency-selective fading or interference.

1. Downlink Closed-Loop MU-MAS Precoding Methods in LTE

MU-MAS closed-loop schemes can be used either in time-division duplex (TDD) or frequency division duplex (FDD) systems. In FDD systems, DL and UL channels operate at different frequencies and therefore the DL channel state information (CSI) must be estimated at the UE side and reported back to the CP through the BTSs or the CTRs via the UL channel. In TDD systems, DL and UL channels are set at the same frequency and the system may employ either closed-loop techniques or open-loop schemes exploiting channel reciprocity (as described in the following section). The main disadvantage of closed-loop schemes is they require feedback, resulting in larger overhead for control information over the UL.

The general mechanism for closed-loop schemes in MU-MASs is described as follows: i) the BTSs send signaling information to the UEs over the DL; ii) the UEs exploit that signaling information to estimate the DL CSI from all the "active BTSs"; iii) the UEs quantize the DL CSI or use codebooks to select the precoding weights to be used for the next transmission; iv) the UEs send the quantized CSI or the codebook index to the BTSs or CTRs via the UL channel; v) the BTSs or CTRs report the CSI information or codebook index to the CP that calculates the precoding weights for data transmission over the DL. The "active BTSs" are defined as the set of BTSs that are reached by given UE. For example, in related co-pending U.S. application Ser. No. 12/802,974, entitled "System And Method For Managing Inter-Cluster Handoff Of Clients Which Traverse Multiple DIDO Clusters" and related co-pending U.S. application Ser. No. 12/917,257, entitled "Systems And Methods To Coordinate Transmissions In Distributed Wireless Systems Via User Clustering" we defined the "user-cluster" 905 as the set of BTSs that are reached by given UE, as depicted in FIG. 9. The number of active BTSs are limited to a user-cluster so as to reduce the amount of CSI to be estimated from the BTSs to given UE, thereby reducing the feedback overhead over the UL and the complexity of the MU-MAS precoding calculation at the CP.

As described above, MU-MAS precoding employs either linear or non-linear methods. In the case of non-linear methods (e.g., dirty-paper coding [References 68-70] or Tomlinson-Harashima precoding [References 71-72], lattice techniques or trellis precoding [References 73-74], vector perturbation techniques [References 75-76]), successive interference cancellation is applied at the transmitter to avoid inter-user interference. In this case the precoding matrix is computed accounting for the CSI to all the UEs within the antenna-cluster. Alternatively, linear precoding methods (e.g., zero-forcing [Reference 65], block-diagonalization [References 66-67], matrix inversion, etc.) can be used on a user-cluster basis, since the precoding weights for every UE are computed independent on the other UEs. Depending on the number of UEs and eNodeBs inside the antenna-cluster and user-clusters, linear versus non-linear precoding methods offer different computational performance. For example, if the MU-MAS consists of K UEs per antenna-cluster, M eNodeBs per antenna-cluster and C eNodeBs per user-cluster, the complexity of linear precoding is $O(K*C^3)$ whereas for non-linear precoding it is $O(M*K^2)$. It is thus desirable to develop a method that dynamically switches between the two types of precoding techniques based on the number if UEs and eNodeBs in MU-MASs to reduce the computational complexity at the CP. In one embodiment of the invention, the MU-MAS employs linear precoding methods. In another embodiment, the MU-MAS employs non-linear precoding methods. In the same embodiment of the invention, the MU-MAS dynamically switches between linear and non-linear precoding methods based on the number of UEs and eNodeBs in the antenna-clusters and user-clusters to reduce computational complexity at the CP. In a different embodiment, the MU-MAS switches between precoding multiplexing methods for UEs experiencing good channel quality (e.g., in the proximity of eNodeBs) and beamforming or diversity methods for UEs with poor link quality (e.g., far away from the eNodeBs).

1.1 Downlink MU-MAS Signaling Methods within the LTE Standard

The LTE standard defines two types of reference signals (RS) that can be used for DL signaling in closed-loop schemes [References 33,50,82-83]: i) cell-specific reference signal (CRS); ii) UE specific RS such as channel state information (CSI) reference signal (CSI-RS) and demodulation RS (DM-RS). The cell-specific RS is not precoded, whereas the UE-specific RS is precoded [Reference 50]. CRS is used in LTE Release 8 that employs SU/MU-MIMO codebook-based techniques with up to four antennas in every cell. LTE-Advanced Release 10 supports non-codebook based SU/MU-MIMO schemes with up to eight transmit antennas as well as COMP schemes with antennas distributed over different cells. As such, Release 10 allows for more flexible signaling schemes via CSI-RS. In the present invention, we describe how either types of signaling schemes can be used in MU-MAS systems to enable precoding.

1.1.1 MU-MAS Signaling Using CRS

The CRS is employed in LTE (Release 8) systems to estimate the CSI from all transmit antennas at the BTS to the UE [References 80,84]. The CRS is obtained as the product of a two-dimensional orthogonal sequence and a two-dimensional pseudo-random numerical (PRN) sequence. There are 3 orthogonal sequences (i.e., placed on orthogonal sets of OFDM subcarriers) and 168 possible PRN sequences, for a total of 504 different CRS sequences. Every sequence uniquely identifies one cell. Each of the three orthogonal CRSs is associated to one of the three physical layer IDs (0 to 2) that generate a different cell ID, as explained in the previous subsection. The CRS is transmitted within the first and third-last OFDM symbol of every slot, and every sixth subcarrier. Orthogonal patterns in time and frequency are designed for every transmit antenna of the BTS, for the UE to uniquely estimate the CSI from each of transmit antennas. Release 8 defines up to four orthogonal patters per CRS, one for each of the four transmit antennas employed in MIMO 4x4. This high density of CRS in time and frequency (i.e., sent every slot of 0.5 msec, and every sixth subcarrier), producing 5% overhead, was designed intentionally to support scenarios with fast channel variations over time and frequency [Reference 83].

In Release 8, since there are up to 3 orthogonal CRSs with 4 orthogonal patterns each for multi-antenna modes (or 6 orthogonal CRSs for single antenna mode), it is possible to discriminate up to 12 transmit antennas within the same coverage area, without causing interference to the CRS. In one embodiment of the invention, the antenna-cluster 1001 is divided into three antenna-subclusters 1005 as in FIG. 10. Different physical layer IDs (or cell IDs) are associated to each of the antenna-subclusters, such that each antenna-subcluster is assigned with one of the three orthogonal CRSs with four orthogonal patterns (i.e., each antenna-subcluster can support up to four BTS without causing interference to the CRS from other BTSs). In this embodiment, every cluster can support up to 12 BTSs without causing interference to the CRS.

Figure 11:
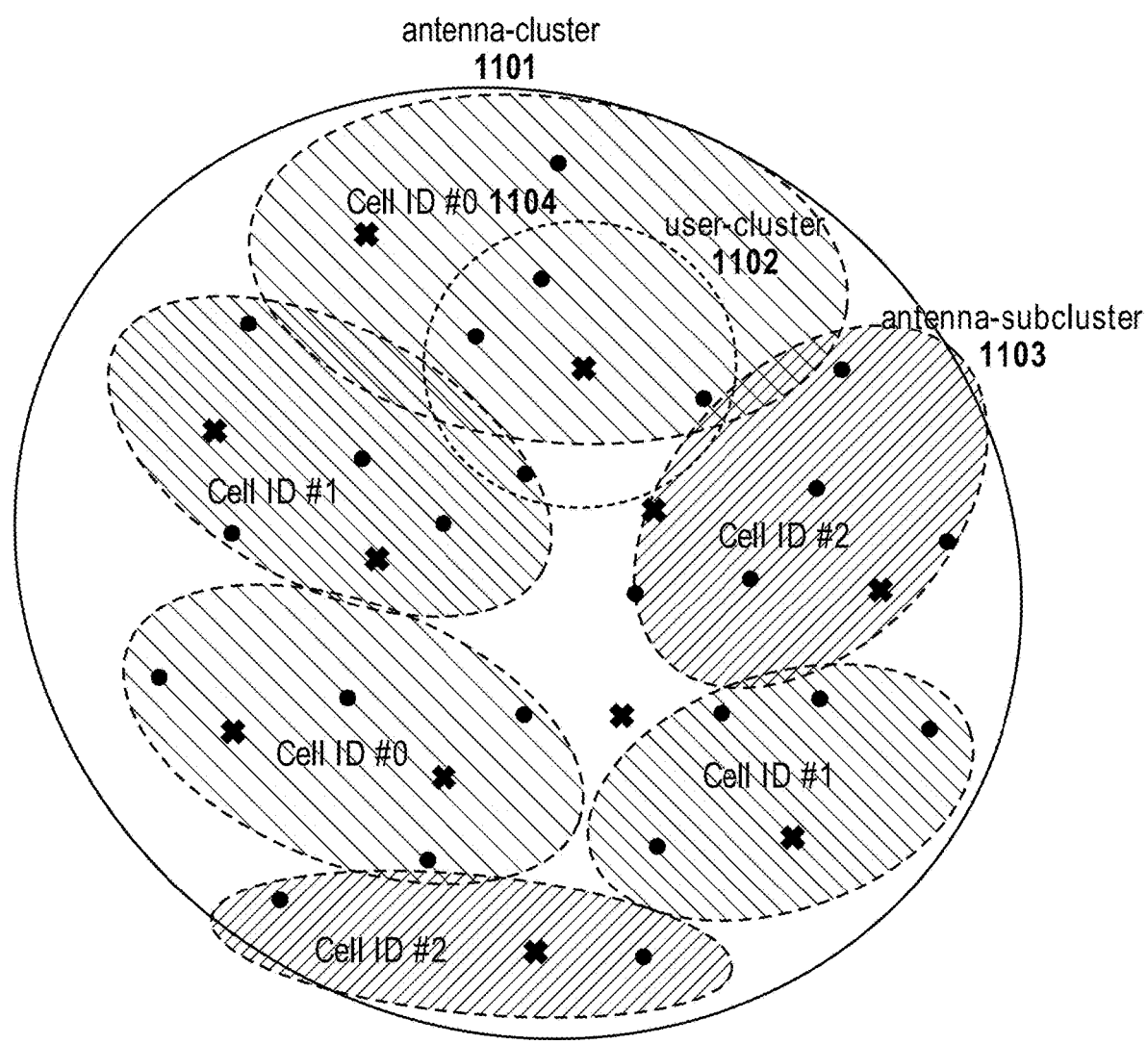
FIG. 11 illustrates one embodiment of a MU-MAS wherein the same set of cell IDs are assigned to the antenna-subclusters with given repetition pattern.

In scenarios where more than twelve BTSs are placed within the same cluster, it is desirable to increase the number of available orthogonal CRSs to support larger number of active BTSs (i.e., BTSs that simultaneously transmit precoded signals to the UEs). One way to achieve that is to define more than three antenna-subclusters 1003 per antenna-cluster 1101 and assign the same three physical layer IDs (or cell ID 1104 from 0 to 2) to the antenna-subclusters 1103 with a repetition pattern as shown in FIG. 11. We observe that the antenna-subclusters may come in different shapes and are defined in such a way that every user-cluster 1102 cannot reach two antenna-subclusters with the same physical layer ID, thereby avoiding interference to the CRS. For example, one way to achieve that is to define the area of the antenna-subcluster 1103 larger than the user-cluster 1102 and avoid that adjacent antenna-subcluster use the same physical layer ID. In one embodiment of the invention, the multiple antenna-subclusters are placed within the same antenna-cluster with repetition patterns such that their respective CRSs do not interfere, thereby enabling simultaneous non-interfering transmissions from more than twelve BTSs.

Figure 12:
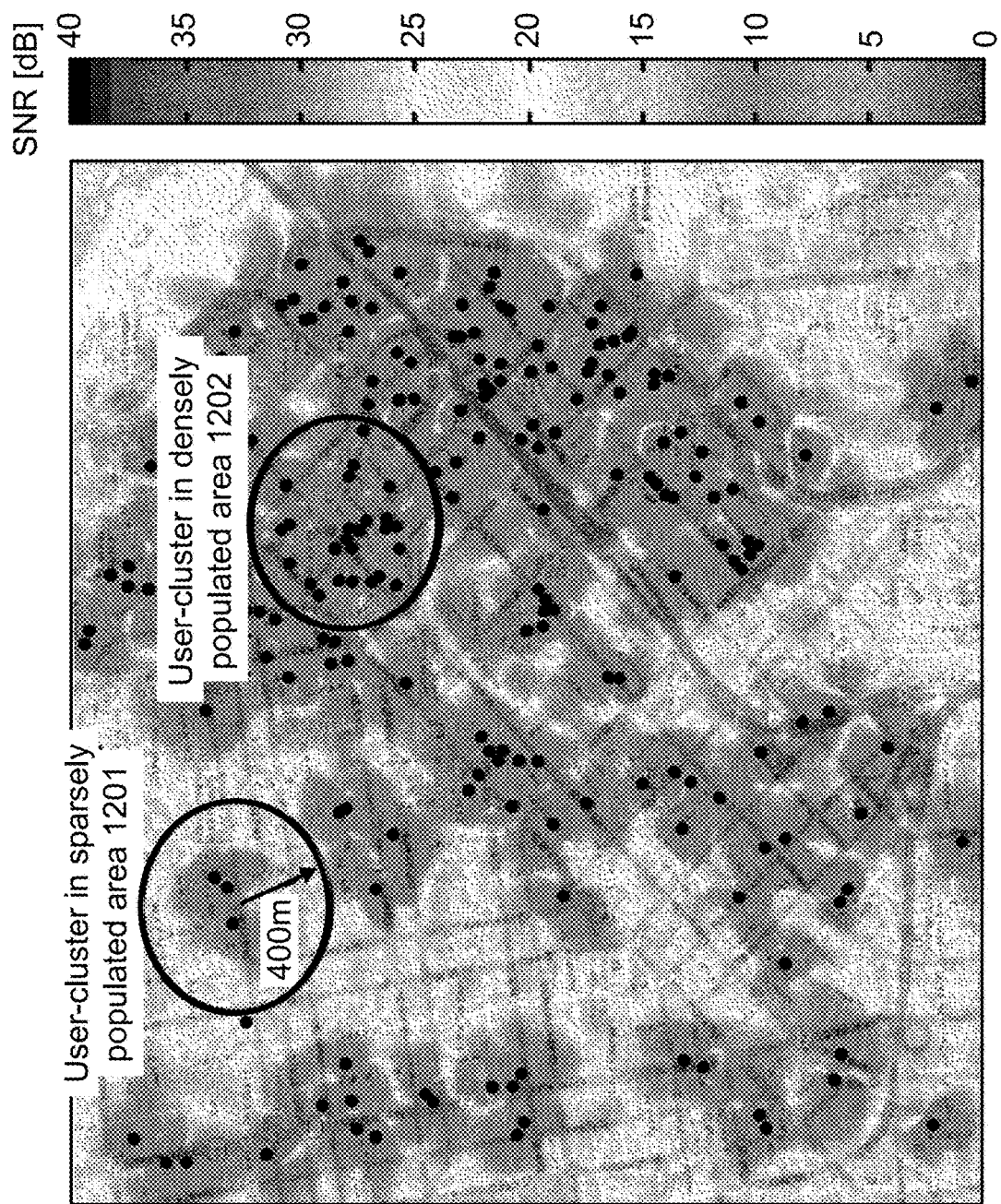
FIG. 12 illustrates the SNR distribution for practical deployment of MU-MAS systems in downtown San Francisco, CA, with sparsely and densely populated areas.

In practical MU-MAS systems, it may be the case that every UE sees more than only four BTSs within its user-cluster. For example, FIG. 12 shows the SNR distribution for practical deployment of DIDO or MU-MAS systems in downtown San Francisco, CA. The propagation model is based on 3GPP pathloss/shadowing model [Reference 81] and assumes a carrier frequency of 900 MHz. The dots in the map indicate the location of the DIDO-BTSs, whereas the dark circle represents the user-cluster (with the UE being located at the center of the circle). In sparsely populated areas 1201, the UE sees only a few BTSs within its user-cluster (e.g., as low as three BTSs for the example in FIG. 12), whereas in densely populated areas 1202 each user-cluster may comprise as many as 26 BTSs as in FIG. 12.

The high redundancy of the CRS can be exploited in MU-MASs to enable CSI estimation from any number of transmit antennas greater than four. For example, if the channel is fixed-wireless or characterized by low Doppler effects, there is no need to compute the CSI from all four transmit antennas every 0.5 msec (slot duration). Likewise, if the channel is frequency-flat, estimating the CSI every sixth subcarrier is redundant. In that case, the resource elements (RE) occupied by the redundant CRS can be re-allocated for other transmit antennas or BTSs in the MU-MAS. In one embodiment of the invention, the system allocates resource elements of redundant CRS to extra antennas or BTSs in the MU-MAS system. In another embodiment, the system estimates time and frequency selectivity of the channel and dynamically allocates the CRS for different BTSs or only the BTSs within the user-cluster to different resource elements.

The number of BTSs included in every user-cluster depends on the signal power level measured at the UE from all BTSs in the user-cluster relative to the noise power level, or signal-to-noise ratio (SNR). In one embodiment, the UE estimates the SNR from all BTSs in its neighborhood and selects the BTSs that belong to its user-cluster based on the SNR information. In another embodiment, the CP is aware of the SNR from the BTSs to every UE (based on feedback information from the UEs or information obtained from the UL channel, assuming UL/DL channel reciprocity) and selects the set of BTSs to be included in every user-cluster.

The number of BTSs included in every user-cluster determines the performance of the MU-MAS methods described in the present invention. For example, if the number of BTSs per user-cluster is low, the UE experiences higher level of out-of-cluster interference, resulting in high signal-to-interference-plus-noise ratio (SINR) and low data rate. Similarly, if large number of BTSs is selected for every user-cluster, the SNR measured at the UE from the BTSs at the edge of the user-cluster is low and may be dominated by the out-of-cluster interference from adjacent BTSs outside the user-cluster. There is an optimal number of BTSs per user-cluster that produces the highest SINR and data rate. In one embodiment of the invention, the CP selects the optimal number of BTSs per user-cluster to maximize SINR and data rate to the UE. In another embodiment of the invention, the BTSs per user-cluster are dynamically selected to adapt to the changing conditions of the propagation environment or UE mobility.

Another drawback of using large number of BTSs per user-cluster is high computational load. In fact, the more BTSs in the user-cluster the larger the computation complexity of the MU-MAS precoder. In one embodiment of the inventions, the BTSs per user-cluster are selected to achieve optimal tradeoff between SINR or data rate performance and computational complexity of the MU-MAS precoder. In another embodiment, the BTSs per user-cluster are dynamically selected based on tradeoffs between propagation conditions and computational resources available in the MU-MAS.

1.1.2 MU-MAS Signaling Using CSI-RS and DM-RS

In the LTE-Advanced (Release 10) standard the CSI-RS is used by every UE to estimate the CSI from the BTSs [References 33,83]. The standard defines orthogonal CSI-RS for different transmitters at the BTS, so that the UE can differentiate the CSI from different BTSs. Up to eight transmit antennas at the BTS are supported by the CSI-RS as in Tables 6.10.5.2-1,2 in [Reference 33]. The CSI-RS is sent with a periodicity that ranges between 5 and 80 sub-frames (i.e., CSI-RS send every 5 to 80 msec) as in Tables 6.10.5.3-1 in [Reference 33]. The periodicity of the CSI-RS in LTE-Advanced was designed intentionally larger than the CRS in LTE to avoid excessive overhead of control information, particularly for legacy LTE terminals unable to make use of these extra resources. Another reference signal used for CSI estimation is to demodulation RS (DM-RS). The DM-RS is a demodulation reference signal intended to a specific UE and transmitted only in the resource block assigned for transmission to that UE.

When more than eight antennas (maximum number of transmitters supported by the LTE-Advanced standard) are within the user-cluster, alternative techniques must be employed to enable DIDO precoding while maintaining system compliance to the LTE-Advanced standard. In one embodiment of the invention, every UE uses the CSI-RS or the DM-RS or combination of both to estimate the CSI from all active BTSs in its own user-cluster. In the same embodiment, the DIDO system detects the number of BTSs within the user-cluster and whether or not the user-cluster is compliant to the LTE-Advanced standard (supporting at most eight antennas). If it not compliant, the DIDO system employs alternative techniques to enable DL signaling from the BTSs to the current UE. In one embodiment, the transmit power from the BTSs is reduced until at most eight BTSs are reachable by the UE within its user-cluster. This solution, however, may result in reduction of data rate as coverage would be reduced.

Another solution is to divide the BTSs in the user-cluster in subsets and send one set of CSI-RS for every subset at a time. For example, if the CSI-RS periodicity is 5 subframes (i.e., 5 msec) as in Table 6.10.5.3-1 in [Reference 33], every 5 msec the CSI-RS is sent from a new subset of BTSs. Note that this solution works as long as the CSI-RS periodicity is short enough to cover all BTS subsets within the channel coherence time of the UE (which is a function of the Doppler velocity of the UE). For example, if the selected CSI-RS periodicity is 5 msec and the channel coherence time is 100 msec, it is possible to define up to 20 BTS subsets of 8 BTS each, adding up to a total of 160 BTSs within the user-cluster. In another embodiment of the invention, the DIDO system estimates the channel coherence time of the UE and decides how many BTSs can be supported within the user-cluster for given CSI-RS periodicity, to avoid degradation due to channel variations and Doppler effect.

The solutions for CSI-RS proposed so far are all compliant with the LTE standard and can be deployed within the framework of conventional LTE systems. For example, the proposed method that allows more than eight antennas per user-cluster would not require modifications of the UE LTE hardware and software implementation, and only slight modification of the protocols used at the BTSs and CP to enable selection of BTSs subset at any given time. These modifications can be easily implemented in a cloud-based software defined radio (SDR) platform, which is one promising deployment paradigm for DIDO and MU-MAS systems. Alternatively, if it is possible to relax the constraints of the LTE standard and develop slightly modified hardware and software for LTE UEs to support similar, but non-LTE-compliant DIDO or MU-MAS modes of operation, so as enable UEs to be able to operate in full LTE-compliant mode, or in a modified mode that supports non-LTE-compliant DIDO or MU-MAS operation. For example, this would enable another solution is to increase the amount of CSI-RS to enable higher number of BTSs in the system. In another embodiment of the invention, different CSI-RS patterns and periodicities are allowed as a means to increase the number of supported BTSs per user-cluster. Such slight modifications to the LTE standard may be small enough that existing LTE UE chipsets can be used with simply software modification. Or, if hardware modification would be needed to the chipsets, the changes would be small.

1.2 Uplink MU-MAS CSI Feedback Methods within the LTE Standard

In the LTE and LTE-Advanced standards, the UE feedbacks information to the BTS to communicate its current channel conditions as well as the precoding weights for closed-loop transmission over the DL channel. Three different channel indicators are included in those standards [Reference 35]:

Rank indicator (RI): indicates how many spatial streams are transmitted to given UE. This number is always equal or less than the number of transmit antennas.

Precoding matrix indicator (PMI): is the index of the codebook used for precoding over the DL channel.

Channel quality indicator (CQI): defines the modulation and forward error correction (FEC) coding scheme to be used over the DL to maintain predefined error rate performance for given channel conditions Only one RI is reported for the whole bandwidth, whereas the PMI and CQI reporting can be wideband or per subband, depending on the frequency-selectivity of the channel.

These indicators are transmitted in the UL over two different types of physical channels: i) the physical uplink control channel (PUCCH), used only for control information; ii) the physical uplink shared channel (PUSCH), used for both data and control information, allocated over one resource block (RB) and on a sub-frame basis. On the PUCCH, the procedure to report the RI, PMI and CQI is periodic and the indicators can be either wideband (for frequency-flat channels) or UE-selected on a sub-band basis (for frequency-selective channels). On the PUSCH, the feedback procedure is aperiodic and can be UE-selected on a sub-band basis (for frequency-selective channels) or higher-layer configured sub-band (e.g., for transmission mode 9 in LTE-Advance with eight transmitters).

In one embodiment of the invention, the DIDO or MU-MAS system employs RI, PMI and CQI to report to BTSs and CP its current channel conditions as well as precoding information. In one embodiment, the UE uses the PUCCH channel to report those indicators to the CP. In another embodiment, in case a larger number of indicators is necessary for DIDO precoding, the UE employs the PUSCH to report additional indicators to the CP. In case the channel is frequency-flat, the UE can exploit extra UL resources to report the PMI for a larger number of antennas in the DIDO systems. In one embodiment of the invention, the UE or BTSs or CP estimate the channel frequency selectivity and, in case the channel is frequency-flat, the UE exploits the extra UL resources to report the PMI for larger number of BTSs.

2. Downlink Open-Loop MU-MAS Precoding Methods in LTE

Open-loop MU-MAS precoding schemes can only be used in time-division duplex (TDD) systems employing RF calibration and exploiting channel reciprocity. The general mechanism of open-loop schemes in MU-MASs consists of: i) the UEs send signaling information to the BTSs or CTRs over the UL; ii) the BTSs or CTRs exploit that signaling information to estimate the UL CSI from all UEs; iii) the BTSs or CTRs employ RF calibration to convert the UL CSI into DL CSI; iv) the BTSs or CTRs send the DL CSI or codebook index to the CP via the BSN; v) based on that DL CSI, the CP calculates the precoding weights for data transmission over the DL. Similarly to closed-loop MU-MAS precoding schemes, user-clusters can be employed to reduce the amount of CSI to be estimated at the BTSs from the UEs, thereby reducing the computational burden at the BTSs as well as the amount of signaling required over the UL. In one embodiment of the invention, open-loop precoding techniques are employed to send simultaneous non-interfering data streams from the BTSs to the UEs over the DL channel.

In LTE there are two types of reference signal for the uplink channel [References 31,33,87]: i) sounding reference signal (SRS), used for scheduling and link adaptation; ii) demodulation reference signal (DMRS), used for data reception. In one embodiment of the invention, the DMRS is employed in open-loop precoding systems to estimate the UL channels form all UEs to all BTSs. In the time domain, the DMRS is sent at the fourth OFDM symbol (when a normal cyclic prefix is used) of every LTE slot (of duration 0.5 msec). In the frequency domain, the DMRS sent over the PUSCH is mapped for every UE to the same resource block (RB) used by that UE for UL data transmission. The length of the DMRS is $M^{RS}=mN^{RB}$, where m is the number of RBs and $N^{RB}=12$ is the number of subcarriers per RB. To support multiple UEs, up to twelve DMRSs are generated from one base Zadoff-Chu [Reference 88] or computer-generated constant amplitude zero autocorrelation (CG-CAZAC) sequence, via twelve possible cyclic shifts of the base sequence. Base sequences are divided into 30 groups and neighbor LTE cells select DMRS from different groups to reduce inter-cell interference. For example, if the maximum number of resource blocks within one OFDM symbol is 110 (i.e., assuming 20 MHz overall signal bandwidth), it is possible to generate up to 110×30=3300 different sequences. We observe that the 30 base sequences are not guaranteed to be orthogonal and are designed to reduce interference across cells, without eliminating it completely. By contrast, the 12 cyclic shifts of the same base sequence are orthogonal, thereby allowing up to 12 UEs to transmit in the UL over the same RB without interference. The value of cyclic shift to be used by every UE is provided by the BTS through the downlink control information (DCI) message sent over the PDCCH. The DCI in Release 8 consists of 3 bits, that enables the UE to use only up to 8 values of cyclic shift in the pool of twelve possible options.

The cyclic shifts of the base DMRS sequence are exploited in the present invention to enable MU-MIMO schemes over the UL channel as well as to estimate the CSI from multiple UEs for DL precoding when channel reciprocity is exploited in TDD mode. In one embodiment of the invention, open-loop precoding methods are employed to send simultaneous non-interfering data streams from the distributed BTSs to the UEs over the DL channel. In a different embodiment of the invention, open-loop MU-MIMO methods are employed to receive simultaneous non-interfering data streams from the UEs to the BTSs over the UL channel. The same CSI estimated over the UL from all active UEs can be used to compute the receiver spatial filter for MU-MIMO operation in the UL as well as the weights for DL precoding. Since Release 8 defines only up to 8 orthogonal DMRSs (due to limited DCI bits, as explained above), MU-MIMO schemes for the UL channel and MU-MAS precoding schemes for the DL channel can support at most eight UEs, assuming all UEs utilize the full UL bandwidth.

One way to increase the number of simultaneous UEs being served through MU-MIMO in UL or MU-MAS precoding in DL is to multiplex the DMRS of the UEs over the frequency domain. For example, if 10 MHz bandwidth is used in TDD mode, there are 50 RBs that can be allocated to the UEs. In this case, 25 interleaved RBs can be assigned to one set of eight UEs and the remaining 25 interleaved RBs to another set of UEs, totaling to 16 UEs that can be served simultaneously. Then, the CSI is computed by interpolating the estimates from the DMRS sent over interleaved RBs. Larger number of simultaneous UEs can be supported by increasing the number of interleaving patterns of the UL RBs. These patterns can be assigned to different UEs statically or dynamically according to certain frequency hopping sequence. In one embodiment of the invention, DMRSs are assigned to the UEs over orthogonal interleaved RBs to increase the number of UEs to be supported via MU-MIMO or MU-MAS precoding. In the same embodiment, the interleaved RBs are assigned statically. In another embodiment, the interleaved RBs are assigned dynamically according to certain frequency hopping pattern.

An alternative solution is to multiplex the DMRS of different UEs in the time domain. For example, the UEs are divided into different groups and the DMRSs for those groups are sent over consecutive time slots (of duration 0.5 msec each). In this case, however, it is necessary to guarantee that the periodicity of the DMRS assignment for different groups is lower than the channel coherence time of the fastest moving UE. In fact, this is necessary condition to guarantee that the channel does not vary for all UEs from the time the CSI is estimated via DMRS to the time system transmits DL data streams to the UEs via DIDO precoding. In one embodiment of the invention, the system divides the active UEs into groups and assigns the same set of DMRS to each group over consecutive time slots. In the same embodiment, the system estimates the shortest channel coherence time for all active UEs and calculates the maximum number of UE groups as well as the periodicity of the DMRS time multiplexing based on that information.

Another solution is to spatially separate different groups of UEs employing the same sets of DMRSs. For example, the same set of orthogonal DMRSs can be used for all the UEs from different antenna-subclusters in FIG. 11 identified by the same cell ID. In one embodiment of the invention, groups of UEs employing the same set of orthogonal DMRSs are spatially separated to avoid interference between the groups. In the same embodiment, the same set of orthogonal DMRSs is employed by different antenna-subclusters identified by the same cell ID. The MU-MAS may assign the UEs to "virtual cells" to maximize the number of DMRS that can be used in the UL. In one exemplary embodiment, the virtual cell is the area of coherence (described in related co-pending U.S. application Ser. No. 13/232,996, entitled "Systems and Methods to Exploit Areas of Coherence in Wireless Systems") around the UE and the DIDO system generates up to 3300 areas of coherence for different UEs. In another embodiment of the invention, each of the 30 base sequences is assigned to a different antenna-cluster (clusters are defined in related U.S. Pat. No. 8,170,081, issued May 1, 2012, entitled "System And Method For Adjusting DIDO Interference Cancellation Based On Signal Strength Measurements") to reduce inter-cluster interference across adjacent antenna-clusters.

3. Uplink MU-MAS Methods in LTE

The present invention employs open-loop MU-MIMO schemes over the UL channel to receive simultaneous UL data streams from all UEs to the BTSs. The UL open-loop MU-MIMO scheme consists of the following steps: i) UEs send signaling information and data payload to all BTSs; ii) the BTSs compute the channel estimations from all UEs using the signaling information; iii) the BTSs send the channel estimates and data payloads to the CP; iv) the CP uses the channel estimates to remove inter-channel interference from all UEs' data payloads via spatial filtering and demodulates the data streams form all UEs. In one embodiment, the open-loop MU-MIMO system employs single-carrier frequency division multiple access (SC-FDMA) to increase the number of UL channels from the UEs to the BTSs and multiplex them in the frequency domain.

In one embodiment, synchronization among UEs is achieved via signaling from the DL and all BTSs are assumed locked to the same time/frequency reference clock, either via direct wiring to the same clock or sharing a common time/frequency reference, in one embodiment through GPSDO. Variations in channel delay spread at different UEs may generate jitter among the time references of different UEs that may affect the performance of MU-MIMO methods over the UL. In one embodiment, only the UEs within the same antenna-cluster (e.g., UEs in close proximity with one another) are processed with MU-MIMO methods to reduce the relative propagation delay spread across different UEs. In another embodiment, the relative propagation delays between UEs are compensated at the UEs or at the BTSs to guarantee simultaneous reception of data payloads from different UEs at the BTSs.

The methods for enabling signaling information for data demodulation over the UL are the same methods used for signaling in the downlink open-loop DIDO scheme described at the previous section. The CP employs different spatial processing techniques to remove inter-channel interference from the UEs data payload. In one embodiment of the invention, the CP employs non-linear spatial processing methods such as maximum likelihood (ML), decision feedback equalization (DFE) or successive interference cancellation (SIC) receivers. In another embodiment the CP employs linear filters such as zeros-forcing (ZF) or minimum mean squared error (MMSE) receivers to cancel co-channel interference and demodulate the uplink data streams individually.

4. Integration with Existing LTE Networks

In the United States and other regions of the world, LTE networks are already in operation or are in the process of being deployed and/or committed to be deployed. It would be of significant benefit to LTE operators if they could gradually deploy DIDO or MU-MAS capability into their existing or already-committed deployments. In this way, they could deploy DIDO or MU-MAS in areas where it would provide the most immediate benefit, and gradually expand the DIDO or MU-MAS capability to cover more their network. In time, once they have sufficient DIDO or MU-MAS coverage in an area, they can choose to cease using cells entirely, and instead switch entirely to DIDO or MU-MAS and achieve much higher spectral density at much lower cost. Throughout this entire transition from cellular to DIDO or MU-MAS, the LTE operator's wireless customers will never see a loss in service. Rather, they'll simply see their data throughput and reliability improve, while the operator will see its costs decline.

There are several embodiments that would enable a gradual integration of DIDO or MU-MAS into existing LTE networks. In all cases, the BTSs for DIDO or MU-MAS will be referred as DIDO-LTE BTSs and will utilize one of the LTE-compatible DIDO or MU-MAS embodiments described above, or other LTE-compatible embodiments as they may be developed in the future. Or, the DIDO-LTE BTSs will utilize a slight variant of the LTE standard, such as those described above and the UEs will either be updated (e.g. if a software update is sufficient to modify the UE to be DIDO or MU-MAS compatible), or a new generation of UEs that are DIDO- or MU-MAS-compatible will be deployed. In either case, the new BTSs that support DIDO or MU-MAS either within the constraints of the LTE standard, or as a variant of the LTE standard will be referred to below as DIDO-LTE BTSs.

The LTE standard supports various channel bandwidths (e.g., 1.4, 3, 5, 10, 15 and 20 MHZ). In one embodiment, an operator with an existing LTE network would either allocate new bandwidth for the LTE-DIDO BTSs, or would subdivide the existing LTE spectrum (e.g. 20 MHz could be subdivided into two 10 MHz blocks) to support conventional LTE BTSs in a cellular configuration in one block of spectrum and DIDO LTE BTSs in another block of spectrum. Effectively, this would establish two separate LTE networks, and UE devices would be configured to use one or the other network, or select between the two. In the case of subdivided spectrum, the spectrum could be divided evenly between the conventional LTE network and the DIDO-LTE BTS network, or unevenly, allocated more spectrum to whichever network could best utilize it given the level of cellular LTE BTS and DIDO-LTE BTS deployment and/or UE usage patterns. This subdivision could change as needed over time, and at some point, when there are sufficient DIDO-LTE BTSs deployed to provide the same or better coverage as the cellular BTSs, all of the spectrum can be allocated to DIDO-LTE BTSs, and the cellular BTSs can be decommissioned.

In another embodiment, the conventional cellular LTE BTSs can be configured to be coordinated with the DIDO-LTE BTSs such that they share the same spectrum, but take turns using the spectrum. For example, if they were sharing the spectrum use equally, then each BTS network would utilize one 10 ms frame time in alternation, e.g. one 10 ms frame for the cellular LTE BTS, followed by one 10 ms frame for the DIDO-LTE BTS. The frame times could be subdivided in unequal intervals as well. This interval splitting could change as needed over time, and at some point, when there are sufficient DIDO-LTE BTSs deployed to provide the same or better coverage as the cellular BTSs, all of the time can be allocated to DIDO-LTE BTSs, and the cellular BTSs can be decommissioned.

In another embodiment of the invention, DIDO or MU-MAS is employed as LOS or NLOS wireless backhaul to small cells in LTE and LTE-Advanced networks. As small-cells are deployed in LTE networks, DIDO or MU-MAS provides high-speed wireless backhaul to those small cells. As the demand for higher data rate increases, more small-cells are added to the network until the wireless network reaches a limit where no more small-cells can be added in a given area without causing inter-cell interference. In the same embodiment of the invention, DIDO-LTE BTSs are used to replace gradually small-cells, thereby exploiting inter-cell interference to provide increased network capacity.

5. MU-MAS LTE Scheduler

In MU-MAS, distributed antennas or BTSs transmit simultaneous precoded data streams to multiple UEs. As described in Related Patents and Applications, the number of BTSs must be equal or larger than the number of UEs to enable simultaneous data transmissions. In practical deployments, the number of UEs may exceed the number of BTSs. In this case, the extra UEs can be selected for transmission at different time slots or frequency bands according to certain scheduling policy. The scheduler exploits the channel quality information of the UEs to decide the best set of UEs to be serviced at a give time and frequency. Different scheduling methods are used in the present invention, including proportional fair scheduler, round-robin or greedy algorithms.

As described in the previous sections, the LTE standard defines two parameters to inform the scheduler about the link quality of every UE: CQI and SRS. The CQI measures the quality of the DL channel and is fed back from the UE to the BTS. The SRS is signaling information sent from the UE to the BTS to measure the UL channel quality. Both indicators provide information of the UL/DL channel quality over time and frequency domains. In FDD systems, the DL scheduler must use the CQI as performance measure, since the DL and UL channel quality may vary due to different carrier frequencies. In TDD mode, the DL schedule employs either the CSI or the SRS or combination of both to perform its scheduling decision. The same performance metrics can be used for UL scheduling. In one embodiment of the invention, the MU-MAS scheduler employs the CQI and SRS as performance metrics used by the scheduling algorithm.

The MU-MAS described in the present invention enables one additional channel quality indicator not disclosed in prior art: the spatial selectivity indicator (SSI), described in related U.S. application Ser. No. 13/475,598, entitled "Systems and Methods to enhance spatial diversity in distributed-input distributed-output wireless systems". The SSI can be computed based on the CSI obtained from all UEs via feedback mechanisms or from the UL channel (applying UL/DL channel reciprocity). In one embodiment of the invention, the scheduler employs the SSI as performance metric. The SSI is a measure of the spatial diversity available in the wireless link. The SSI depends on the spatial characteristics of the BTSs as well as the UEs. In one exemplary embodiment of the invention, the scheduler obtains the SSI from all the UEs and schedules the UEs with the "optimal" SSI according to certain scheduling criterion. If more BTSs are available than the active BTSs, the users selection criterion described above is combined with the antenna selection method described in related U.S. application Ser. No. 13/475,598, entitled "Systems and Methods to enhance spatial diversity in distributed-input distributed-output wireless systems". In one embodiment of the invention, the scheduler selects the optimal subset of BTSs and UEs based on certain scheduling criterion.

Figure 10:
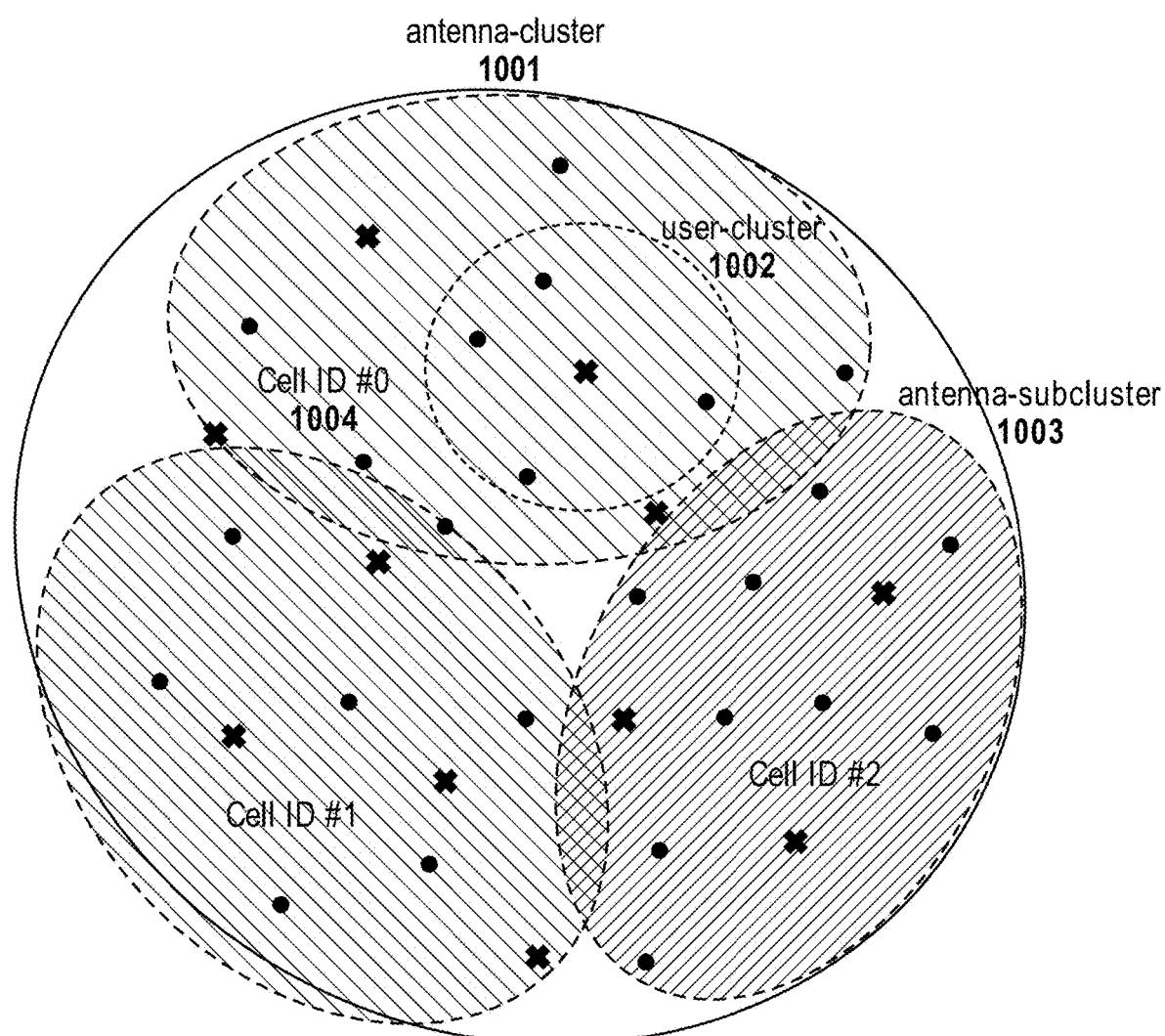
FIG. 10 illustrates one embodiment of a MU-MAS wherein a different cell ID is associated to every antenna-subcluster.

With respect to FIGS. 9, 10 and 11, in certain scenarios there may not be enough orthogonal signaling sequences to enable large number of BTSs within the same antenna-cluster or antenna-subcluster. In this case, some level of interference may occur if additional BTSs are activated to cover regions with larger numbers of active UEs. In one embodiment of the invention, the scheduler measures the level of interference between antenna-clusters or antenna-subclusters and schedules the UEs to minimize the effect of that interference over the wireless link.

The antenna selection algorithm described in related U.S. application Ser. No. 13/475,598, entitled "Systems and Methods to enhance spatial diversity in distributed-input distributed-output wireless systems" is employed in the present invention to select the optimal set of active BTSs based on the SSI. This antenna selection algorithm, however, may require high computational complexity as MU-MAS precoding processing must be applied over all possible permutations of antenna subsets before making a decision on the best subset based on the SSI performance metric. In MU-MAS with large number of cooperative BTSs, this computational burden may become expensive or untenable to achieve in practical deployments. It is thus desirable to develop alternative techniques to reduce the number of antenna subsets while maintaining good performance of the antenna selection method. In one embodiment of the invention, the MU-MAS employs methods based on queuing of the antenna subset ID numbers, hereafter referred to as "antenna shuffling method". In one embodiment of the invention, the antenna shuffling method subdivides the queue containing all possible antenna subset IDs (i.e., all possible permutations of active BTSs for given set of available BTSs) into different groups and assigns different priorities to those groups. These groups are defined to assign fair chances to all subset IDs to be selected, but the SSI metric is computed only for limited number of subsets (e.g., those ones with highest priority) thereby reducing computational complexity. In one exemplary embodiment, the queue of subset ID is divided into three groups where each group is assigned a different rule: i) group #1 contains the IDs with highest priority which are pulled out of the group only in case a new subset with higher priority is identified; ii) group #2 where new antenna subsets (selected from group #3) are included at every iteration of the method; iii) group #3 where the antenna subset IDs are shuffled according to round-robin policy. All subset IDs within group #1 and #2 are sorted at each iteration of the method based on their priority to give opportunity to subsets IDs from group #2 to be upgraded to group #1. The SSI is computed only for the subsets within groups #1 and #2 and the antenna selection algorithm is applied only to those subsets.

6. MU-MAS LTE User Equipment

The present invention comprises of different designs of the LTE UE. In one embodiment, the UE is an LTE UE that is compatible with the MU-MAS employing precoding as described above and depicted in FIG. 13.

Figure 14:
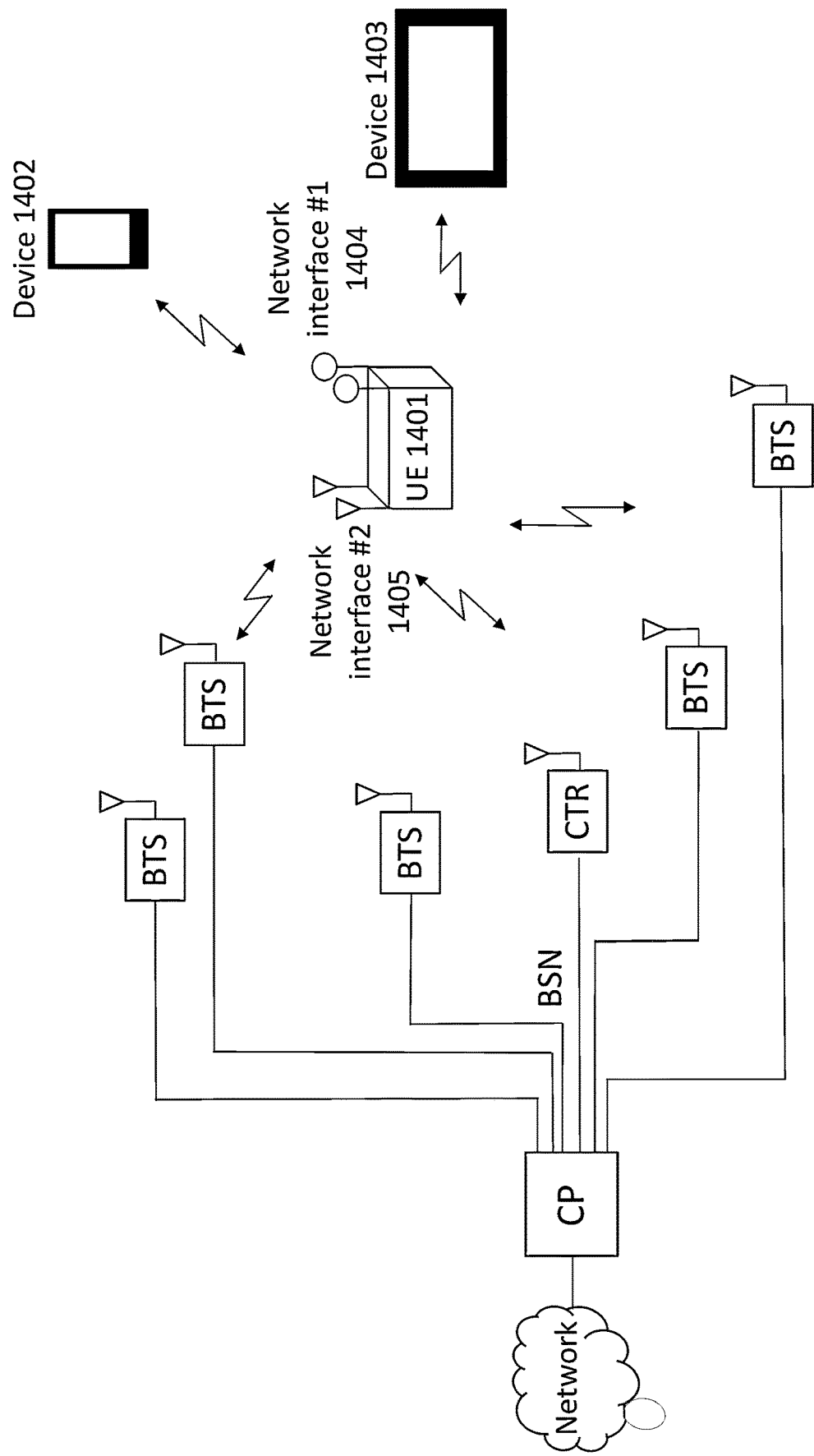
FIG. 14 illustrates one embodiment of a MU-MAS consisting of CP, distributed BTSs, multiple devices and one UE connected to the devices as well as the BTSs via network interfaces.

In a different embodiment, the UE 1401 connects to different devices 1402 and 1403 through a first network interface 1404 (e.g., Wi-Fi, USB, Ethernet, Bluetooth, optical fiber, etc.) and to the MU-MAS through a second network interface 1405 as shown in FIG. 14. The UE in FIG. 14 is equipped with two different network interfaces wherein each network interface comprises of one or multiple antennas (although in alternative embodiments, first network interface 1404 may be a wired interface without antennas). The antennas of the first network interface are denoted with circles, whereas the antennas of the second network interface are denoted with triangles. In the same embodiment, the second network interface supports MU-MAS precoding, MU-MAS implemented with LTE-compliant protocols, or MU-MAS (implemented with or without LTE-compliant protocols) and an alternative network. In the same embodiment, the alternative network is a cellular network, an LTE network or Wi-Fi network. In the same embodiment, the UE works with either and/or both MU-MAS and/or the alternative network and the UE selects either MU-MAS or the alternative network based on some criteria. In the same embodiment, the criteria are: i) whether only one network is available and is chosen; ii) whether one network has better performance; iii) whether one network is more economical; iv) whether one network is less congested; v) whether one network uses less UE resources.

Figure 15:
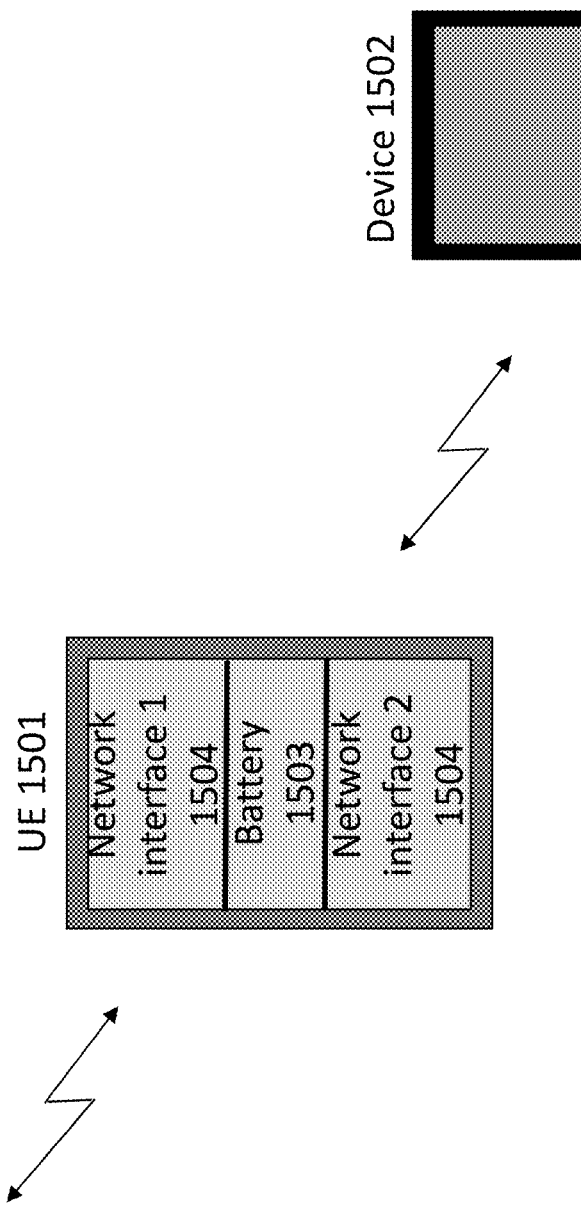
FIG. 15 illustrates one embodiment of a MU-MAS wherein the UE is in a case that physically attaches to the user device.

In one embodiment of the invention, the UE 1501 is in a case that physically attaches to the user device 1502 as depicted in FIG. 15. In the same embodiment, the case serves as a decorative addition to the user device. In another embodiment, the case serves to protect the user device from physical damage. The UE comprises of battery 1503, and one or multiple network interfaces 1504.

In one embodiment, the UE electronics are embedded within a case. In the same embodiment, the UE electronics include a battery 1503. The battery includes a power charger coupling through a physical electrical contact or a wireless contact. Exemplary power couplings are conductive, inductive, RF, light, or thermal, but power couplings are not limited these approaches. In the same embodiment, the UE electronics are coupled to receive power from the user device. This power coupling is through a physical contact or through an inductive or wireless contact. In the same embodiment, the user device is coupled to receive power from the MU-MAS UE. This coupling is through a physical contact or through an inductive or wireless contact. In a different embodiment, the same power charger powers both the user device and the MU_MAS UE.

In one embodiment of the invention, the UE is configured to communicate to the user device. In the same embodiment, the UE can be reset (e.g., via switch, or by removing power) so the user device can initially connect to it, and once the connection is established, the UE can be configured by the user device. Such configuration includes configuring a private password and/or other security protocols. In a different embodiment, the UE includes a means to be configured to communicate with the user device. Such configuration is done via a communications port to another device, wherein the communications port is USB, or via controls and/or buttons on the UE, or via display, wherein buttons or touch input are used.

In another embodiment, the same RF chain is used for MU-MAS communications as well as for the alternative network. In another embodiment, a different RF chain is used for MU-MAS communications and the alternative network.

7. Radio Frequency (RF) Calibration Exploiting Channel Reciprocity

Conventional closed-loop MU-MAS methods employ UL channel to feedback quantized CSI or codebook indices (as in codebook-based limited feedback schemes) from the UEs to the BTSs or CP. This scheme, however, results in large feedback overhead and high protocol complexity to enable the CSI feedback channel. In TDD systems, where UL and DL are set at the same frequency, it is thus desirable to avoid CSI feedback by exploiting UL/DL channel reciprocity. In practical systems, transmit and receive RF chains at the BTS or UE typically have different characteristics due to different RF components and circuit layout. Therefore, to preserve UL/DL reciprocity it is necessary to employ RF calibration methods to compensate for RF mismatch between transmit and receive chains.

Models for RF mismatch in typical wireless transceivers were described in [Reference 91] and hardware solutions to mitigate the effect of RF mismatch on the performance of adaptive digital beamforming systems were discussed in [Reference 92]. Software techniques to enable RF calibration in multiple-input multiple-output (MIMO) systems where proposed in [References 93,94] and experimental results for multiple-input single-output (MISO) and for systems employing antenna selection where shown in [Reference 95] and [Reference 96], respectively.

Prior art, however, assumes all RF chains are collocated on the same circuit board as in MIMO systems, thereby simplifying the RF calibration problem since information about the RF mismatch between all the RF chains is available locally. By contrast, the present invention consists of distributed antennas geographically placed far apart such that communication between those antennas only happens through the network. Hence, we define a novel system unit that we call "beacon station" designed specifically to enable RF calibration in MU-MASs with distributed antennas. Moreover, in prior art MIMO systems significant RF coupling between transmit/receive chains occurs due to the close proximity of the RF chains on the same board. By contrast, in the present invention, RF coupling occurs only between one transmit and one receive chain of the same distributed antenna. Hence, techniques employed for RF calibration are significantly different than the ones described in prior art as we will demonstrate hereafter. Finally, the RF calibration methods disclosed in prior art were limited to systems with a single user (e.g. a single User Equipment device). As shown in the derivations at the following paragraphs, systems with multiple users (e.g., MU-MASs) are particularly sensitive to RF mismatch, since that yields inter-user interference. As such, special techniques must be employed to enable RF calibration while exploiting channel reciprocity, as described below.

Figure 16:
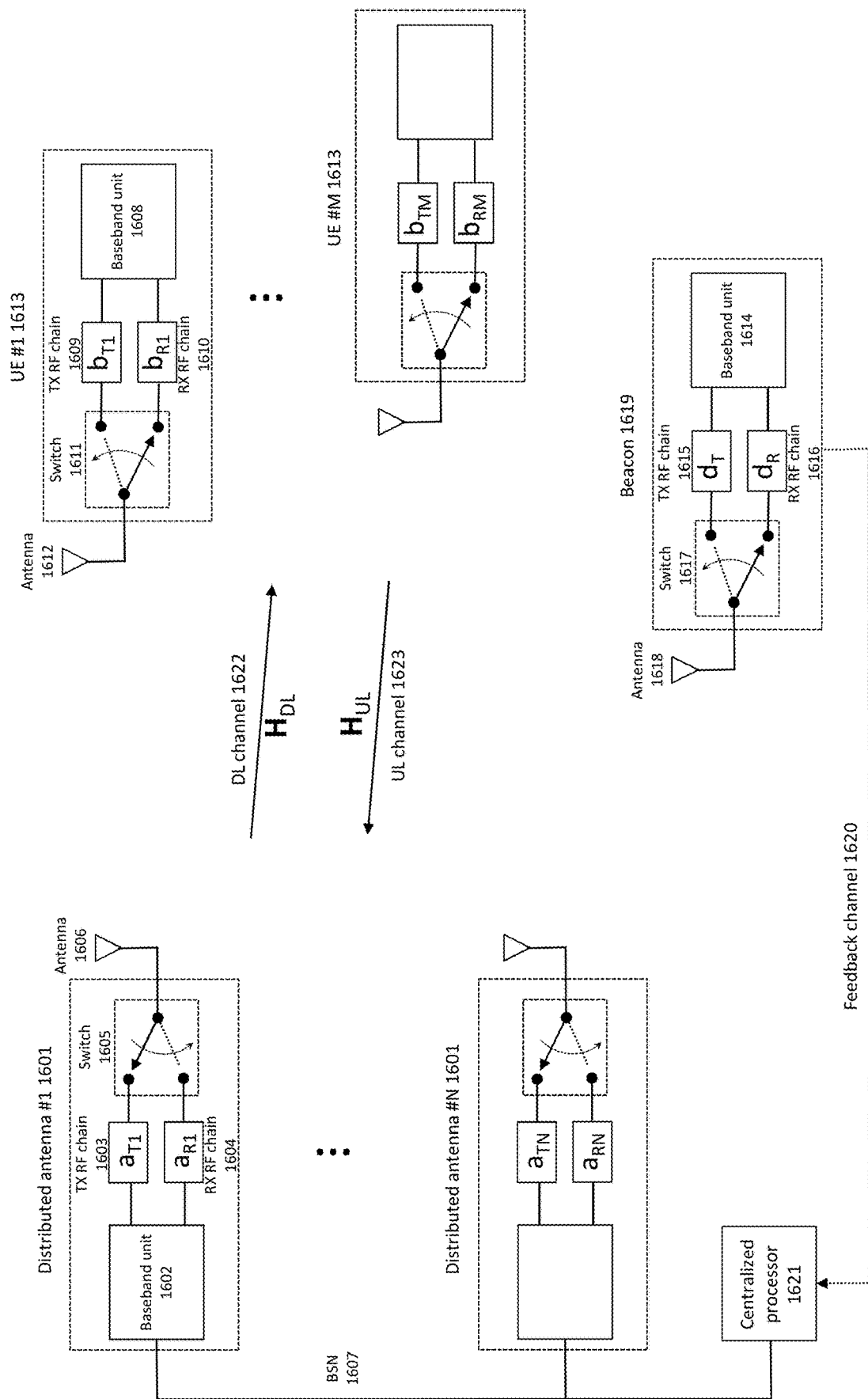
FIG. 16 illustrates one embodiment of a MU-MAS wherein the distributed antennas communicate to the UEs via the UL and DL channels.

The present invention consists of a MU-MAS that employs radio frequency (RF) calibration and exploits reciprocity between downlink (DL) and uplink (UL) channels, comprising of multiple distributed antennas, multiple User Equipment devices (UEs) and one or multiple beacon stations. In one embodiment, the RF calibration is employed to compute the DL MU-MAS precoding weights from the UL channel estimates. FIG. 16 shows the block diagram of the system including the distributed antennas 1601, multiple UEs 1613, one beacon station 1619, one base station network (BSN) 1607 connecting the distributed antennas, one centralized processor (CP) 1621 and one feedback channel 1620, that is the calibration control channel from the beacon to the CP.

Every distributed antenna unit consists of baseband unit 1602, transmit RF chain 1603, receive RF chain 1604, RF switch unit 1605 that dynamically selects transmit/receive RF chains for TDD operation, and antenna 1606. In one embodiment, the baseband unit comprises baseband signal processing and digital-to-analog converter (DAC). In another embodiment, all the baseband processing is executed at the CP such that RF signal is sent to every distributed antenna (e.g., via RF coax cables or RF over fiber networks). Every UE consists of baseband unit 1608, transmit/receive RF chains 1609 and 1610, respectively, RF switch 1611 and antenna 1612. The beacon station is composed of baseband unit 1614, transmit/receive RF chains 1615 and 1616, respectively, RF switch 1617 and antenna 1618.

The wireless links between the distributed antennas and the UEs are modeled as complex Gaussian channel matrix H of dimensions M×N, where M is the number of UEs and N is the number of distributed antennas. We define $H_{DL}$ the DL channel matrix 1622 and $H_{UL}$ the UL channel matrix 1623. Channel reciprocity holds as long as DL and UL are set to the same carrier frequency. In this case, the following property holds $$H_{DL} = H_{UL}^\dagger = H$$

where the symbol † denotes the transpose matrix operation.

The model above holds for either single-carrier or multicarrier systems. In multicarrier systems (e.g., OFDM) the complex matrix H represents the channel of one subcarrier, and the same model extends to any subcarrier in the system. FIG. 16 also shows transmit and receive RF units at the distributed antennas, modeled with complex channel matrices $A_T$ and $A_R$, respectively, of dimension N×N. Likewise, the transmit and receive RF units at the UEs are modeled by the matrices $B_T$ and $B_R$, respectively, of dimension M×M. In the case of MU-MAS with distributed antennas, RF coupling between distributed antennas and/or UEs is negligible due to relative antenna separation, such that $A_T$, $A_R$, $B_T$ and $B_R$ are represented as diagonal matrices. We observe this is a unique feature of MU-MAS with distributed antennas and distributed UEs. As such, the present invention is novel over prior art related to multiple-input multiple-output (MIMO) systems.

Based on the block diagram in FIG. 16, we write the effective DL channel matrix (modeling transmit/receive RF units and wireless links) as $$\bar{H}_{DL} = B_R H_{DL} A_T = B_R H A_T$$

and the effective UL channel matrix as $$\bar{H}_{UL} = A_R H_{UL} B_T = A_R H^\dagger B_T$$

In the present invention, RF calibration is obtained by preconditioning the matrix of the UL channel estimates $\bar{H}_{UL}$ with the complex RF calibration matrix C, as follows $$\bar{H}_{DL} = (C \bar{H}_{UL})^\dagger$$

In one embodiment of the invention comprising LTE cellular networks, the effective UL channel is estimated at the eNodeB employing the DMRS from all UEs.

Figure 17:
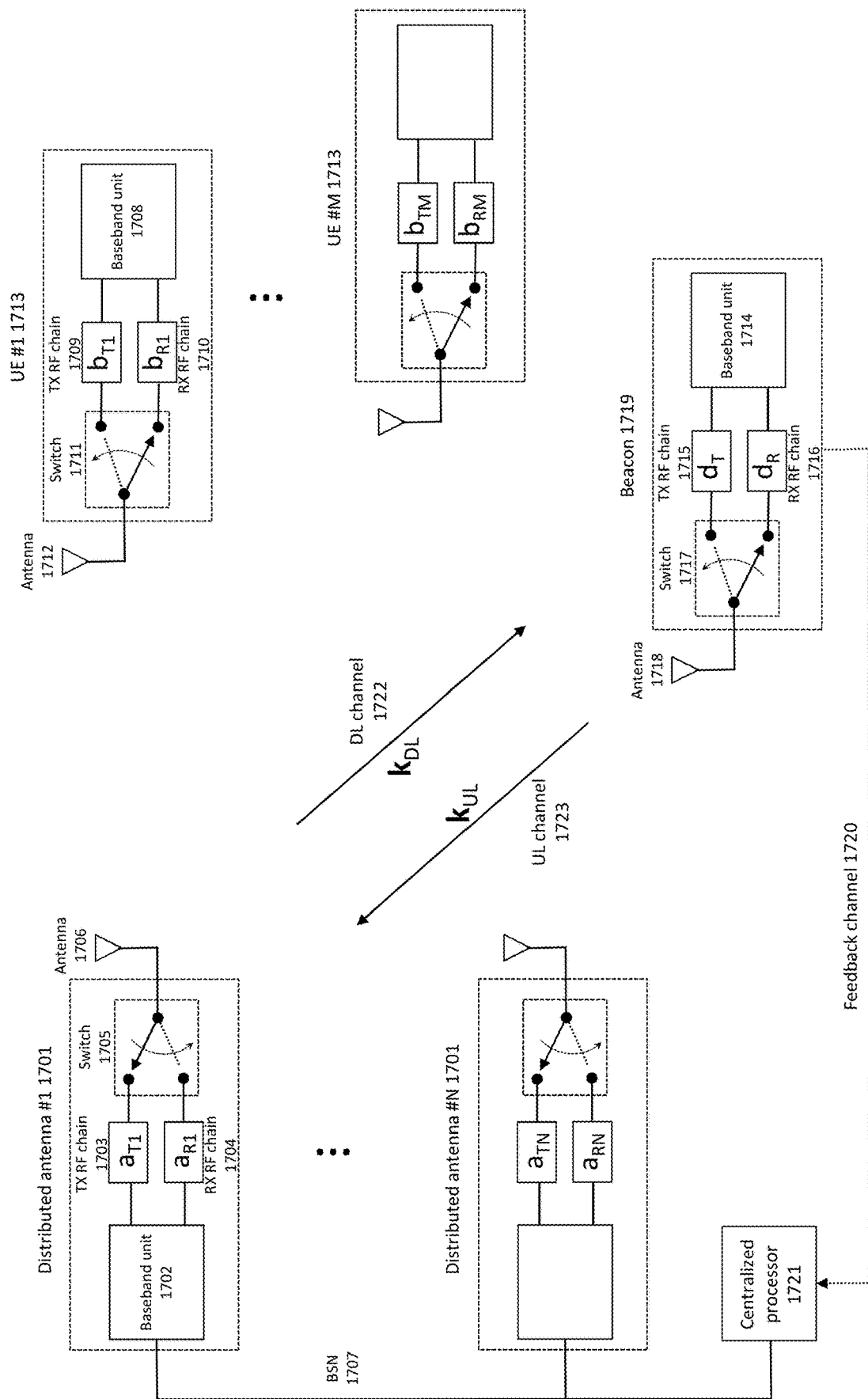
FIG. 17 illustrates one embodiment of a MU-MAS wherein the distributed antennas communicate to the beacon via the UL and DL channels.

As shown in FIG. 17, the matrix C is computed from the effective DL ($\bar{K}_{DL}$) channel 1722 and UL ($\bar{K}_{UL}$) channel 1723 vectors between every distributed antenna 1701 and the beacon station 1719, defined as $$\bar{k}_{DL} = D_R K_{DL} A_T$$

and $$\bar{k}_{UL} = A_R K_{UL} D_T$$

where $k_{DL} = k_{UL} = k$ are column vectors, assuming DL and UL channel reciprocity between the distributed antennas and the beacon station. In one embodiment, the DL channel between the distributed antennas and the beacon station is estimated by sending training signals from the distributed antennas to the beacon. In one exemplary embodiment comprising LTE cellular networks, the DL sequences CRS, or CSI-RS, or DM-RS are used by the beacon to estimate the effective DL channel from all eNodeBs. In the same embodiment, the UL channel between the beacon station and the distributed antennas is estimated by sending training signals from the beacon station to the antennas. In one embodiment of the invention, multiple beacon stations are employed to improve the estimation of the RF calibration matrix. In the present invention, there is no RF coupling between the distributed antennas, such that the RF calibration matrix C is diagonal.

Figure 18:
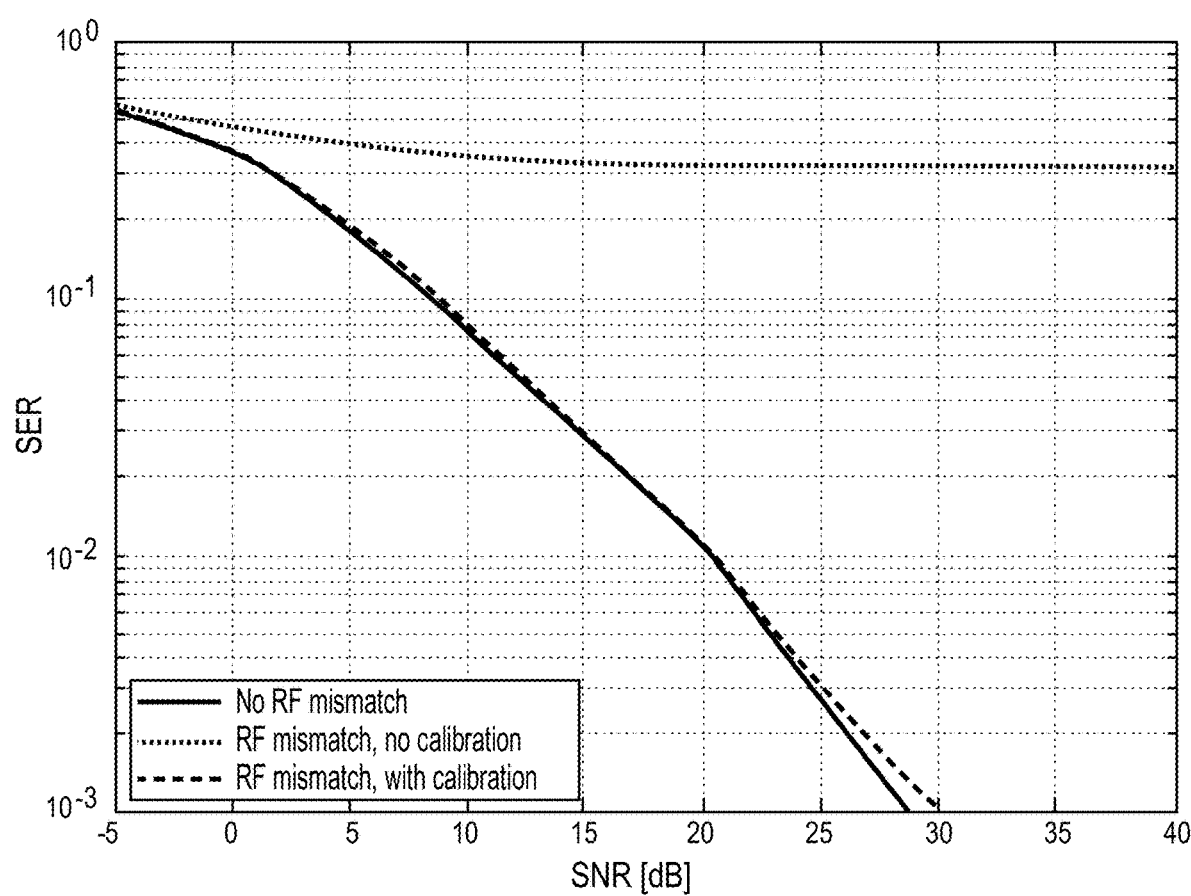
FIG. 18 illustrates the symbol error rate (SER) performance of the MU-MAS with linear precoding with/without RF mismatch and with/without RF calibration.

When linear precoding (e.g., zero-forcing [Reference 65], block-diagonalization or BD [References 66-67], matrix inversion, etc.) is employed, the symbol received at the m-th UE is given by $$r_m = \bar{h}_{DL,m} \bar{w}_{DL,m} s_m + \sum_{u=1, u \neq m}^{M} \bar{h}_{DL,m} \bar{w}_{DL,u} s_u + n_m$$

where $\bar{h}_{DL,m}$ is the m-th row of the effective channel matrix $\bar{H}_{DL}$, $\bar{w}_{DL,m}$ is the precoding vector for the m-th UE derived from $\bar{H}_{DL}$, $s_m$ is the symbol transmitted to the m-th UE and nm is white Gaussian noise at the m-th UE. For the sake of simplicity, the above model assumes a single receive antenna at every UE, but the present invention extends to any number of antennas at the UE. It is possible to show that when the RF calibration method described above is employed the inter-client interference at every UE is pre-cancelled at the transmitter such that the following condition holds $$\bar{h}_{DL,m} \bar{w}_{DL,u} = \bar{h}_{DL,m} \tilde{w}_{DL,u} = 0, \forall u = 1, \ldots, M \text{ with } u \neq m$$

where $\tilde{w}_{DL,u}$ is the precoding weight vector derived from the RF calibrated channel matrix $\bar{H}_{DL}$. In one embodiment, the precoding weights are computed from the RF calibrated channel matrix to pre-cancel inter-client interference at every UE. FIG. 18 shows the symbol error rate (SER) performance of MU-MAS employing BD precoding and 4-QAM modulation in frequency-flat channels for three scenarios: i) no RF mismatch; ii) RF mismatch without calibration; iii) RF mismatch with calibration. We observe the RF calibration method in the present invention reduces the SER down to ideal performance (i.e., with no RF mismatch).

Figure 19:
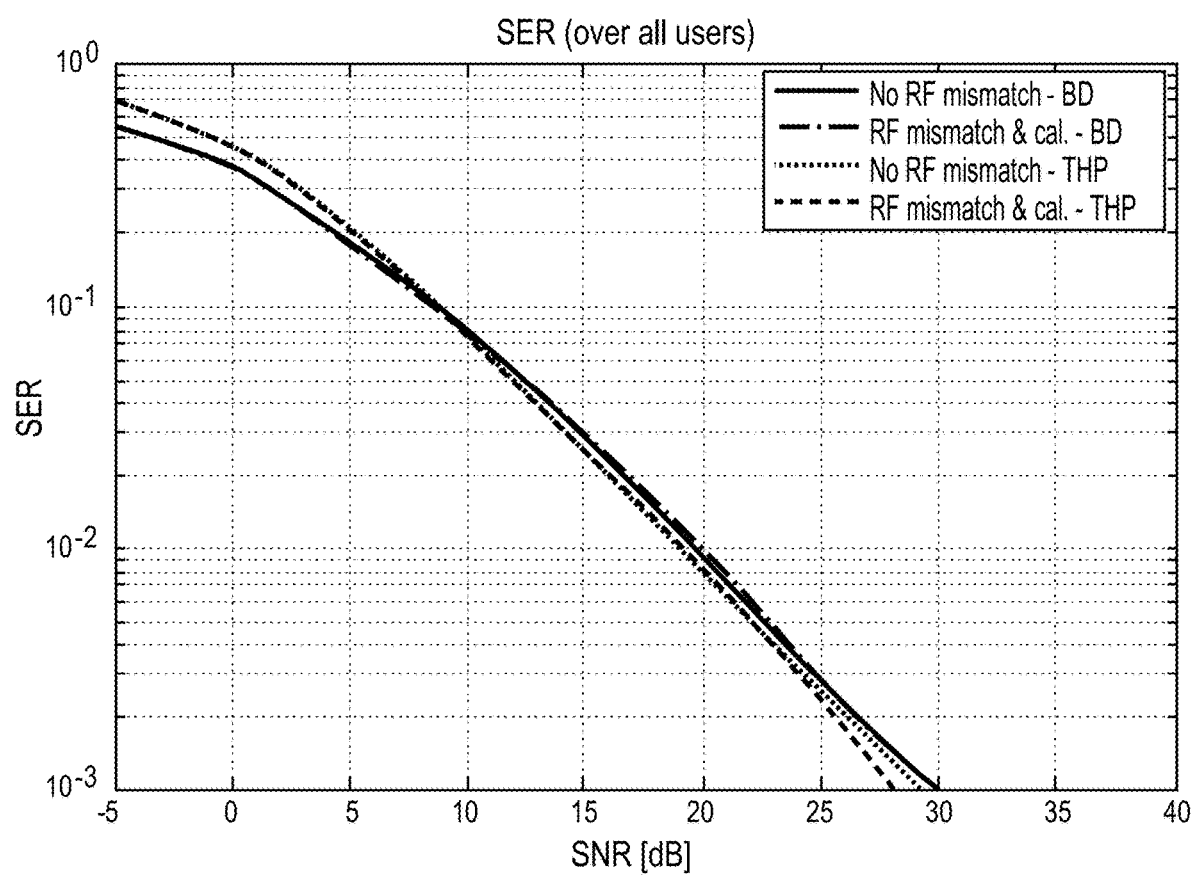
FIG. 19 illustrates the symbol error rate (SER) performance of the MU-MAS with linear and non-linear precoding with/without RF mismatch and with/without RF calibration.
Figure 20B:
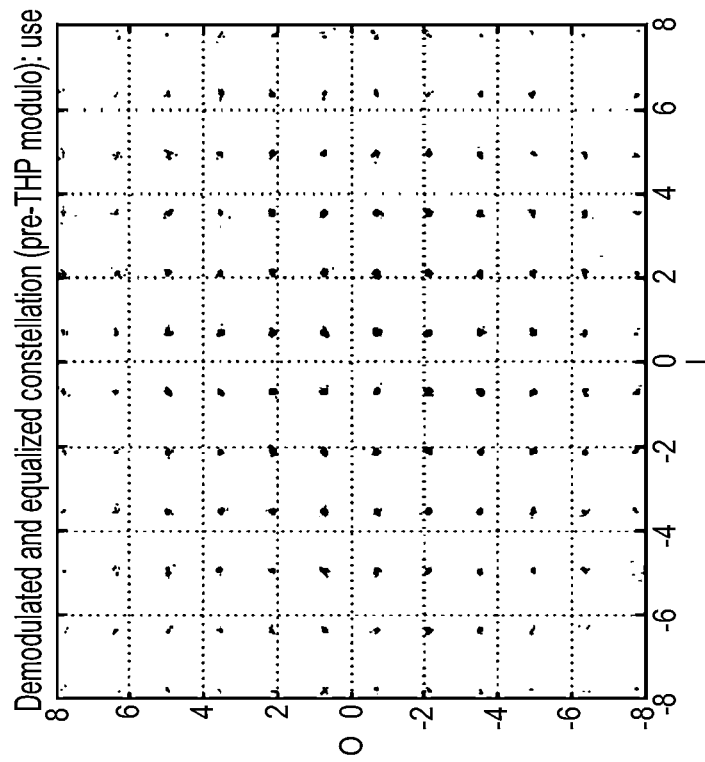
FIGS. 20A-B illustrates the 4-QAM constellations at the UEs (before modulo operation) when applying THP non-linear precoding.
Figure 20A:
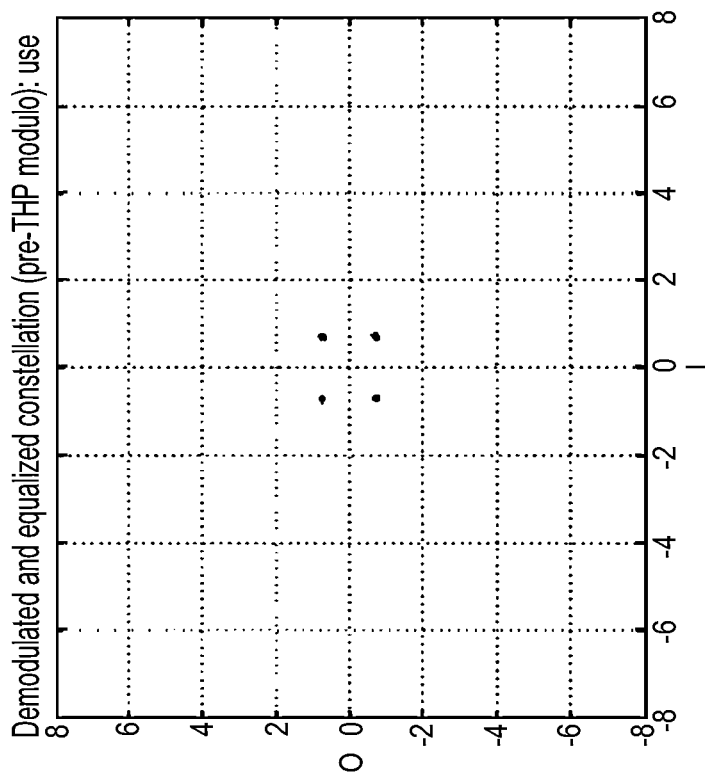

In another embodiment of the invention, non-linear precoding methods (e.g., dirty-paper coding [References 68-70] or Tomlinson-Harashima precoding or THP [References 71-72], lattice techniques or trellis precoding [References 73-74], vector perturbation techniques [References 75-76]) are applied to the RF calibrated channel matrix to pre-cancel inter-client interference at every UE. FIG. 19 shows that the SER obtained with non-linear precoding techniques using RF calibration and UL/DL reciprocity matches the performance of linear precoding. FIG. 20*a* shows the constellation before THP modulo operation for UE 1, whereas FIG. 20*b* shows the constellation before THP modulo operation for UE 2 (THP lattice structure) in MU-MAS with two distributed antennas and two UEs. THP precoding is designed to completely cancel interference to the "reference-UE" and applies successive interference cancellation schemes to the other UEs. As such it is expected the SER performance for the reference-UE may be better than the other UEs. In one embodiment, Round-Robin or proportional fair scheduling or other types of scheduling techniques are applied to the UEs to guarantee similar average SER performance to all UEs.

The computational performance of BD and THP methods may vary depending on the number of distributed antennas and/or UEs within every user-cluster. In one embodiment of the invention, the MU-MAS dynamically switches between linear and non-linear precoding techniques to minimize the computational complexity of the precoder, depending on the number of distributed antennas and/or UEs in every user-cluster.

In practical MU-MASs, the beacon station is a wireless transceiver dedicated to the use for RF calibration. Since the beacon requires feedback channel to communicate the estimated effective DL channel from all distributed antennas for calibration purposes, the beacon communicates to the CP via wireless or wireline link. In another embodiment, the beacon station is any of the distributed antennas, and the calibration parameters are computed with respect to that antenna. In the same embodiment, the distributed antennas are organized as in a mesh network and pair-wise RF calibration between adjacent distributed antennas is computed to guarantee good link quality. The RF calibration is carried across all antennas and calibration information is fed back to the CP such that all distributed antennas are calibrated with one another. In another embodiment, the beacon is any of the UEs that use any wireless or wireline link to feedback calibration information to the CP.

The calibration information from the beacon to the CP is quantized over limited number of bits or sent via codebook-based limited feedback methods to reduce overhead over the control channel. We observe that RF calibration can be run at a slow rate (depending on the rate of variation of the RF characteristics, due to temperature changes, etc.). If the rate of update of the calibration information is low, the wireless data channel can be used to send that information to the CP without causing any severe loss of data rate. In one exemplary embodiment, in LTE cellular networks the PUSCH is used to feedback calibration information from the UE to the CP.

One or multiple geographically distributed beacons are employed per user-cluster, or antenna-cluster or antenna-subcluster depending on the relative link quality between the beacon and the distributed antennas in that cluster. In one embodiment, the beacon with the best signal quality to all distributed antennas in the cluster is used for RF calibration. In another embodiment, the beacons are dynamically selected at every instance of time to adapt to the changing quality of the links to the distributed antennas due to variations in the propagation environment. In another embodiment, multiple beacons are employed cooperatively (e.g., via maximum ratio combining/transmission) to maximize the SNR or SINR over the links from/to the distributed antennas. In a different embodiment, one or more RF calibrations are carried out per cluster.

In one embodiment of the invention, the beacon station is used not only for RF calibration but also to send signaling information to the distributed antennas and/or UEs including time and frequency synchronization reference. The distributed antennas and/or UEs employ that reference to maintain time and frequency synchronization with the MU-MAS master reference clock. In one embodiment, this reference clock distribution from the beacon to the distributed antennas and UEs is enabled via the LTE multimedia broadcast single frequency network (MBSFN) communication channel.

REFERENCES (EACH REFERENCE IS IDENTIFIED BY A NUMBER IN BRACKETS)

[1] A. Paulraj, R. Nabar, and D. Gore, Introduction to Space-Time Wireless Communications, Cambridge University Press, 40 West 20th Street, New York, NY, USA, 2003
[2] D. Gesbert, M. Shafi, D. Shiu, P. J. Smith and A. Naguib, "From theory to practice: an overview of MIMO space-time coded wireless systems", IEEE Journal on Selected Areas on Communications, vol. 2, n. 3, pp. 281-302, April 2003
[3] L. Zheng and D. N. C. Tse, "Diversity and multiplexing: a fundamental tradeoff in multiple-antenna channels," IEEE Trans. Info. Th., vol. 49, no. 5, pp. 1073-1096 May 2003
[4] D. N. C. Tse, P. Viswanath, and L. Zheng, "Diversity-multiplexing tradeoff in multiple-access channels", IEEE Trans. Info. Th., vol. 50, no. 9, pp. 1859-1874 September 2004
[5] E. Visotsky and U. Madhow, "Space-time transmit precoding with imperfect feedback," IEEE Trans. Info. Th., vol. 47, pp. 2632-2639 September 2001.
[6] S. A. Jafar, S. Vishwanath, and A. Goldsmith, "Channel capacity and beamforming for multiple transmit and receive antennas with covariance feedback," Proc. IEEE Int. Conf. on Comm., vol. 7, pp. 2266-2270 June 2001.
[7] S. A. Jafar and A. Goldsmith, "Transmitter optimization and optimality of beamforming for multiple antenna systems," IEEE Trans. Wireless Comm., vol. 3, pp. 1165-1175 July 2004.
[8] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553 September 2004.
[9] A. L. Moustakas and S. H. Simon, "Optimizing multiple-input single-output (MISO) communication systems with general Gaussian channels: nontrivial covariance and nonzero mean," IEEE Trans. Info. Th., vol. 49, pp. 2770-2780 October 2003.
[10] M. Kang and M. S. Alouini, "Water-filling capacity and beamforming performance of MIMO systems with covariance feedback," IEEE Work. on Sign. Proc. Adv. in Wire. Comm., pp. 556-560, June 2003.
[11] S. H. Simon and A. L. Moustakas, "Optimizing MIMO antenna systems with channel covariance feedback," IEEE Jour. Select. Areas in Comm., vol. 21, pp. 406-417, April 2003.
[12] S. M. Alamouti, "A simple transmit diversity technique for wireless communications," IEEE Jour. Select. Areas in Comm., vol. 16, no. 8, pp. 1451-1458, October 1998.
[13] V. Tarokh, N. Seshadri, and A. R. Calderbank, "Space-time codes for high data rate wireless communication: Performance criterion and code construction," IEEE Trans. Info. Th., vol. 44, pp. 744-65, March 1998.
[14] V. Tarokh, H. Jafarkhani, and A. R. Calderbank, "Space-time block codes from orthogonal designs," IEEE Trans. Info. Th., vol. 45, pp. 1456-467, July 1999.
[15] E. N. Onggosanusi, A. G. Dabak, and T. A. Schmidl, "High rate space-time block coded scheme: performance and improvement in correlated fading channels," Proc. IEEE Wireless Comm. and Net. Conf., vol. 1, pp. 194-199, March 2002.
[16] G. D. Durgin, Space-Time Wireless Channels, Prentice Hall, Upper Saddle River, NJ, USA, 2003
[17] D.-S. Shiu, G. J. Foschini, M. J. Gans, and J. M. Kahn, "Fading correlation and its effect on the capacity of multielement antenna systems," IEEE Trans. Comm., vol. 48, no. 3, pp. 502-513, March 2000
[18] A. Forenza and R. W. Heath Jr., "Impact of antenna geometry on MIMO communication in indoor clustered channels," Proc. IEEE Antennas and Prop. Symp., vol. 2, pp. 1700-173 June 2004.
[19] E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553 September 2004
[20] R. W. Heath Jr. and A. Paulraj, "Switching between multiplexing and diversity based on constellation distance," Proc. of Allerton Conf. on sp208, Comm. Control and Comp., September 2000.
[21] S. Catreux, V. Erceg, D. Gesbert, and R. W. Heath Jr., "Adaptive modulation and MIMO coding for broadband wireless data networks," IEEE Comm. Mag., vol. 2, pp. 108-115, June 2002.
[22] A. Forenza, A. Pandharipande, H. Kim, and R. W. Heath Jr., "Adaptive MIMO transmission scheme: Exploiting the spatial selectivity of wireless channels," Proc. IEEE Veh. Technol. Conf., vol. 5, pp. 3188-3192 May 2005
[23] C. B. Chae, A. Forenza, R. W. Heath, Jr., M. R. Mckay, and I. B. Collings, "Adaptive MIMO Transmission Techniques for Broadband Wireless Communication Systems," IEEE Communications Magazine, vol. 48, no. 5, pp. 112-118, May 2010
[24] FCC, "Broadband action agenda", National Broadband Plan, 2010 http://www.broadband.gov/plan/national-broadband-plan-action-agenda.pdf
[25] [25], N. Delfas, F. Meunier, S. Flannery, T. Tsusaka, E. Gelblum and S. Kovler, "Mobile data wave: who dares to invest, wins", Morgan Stanley Research Global, Jun. 13, 2012
[26] D. Goldman, "Sorry, America: your wireless airwaves are full", CNN Money http://money.cnn.com/2012/02/21/technology/spectrum_crunch/index.htm
[27] P. Rysavy, "No silver bullets for FCC, NTIA spectrum challenge", Daily report for executives, Bloomberg BNA, August 2012 http://www.rysavy.com/Articles/2012_09_No_Spectrum_Silver_Bullets.pdf
[28] T. W. Hazlett, "Radio spectrum for a hungry wireless world", Sep. 22, 2011
[29] B. J. Love, D. J. Love and J. V. Krogmeier, "Like deck chairs on the Titanic: why spectrum reallocation won't avert the coming data crunch but technology might keep the wireless industry afloat", February 2012
[30] Qualcomm, "The 1000× data challenge, the latest on wireless, voice, services and chipset evolution", 4G World, Oct. 31, 2012

[31] J. Lee, J.-K. Han, J. Zhang, "MIMO technologies in 3GPP LTE and LTE-advanced", EURASIP Journal on Wireless Comm. and Net., Hindawi, May 2009

[32] 3GPP, TS 36.201, "Evolved Universal Terrestrial Radio Access (E-UTRA); LTE Physical Layer-General Description (Release 8)"

[33] 3GPP, TS 36.211, "Evolved Universal Terrestrial Radio Access (E-UTRA); Physical Channels and Modulation (Release 8)"

[34] 3GPP, TS 36.212, "Evolved Universal Terrestrial Radio Access (E-UTRA); Multiplexing and channel coding (Release 8)"

[35] 3GPP, TS 36.213, "Evolved Universal Terrestrial Radio Access (E-UTRA); Physical layer procedures (Release 8)"

[36] T. Yoo, N. Jindal, and A. Goldsmith, "Multi-antenna broadcast channels with limited feedback and user selection," IEEE Journal on Sel. Areas in Communications, vol. 25, pp. 1478-91, July 2007.

[37] P. Ding, D. J. Love, and M. D. Zoltowski, "On the sum rate of channel subspace feedback for multi-antenna broadcast channels," in *Proc., IEEE* Globecom, vol. 5, pp. 2699-273 November 2005.

[38] N. Jindal, "MIMO broadcast channels with finite-rate feedback," IEEE Trans. on Info. Theory, vol. 52, pp. 5045-60, November 2006.

[39] D. J. Love, R. W. Heath, Jr., V. K. N. Lau, D. Gesbert, B. D. Rao, and M. Andrews, "An Overview of Limited Feedback in Wireless Communication Systems," *IEEE Journal on Sel. Areas in Comm.*, Special Issue on Exploiting Limited Feedback in Tomorrow's Wireless Communication Networks, vol. 26, no. 8, pp. 1341-1365 October 2008.

R. W. Heath, Jr., D. J. Love, V. K. N. Lau, D. Gesbert, B. D. Rao, and M. Andrews, "Exploiting Limited Feedback in Tomorrow's Wireless Communication Networks," *IEEE Journal on Sel. Areas in Comm.*, Special Issue on Exploiting Limited Feedback in Tomorrow's Wireless Communication Networks, vol. 26, no. 8, pp. 1337-1340 October 2008.

[41] D. J. Love, R. W. Heath, Jr., and T. Strohmer, "Grassmannian Beamforming for Multiple-Input Multiple-Output Wireless Systems," *IEEE Trans. on Info. Theory* special issue on MIMO Communication, vol. 49, pp. 2735-2747 October 2003

[42] C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Comm. Networks, vol. 26, no. 8, pp. 1505-1515 October 2008

[43] A. Paulraj, "Is OFDMA, MIMO and OS the right stuff for mobile broad-band?" http://www.ieeevtc.org/vtc2005fall/presentations/paulraj.pdf, September 2005

[44] J. Wannstrom, "Carrier aggregation explained", 3GPP http://www.3gpp.org/Carrier-Aggregation-explained

[45] 3GPP, TS 36.808, "Evolved Universal Terrestrial Radio Access (E-UTRA); Carrier Aggregation (Release 10)", v10.0.0, June 2012

[46] Nokia Siemens Networks, "2020: beyond 4G, radio evolution for the gigabit experience", White Paper, 2011, www.nokiasiemensnetworks.com

[47] S. Marek, "AT&T's Rinne talks about carrier aggregation trials, small cells and more", http://www.fiercebroadbandwireless.com/story/atts-rinne-talks-about-carrier-aggregation-trials-small-cells-and-more/2012-11-08

[48] M. Reed, "InterfereX", Tech23, 2011 http://www.youtube.com/watch?v=YPpELm6iip8

[49] NICTA, "InterfereX", http://www.nicta.com.au/research/archive/research_themes/networked_systems/interfe rex

[50] J. Duplicity, et al., "MU-MIMO in LTE systems", EURASIP Journal on Wireless Communications and Netowrking, March 2011

[51] S. Feng and E. Seidel, "Self-organizing networks (SON) in 3GPP LTE", Nomor research, May 2008

[52] NEC, "Self organizing networks", White paper, February 2009

[53] U.S. Pat. No. 5,809,422, issued Sep. 15, 1998, entitled 'Distributed microcellular communications system ", G. R. Raleigh, M. A. Pollack

[54] G. J. Foschini, H. C. Huang, K. Karakayali, R. A. Valenzuela, and S. Venkatesan. The Value of Coherent Base Station Coordination. In *Conference on In-formation Sciences and Systems (CISS 2005)*, March 2005

[55] M. K. Karakayali, G. J. Foschini, R. A. Valenzuela, and R. D. Yates, "On the maximum common rate achievable in a coordinated network," *Proc. of the Int'l Conf. on Communications (ICC'06)*, vol. 9, pp. 4333-4338 June 2006.

[56] M. K. Karakayali, G. J. Foschini, and R. A. Valenzuela, "Network coordination for spectrally efficient communications in cellular systems," *IEEE Wireless Communications Magazine*, vol. 13, no. 4, pp. 56-61, August 2006.

[57] G. J. Foschini, M. K. Karakayali, and R. A. Valenzuela, "Coordinating multiple antenna cellular networks to achieve enormous spectral efficiency," *Proceedings of the IEEE*, vol. 153, no. 4, pp. 548-555, August 2006.

[58] S. Venkatesan, A. Lozano, and R. Valenzuela, "Network MIMO: overcoming inter-cell interference in indoor wireless systems", Proc. of Asilomar conf., pp. 83-87, November 2007

[59] S. Venkatesan, H. Huang, A. Lozano, and R. Valenzuela, "A WiMAX-based implementation of network MIMO for indoor wireless systems", EURASIP Journal on Advances in Signal Processing, September 2009

[60] Y. Liang, R. Valenzuela, G. Foschini, D. Chizhik, and A. Goldsmith, "Interference suppression in wireless cellular networks through picocells", ACSSC, pp. 1041-145 November 2007

[61] A. Papadogiannis, H. J. Bang, D. Gesbert, and E. Hardouin, "Efficient selective feedback design for multi-cell cooperative networks", IEEE Trans. On Vehicular Techn., pp. 196-205, vol. 60, n. 1, January 2011

[62] I. F. Akyildiz, D. M. Guterrez-Estevez, E. C. Reyes, "The evolution to 4G cellular systems: LTE-Advanced", Physical Comm., Elsevier, pp. 217-244, 2010

[63] A. Barbieri, P. Gaal, S. Geirhofer, T. Ji, D. Malladi, Y. Wei, and F. Xue, "Coordinated downlink multi-point communications in heterogeneous cellular networks", (Qualcomm), Information Theory and App. Workshop, pp. 7-16, February 2012

[64] S. Parkvall, E. Dahlman, A. Furuskar, Y. Jading, M. Olsson, S. Wanstedt, and K. Zangi, "LTE-Advanced-evolving LTE towards IMT-Advanced", (Ericsson) IEEE VTC, pp. 1-5, September 2008

[65] R. A. Monziano and T. W. Miller, *Introduction to Adaptive Arrays*, New York: Wiley, 1980.

[66] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[67] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Proc.*, vol. 55, no. 3, pp. 1159-1171 March 2007.

[68] M. Costa, "Writing on dirty paper," IEEE *Transactions on Information Theory*, Vol. 29, No. 3, Page(s): 439-441, May 1983.

[69] G. Caire and S. Shamai, "On the achievable throughput of a multiantenna Gaussian broadcast channel," IEEE Trans. Info. Th., vol. 49, pp. 1691-176 July 2003.

[70] N. Jindal & A. Goldsmith, "Dirty Paper Coding vs. TDMA for MIMO Broadcast Channels", IEEE Trans. on Info. Theory, vol. 51, pp. 1783-1794 May 2005

[71] M. Tomlinson, "New automatic equalizer employing modulo arithmetic," *Electronics Letters*, Page(s): 138-139, March 1971.

[72] H. Miyakawa and H. Harashima, "A method of code conversion for digital communication channels with intersymbol interference," Trans. of the Inst. of Electronic

[73] U. Erez, S. Shamai (Shitz), and R. Zamir, "Capacity and lattice-strategies for cancelling known interference," *Proceedings of International Symposium on Information Theory*, Honolulu, Hawaii, November 2000.

[74] W. Yu and J. M. Cioffi, "Trellis Precoding for the Broadcast Channel", IEEE Globecom, vol. 2, pp. 1344-1348, 2001

[75] B. M. Hochwald, C. B. Peel, and A. L. Swindlehurst, "A Vector-Perturbation Technique for Near-Capacity Multi-antenna Multiuser Communication-Part I: Channel Inversion and Regularization", IEEE Trans. On Communications, vol. 53, n. 1, pp. 195-202, January 2005

[76] B. M. Hochwald, C. B. Peel, and A. L. Swindlehurst, "A Vector-Perturbation Technique for Near-Capacity Multi-antenna Multiuser Communication-Part II: Perturbation", IEEE Trans. On Comm., vol. 53, n. 3, pp. 537-544, March 2005

[77] S. Perlman and A. Forenza, "Distributed-input distributed-output (DIDO) wireless technology: a new approach to multiuser wireless", Rearden Labs White Paper, July 2011, http://www.reardenwireless.com/110727-DIDO-A%20New%20Approach%20to%20Multiuser%20Wireless.pdf

[78] A. Vance, "Steve Perlman's wireless fix", Businessweek, July 2011 http://www.businessweek.com/magazine/the-edison-of-silicon-valley-07272011.html

[79] M. Lindström (Ericsson), "LTE-Advanced Radio Layer 2 and RRC aspects", 3GPP TSG-RAN WG2

[80] Anritsu, "LTE resource guide", www.us.anritsu.com

[81] 3GPP, "Spatial Channel Model AHG (Combined ad-hoc from 3GPP & 3GPP2)", SCM Text V6.0, Apr. 22, 2003

[82] J. Lee, "Introduction of LTE-Advanced DL/UL MIMO", Samsung Electronics, September 2009

[83] E. Dahlman, S. Parkvall and J. Skold, "4G: LTE/LTE-Advanced for mobile broadband", Elsevier, 2011

[84] J. Syren, "Overview on the 3GPP long term evolution physical layer", Freescale White Paper, July 2007

[85] M. Baker, "LTE-Advanced physical layer", Alcatel-Lucent, December 2009

[86] J. Xu, "LTE-Advanced signal generation and measurements using SystemVue", Agilent Technologies

[87] X. Hou and H. Kayama, "Demodulation reference signal design and channel estimation for LTE-Advanced uplink", DOCOMO, Adv. in Vehic. Netw. Tech., April 2011

[88] D. C. Chu, "Polyphase codes with good periodic correlation properties", *IEEE Trans. Info. Theory*, vol. 18, n. 4, pp. 531-532, July 1972

[89] A. Lozano, R. W. Heath and J. Andrews, "Fundamental limits of cooperation", March 2012, http://arxiv.org/pdf/1204.0011.pdf

[90] J. G. Andrews, "Seven ways that HetNet are a cellular paradigm shift" http://users.ece.utexas.edu/~jandrews/pubs/And_HetNet_CommMag2012_v3.pdf

[91] J-C. Guey, and L. D. Larsson, "Nodeling and evaluation of MIMO systems exploiting channel reciprocity in TDD mode", 2004

[92] N. Tyler, B. Allen, and H. Aghvami, "Adaptive antennas: the calibration problem", IEEE Comm. Mag., pp. 114-122, December 2004

[93] A. Bourdoux, B. Come, and N. Khaled, "Non-reciprocal transceivers in OFDM/SDMA systems: impact and mitigation", IEEE, pp. 183-186, 2003

[94] M. Guillaud, D. T. M. Slock, and R. Knopp, "A practical method for wireless channel reciprocity exploitation through relative calibration", IEEE Proc. Of Sign Proc., pp. 403-406, vol. 1, August 2005

[95] P. Zetterberg, "Experimental investigation of TDD reciprocity based zero-forcing transmit precoding", EUR-ASIP, June 2010

[96] P. Uthansakul, K. Attakitmongkol, N. Promsuvana, and Uthansakul, "MIMO antenna selection using CSI from reciprocal channel", Int. Journ. Of Elect. And Info. Eng., 2010

We claim:

1. A wireless transceiver station comprising:
    (a) a first plurality of antennas of the wireless transceiver station, where the first plurality includes more than 8 antennas; and
    (b) hard-wired logic connected to each antenna in the first plurality of antennas, which when executed causes the wireless transceiver station to perform a method comprising steps of:
        (1) estimating a plurality of radio frequency (RF) calibrations for uplink (UL)/downlink (DL) channel reciprocity in frequency selective channels for the first plurality of antennas;
        (2) determining a plurality of UL channel state information (CSI) in response to receiving a plurality of UL transmissions in frequency selective channels by two or more of the first plurality of antennas from two or more of a second plurality of antennas of a plurality of user equipment devices (UEs);
        (3) deriving a plurality DL CSI from the plurality of UL CSI based on UL/DL channel reciprocity; and
        (4) precoding a plurality of orthogonal frequency-division multiplexing (OFDM) radio signals based on the plurality of DL CSI and the plurality of RF calibrations that are transmitted concurrently by the two or more of the first plurality of antennas, to cause the plurality of OFDM radio signals to interfere to create concurrent, non-interfering channels at a respective location of each antenna in the two or more of the second plurality of antennas.

2. The wireless transceiver station of claim 1, wherein the DL CSI is derived from the plurality of UL CSI based on two or more of the plurality of RF calibrations and based on UL/DL channel reciprocity.

3. The wireless transceiver station of claim 1, wherein the hard-wired logic is further programmed to perform the step of:

using the plurality of UL CSI to remove inter-channel interference from a plurality of UL transmissions received by two or more of the first plurality of antennas from two or more of the second plurality of antennas.

4. The wireless transceiver station of claim 1, wherein the wireless transceiver station is within a radio access network (RAN).

5. The wireless transceiver station of claim 1, wherein the hard-wired logic is also operatively connected to a third plurality of antennas of one or more of a plurality of wireless transceiver stations in a radio access network (RAN).

6. A wireless transceiver station comprising:
(a) a first plurality of antennas of the wireless transceiver station where the first plurality is more than 8 antennas; and
(b) a processor operatively connected to memory and operatively connected to each antenna in the first plurality of antennas wherein the memory includes instructions stored that in conjunction with hard-wired logic, when executed cause the wireless transceiver station to perform a method comprising steps of:
(1) estimating a plurality of radio frequency (RF) calibrations for uplink (UL)/downlink (DL) channel reciprocity in frequency selective channels for the first plurality of antennas;
(2) determining a plurality of UL channel state information (CSI) in response to receiving a plurality of UL transmissions in frequency selective channels by two or more of the first plurality of antennas from two or more of a second plurality of antennas of a plurality of user equipment devices (UEs);
(3) deriving a plurality of DL CSI from the plurality of UL CSI based on UL/DL channel reciprocity; and
(4) precoding a plurality of orthogonal frequency-division multiplexing (OFDM) radio signals based on the plurality of DL CSI and the plurality of RF calibrations that are transmitted concurrently by the two or more of the first plurality of antennas, to cause the plurality of OFDM radio signals to interfere to create concurrent, non-interfering channels at a respective location of each antenna in the two of more of the second plurality of antennas.

7. The wireless transceiver station of claim 6, wherein the DL CSI is derived from the plurality of UL CSI based on two or more of the plurality of RF calibrations and based on UL/DL channel reciprocity.

8. The wireless transceiver station of claim 6, wherein the processor and hard-wired logic are further programmed to perform the step of:
using the plurality of UL CSI to remove inter-channel interference from a plurality of UL transmissions received by two or more of the first plurality of antennas from two or more of the second plurality of antennas.

9. The wireless transceiver station of claim 6, wherein the wireless transceiver station is within a radio access network (RAN).

10. The wireless transceiver station of claim 6, wherein hard-wired logic is also operatively connected to a third plurality of antennas of one or more of a plurality of wireless transceiver stations in a radio access network (RAN).

11. The wireless transceiver station of claim 6, wherein the processor is operatively connected to a third plurality of antennas of one or more of a plurality of wireless transceiver stations in a radio access network (RAN).

12. A method comprising:
(1) determining uplink (UL) channel state information (CSI) in response to receiving a plurality of UL transmissions in frequency selective channels by two or more of a first plurality of antennas of a wireless transceiver station from two or more of a second plurality of antennas of a plurality of user equipment devices (UEs), where the first plurality of antennas includes more than 8 antennas;
(2) deriving a plurality of downlink (DL) CSI from the plurality of UL CSI based on UL/DL channel reciprocity; and
(3) precoding a plurality of orthogonal frequency-division multiplexing (OFDM) radio signals based on the two or more of the plurality of DL CSI and a plurality of frequency selective radio frequency (RF) calibrations that are transmitted concurrently by the two or more of the first plurality of antennas, to cause the plurality of OFDM radio signals to interfere to create concurrent, non-interfering channels at a respective location of each antenna in the two or more of the second plurality of antennas.

13. The method of claim 12, further comprising the step of:
deriving the DL CSI from the plurality of UL CSI based on two or more of the plurality of frequency selective RF calibrations and based on UL/DL channel reciprocity.

14. The method of claim 12, further comprising the step of:
using the UL CSI to remove inter-channel interference from a plurality of UL transmissions received by two or more of the first plurality of antennas from two or more of the second plurality of antennas.

15. The method of claim 12, wherein the wireless transceiver station is within a radio access network (RAN).

16. The method of claim 12, wherein each antenna in the first plurality of antennas is operatively connected to hard-wired logic.

17. The method of claim 12, wherein each antenna in the first plurality of antennas is operatively connected to a processor operatively connected to memory.

18. The method of claim 12, wherein each antenna in the first plurality of antennas is operatively connected to hard-wired logic and to a processor operatively connected to memory.

19. The method of claim 12, wherein each antenna in the first plurality of antennas is operatively connected to hard-wired logic and the hard-wired logic is also operatively connected to a third plurality of antennas of a second wireless transceiver station in a radio access network (RAN).

20. The method of claim 12, wherein each antenna in the first plurality of antennas is operatively connected to a processor operatively connected to memory and the processor is also operatively connected to a third plurality of antennas of a second wireless transceiver station in a radio access network (RAN).

21. A method comprising:
(1) estimating a plurality of radio frequency (RF) calibrations for uplink (UL)/downlink (DL) channel reciprocity in frequency selective channels for two or more of a first plurality of antennas of a wireless transceiver station where the first plurality of antennas are more than 8 antennas;
(2) determining UL channel state information (CSI) in response to receiving a plurality of UL transmissions in frequency selective channels by two or more of the first plurality of antennas from two or more of a second plurality of antennas of a plurality of user equipment devices (UEs);
(3) deriving a plurality of DL CSI from the plurality of UL CSI based on UL/DL channel reciprocity;
(4) precoding a plurality of orthogonal frequency-division multiplexing (OFDM) radio signals based on the two or more of the plurality of DL CSI and the plurality of RF calibrations that are transmitted concurrently by the two or more of the first plurality of antennas, to cause the plurality of OFDM radio signals to deliberately interfere to create concurrent, non-interfering channels at a respective location of each antenna in the two or more of the second plurality of antennas.

22. The method of claim 21, further comprising the step of:
deriving the DL CSI from the plurality of UL CSI based on the plurality of RF calibrations and based on UL/DL channel reciprocity.

23. The method of claim 21, further comprising the step of:
using the UL CSI to remove inter-channel interference from a plurality of UL transmissions received by two or more of the first plurality of antennas from two or more of the second plurality of antennas.

24. The method of claim 21, wherein the wireless transceiver station is within a radio access network (RAN).

25. The method of claim 21, wherein each antenna in the first plurality of antennas is operatively connected to hard-wired logic.

26. The method of claim 21, wherein each antenna in the first plurality of antennas is operatively connected to a processor operatively connected to memory.

27. The method of claim 21, wherein each antenna in the first plurality of antennas is operatively connected to hard-wired logic and to a processor operatively connected to memory.

28. The method of claim 21, wherein each antenna in the first plurality of antennas is operatively connected to hard-wired logic and the hard-wired logic is also operatively connected to a third plurality of antennas of a second wireless transceiver station in a radio access network (RAN).

29. The method of claim 21, wherein each antenna in the first plurality of antennas is operatively connected to a processor operatively connected to memory and the processor is also operatively connected to a third plurality of antennas of a second wireless transceiver station in a radio access network (RAN).

30. The method of claim 21, wherein each antenna in the first plurality of antennas is operatively connected to hard-wired logic and to a processor operatively connected to memory and the hard-wired logic and the processor are operatively connected to a third plurality of antennas of a second wireless transceiver station in a radio access network (RAN).

* * * * *